US012177656B2

(12) United States Patent
Jung et al.

(10) Patent No.: US 12,177,656 B2
(45) Date of Patent: Dec. 24, 2024

(54) METHOD AND APPARATUS FOR HANDLING EN-DC CELL RESELECTION INDICATOR IN NEXT-GENERATION MOBILE COMMUNICATION SYSTEM

(71) Applicant: Samsung Electronics Co., Ltd., Suwon-si (KR)

(72) Inventors: Sangyeob Jung, Suwon-si (KR); Himke Van Der Velde, Staines Middlesex (GB); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 17/205,389

(22) Filed: Mar. 18, 2021

(65) Prior Publication Data
US 2021/0297911 A1  Sep. 23, 2021

(30) Foreign Application Priority Data

Mar. 20, 2020 (KR) .................. 10-2020-0034688
May 13, 2020 (KR) .................. 10-2020-0057349

(51) Int. Cl.
*H04W 36/08* (2009.01)
*H04W 36/00* (2009.01)
(Continued)

(52) U.S. Cl.
CPC ........... *H04W 76/27* (2018.02); *H04W 48/18* (2013.01); *H04W 72/56* (2023.01); *H04W 76/30* (2018.02); *H04W 84/042* (2013.01)

(58) Field of Classification Search
CPC ..... H04W 36/08; H04W 76/30; H04W 76/27; H04W 36/0069; H04W 72/56
See application file for complete search history.

(56) References Cited

U.S. PATENT DOCUMENTS

| 2015/0382254 A1 | 12/2015 | Pakniat et al. |
| 2016/0353361 A1* | 12/2016 | Jung ............... H04W 40/00 |
| 2017/0332293 A1 | 11/2017 | Martin |

(Continued)

FOREIGN PATENT DOCUMENTS

| EP | 2 262 310 A1 | 12/2010 |
| EP | 2 395 793 A1 | 12/2011 |

(Continued)

OTHER PUBLICATIONS

CMCC et al., "Further consideration on EN-DC cell reselection", 3GPP TSG-RAN WG2 Meeting #108, R2-1915219, Reno, USA, Nov. 18-22, 2019.

(Continued)

*Primary Examiner* — Ricky Q Ngo
*Assistant Examiner* — Stephen N Steiner
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method performed by a terminal is provided. The method includes receiving, from a base station, a message for releasing a radio resource control (RRC) connection, the message including information indicating to apply alternative cell reselection priority information for a cell reselection, receiving, from a cell of the base station, system information associated with the cell reselection, in case that the system information includes cell reselection priority information and the alternative cell reselection priority
(Continued)

information, performing the cell reselection for evolved-universal terrestrial radio access (E-UTRA) frequency and inter-radio access technology (RAT) frequency by applying the alternative cell reselection priority information to the E-UTRA frequency, and in case that inter-RAT cell is selected, deleting the information indicating to apply the alternative cell reselection priority information.

20 Claims, 32 Drawing Sheets

(51) Int. Cl.
  *H04W 48/18* (2009.01)
  *H04W 72/56* (2023.01)
  *H04W 76/27* (2018.01)
  *H04W 76/30* (2018.01)
  *H04W 84/04* (2009.01)

(56) References Cited

U.S. PATENT DOCUMENTS

2019/0373523 A1  12/2019  Panchal et al.
2020/0221372 A1* 7/2020  Shih .................. H04W 72/0453

FOREIGN PATENT DOCUMENTS

EP       2 687 059 B1    12/2014
WO    2019/246147 A1    12/2019

OTHER PUBLICATIONS

CMCC et al., "Further consideration on EN-DC cell reselection", 3GPP TSG-RAN WG2 Meeting #107bis, R2-1913233, Chongqing, China, Oct. 14-18, 2019.
Samsung, 'Further discussion on EN-DC cell reselection', R2-2001575, 3GPP TSG RAN WG2 Meeting #109-e, Feb. 14, 2020.
Huawei et al., 'Cell Selection and Reselection procedures of IAB node', R2-1904978, 3GPP TSG RAN WG2 Meeting #105bis, Xi'an, China, Mar. 29, 2019.
Catt, 'Discussion on inter-RAT Cell Selection/Reselection', R2-2000204, 3GPP TSG RAN WG2 Meeting #109-e, Feb. 14, 2020.
Catt, 'Discussion on inter-RAT Cell Selection/Reselection', R2-1914451, 3GPP TSG RAN WG2 Meeting #108, Reno, USA, Nov. 8, 2019.
International Search Report dated Jun. 25, 2021, issued in International Application No. PCT/KR2021/003383.
Extended European Search Report dated Jan. 4, 2023, issued in European Patent Application No. 21772629.8.

* cited by examiner

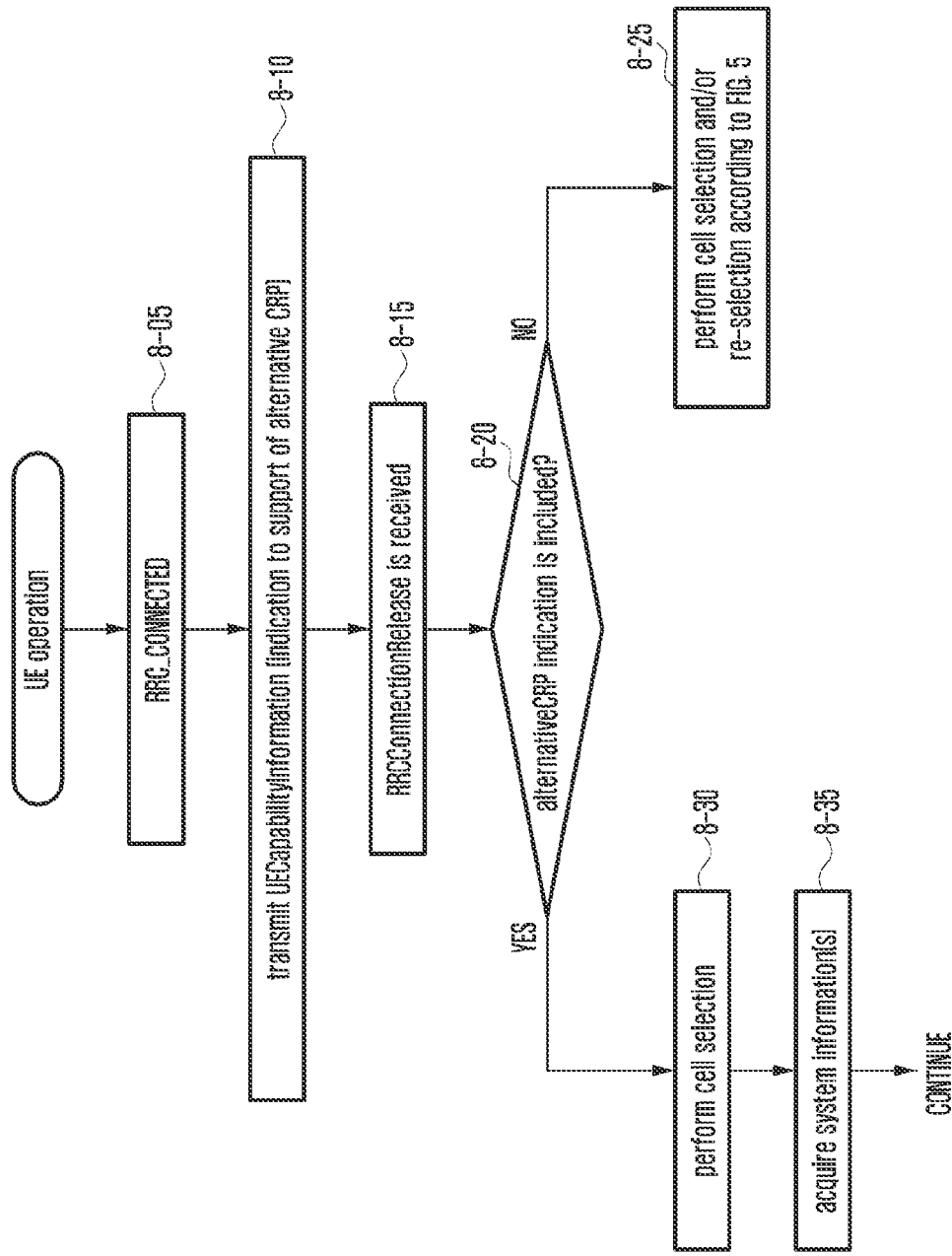

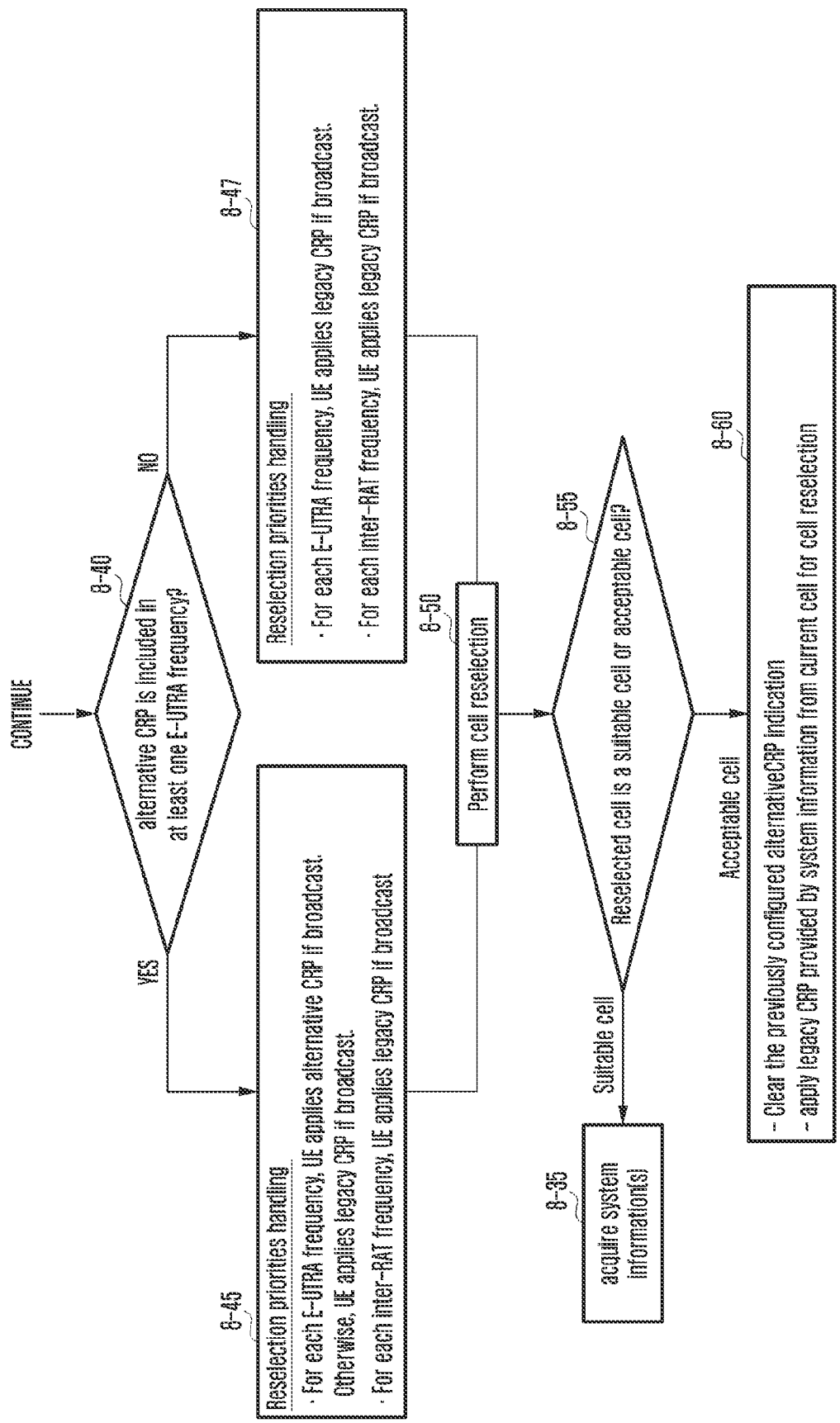

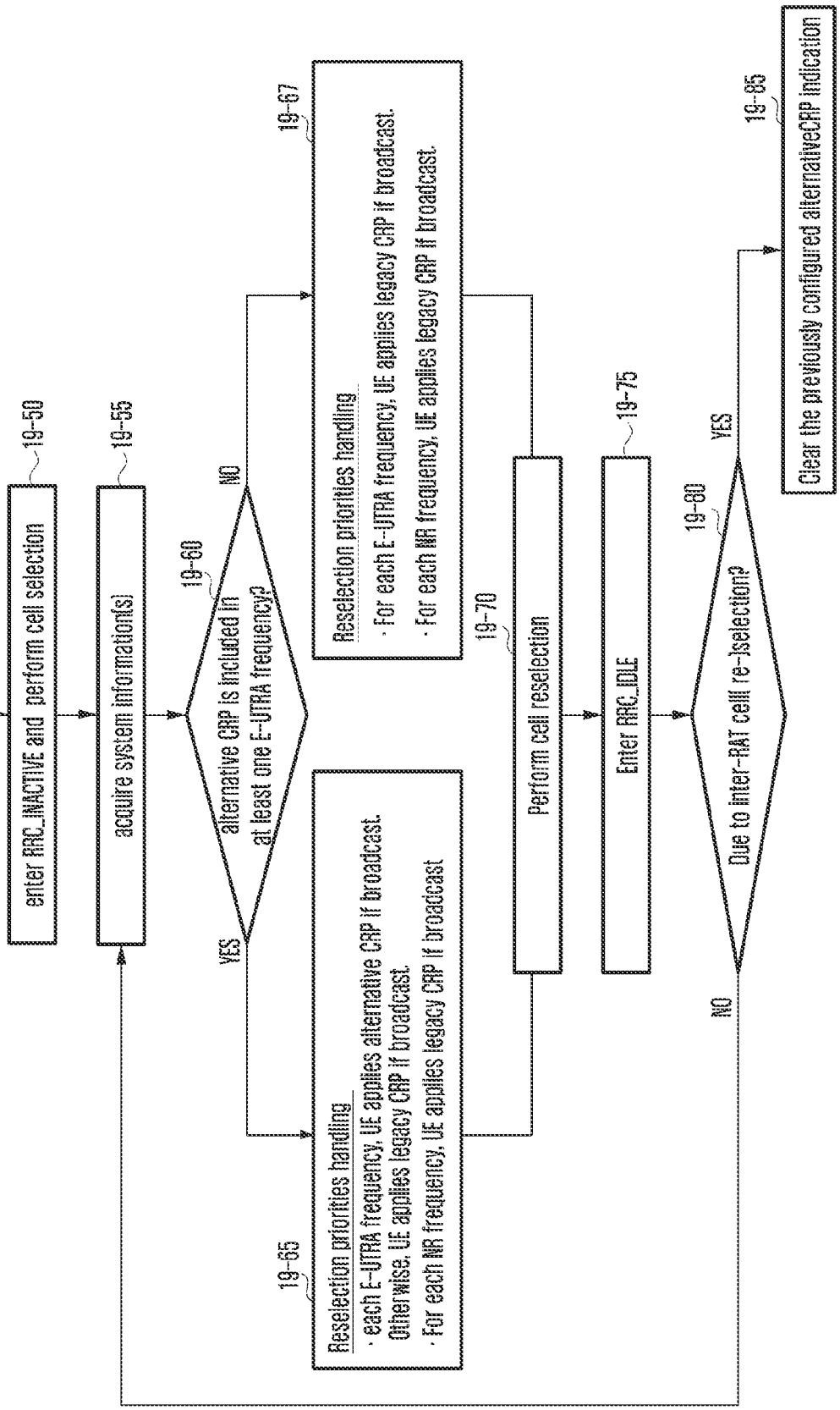

METHOD AND APPARATUS FOR HANDLING EN-DC CELL RESELECTION INDICATOR IN NEXT-GENERATION MOBILE COMMUNICATION SYSTEM

CROSS-REFERENCE TO RELATED APPLICATION(S)

This application is based on and claims priority under 35 U.S.C. § 119(a) of a Korean patent application number 10-2020-0034688, filed on Mar. 20, 2020, in the Korean Intellectual Property Office, and of a Korean patent application number 10-2020-0057349, filed on May 13, 2020, in the Korean Intellectual Property Office, the disclosure of each of which is incorporated by reference herein in its entirety.

BACKGROUND

1. Field

The disclosure relates to a mobile communication system terminal and base station operation. More particularly, the disclosure relates to a method and apparatus for handling an evolved-universal terrestrial radio access network (E-UTRAN) new radio-dual connectivity (EN-DC) cell reselection indicator in a mobile communication system.

2. Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. Various techniques have been suggested in 5G communication systems to decrease propagation loss of the radio waves and increase the transmission distance, such as beamforming, massive multiple-input multiple-output (MIMO), Full Dimensional MIMO (FD-MIMO), array antenna, an analog beam forming, and large scale antenna techniques. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid frequency shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for performing, by a terminal supporting evolved-universal terrestrial radio access network (E-UTRAN) new radio-dual connectivity (EN-DC) in a mobile communication system, cell reselection by using cell reselection priority configuration information broadcasted from a base station through system information.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes receiving, from a base station, a message for releasing a radio resource control (RRC) connection, the message including information indicating to apply alternative cell reselection priority information for a cell reselection, receiving, from a cell of the base station, system information associated with the cell reselection, in case that the system information includes cell reselection priority information and the alternative cell reselection priority information, performing the cell reselection for evolved-universal terrestrial radio access (E-UTRA) frequency and inter-radio access technology (RAT) frequency by applying the alternative cell reselection priority information to the E-UTRA frequency, and in case that inter-RAT cell is selected, deleting the information indicating to apply the alternative cell reselection priority information.

In accordance with another aspect of the disclosure, a method performed by a base station in a communication system is provided. The method includes transmitting, to a terminal, a message for releasing a RRC connection, the message including information indicating to apply alternative cell reselection priority information for a cell reselection, and transmitting, to the terminal via a cell of the base station, system information associated with the cell reselection, wherein in case that the system information includes cell reselection priority information and the alternative cell reselection priority information, the cell reselection for E-UTRA frequency and inter-RAT frequency is performed by applying the alternative cell reselection priority information to the E-UTRA frequency, and wherein in case that inter-RAT cell is selected, the information indicating to apply the alternative cell reselection priority information is deleted by the terminal.

In accordance with another aspect of the disclosure, a terminal in a communication is provided. The terminal includes a transceiver, and a controller coupled with the transceiver and configured to receive, from a base station, a message for releasing a RRC connection, the message including information indicating to apply alternative cell reselection priority information for a cell reselection, receive, from a cell of the base station, system information associated with the cell reselection, in case that the system information includes cell reselection priority information and the alternative cell reselection priority information, perform the cell reselection for E-UTRA frequency and inter-RAT frequency by applying the alternative cell reselection priority information to the E-UTRA frequency, and in case that inter-RAT cell is selected, delete the information indicating to apply the alternative cell reselection priority information.

In accordance with another aspect of the disclosure, a base station in a communication is provided. The base station includes a transceiver, and a controller coupled with the transceiver and configured to transmit, to a terminal, a message for releasing a RRC connection, the message including information indicating to apply alternative cell reselection priority information for a cell reselection, and transmit, to the terminal via a cell of the base station, system information associated with the cell reselection, wherein in case that the system information includes cell reselection priority information and the alternative cell reselection priority information, the cell reselection for E-UTRA frequency and inter-RAT frequency is performed by applying the alternative cell reselection priority information to the E-UTRA frequency, and wherein in case that inter-RAT cell is selected, the information indicating to apply the alternative cell reselection priority information is deleted by the terminal.

The embodiments of the disclosure propose methods for performing, by a terminal, cell reselection by using cell reselection priority information broadcasted from a base station through system information, and thus the base station can effectively manage a frequency.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8A illustrates a process of performing a cell reselection procedure by a terminal in an RRC inactive mode (RRC_INACTIVE) or an RRC idle mode (RRC_IDLE) in the next-generation mobile communication system according to an embodiment of the disclosure;

FIG. 8B illustrates a process of performing a cell reselection procedure by a terminal in an RRC inactive mode (RRC_INACTIVE) or an RRC idle mode (RRC_IDLE) in the next-generation mobile communication system according to an embodiment of the disclosure;

FIG. 19B illustrates a process of performing a cell reselection procedure by a terminal in an RRC inactive mode (RRC_INACTIVE) or an RRC idle mode (RRC_IDLE) in the next-generation mobile communication system according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, terms for identifying access nodes, terms referring to network entities, terms referring to messages, terms referring to interfaces between network entities, terms referring to various identification information, and the like are illustratively used for the sake of convenience. Accordingly, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

Figure 1:
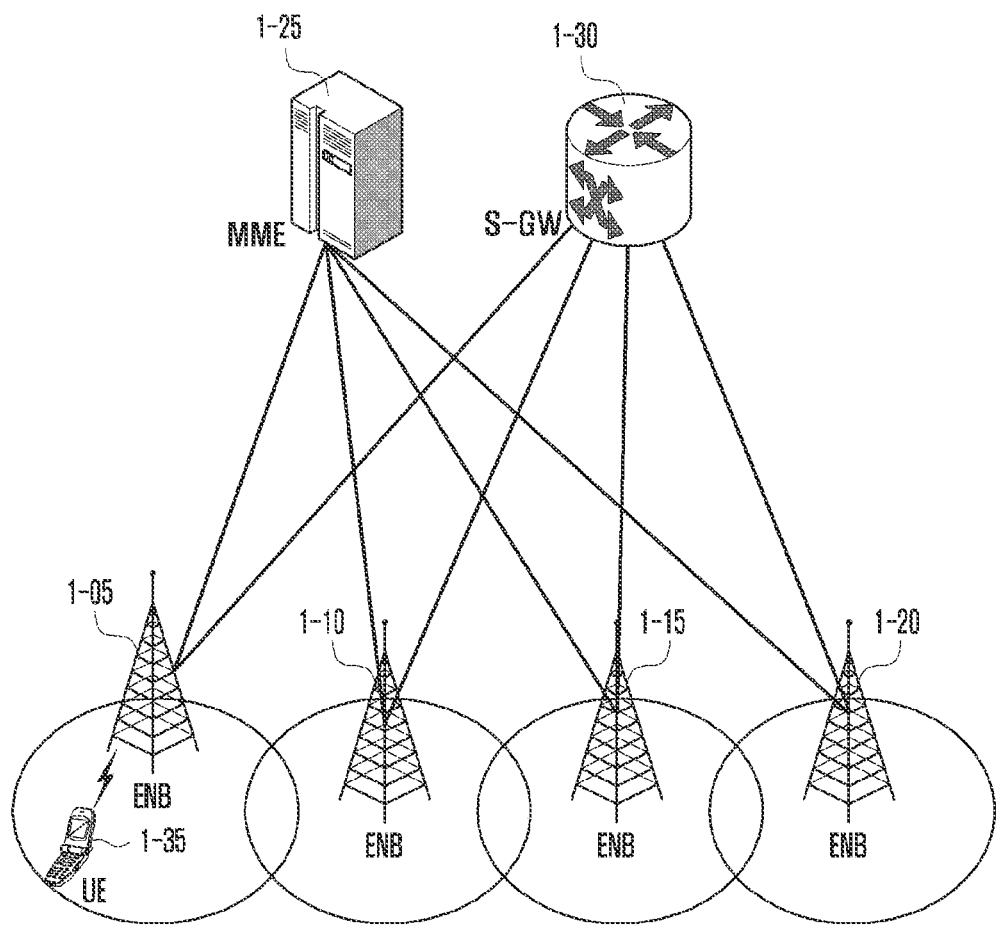
FIG. 1 illustrates a structure of a long-term evolution (LTE) system according to an embodiment of the disclosure.

FIG. 1 illustrates a structure of a long-term evolution (LTE) system according to an embodiment of the disclosure.

Referring to FIG. 1, a radio access network of an LTE system includes evolved Node Bs (hereinafter, referred to as "ENBs", "Node Bs", or "base stations") 1-05, 1-10, 1-15, and 1-20, a mobility management entity (MME) 1-25, and a serving gateway (S-GW) 1-30. A user equipment (hereinafter, referred to as a "UE" or a "terminal") 1-35 accesses an external network through the ENBs 1-05 to 1-20 and the S-GW 1-30.

In FIG. 1, the ENBs 1-05 to 1-20 correspond to the existing Node Bs of a universal mobile telecommunication system (UMTS). The ENB is connected to the UE 1-35 via a radio channel, and performs more complex functions than the existing Node B. In the LTE system, all user traffics including real-time services such as voice over Internet protocol (VOIP) are serviced through a shared channel. Accordingly, a device for collecting state information such as buffer state information of UEs, available transmission power state information of UEs, and channel state information of UEs, and performing scheduling is required, and each of the ENBs 1-05 to 1-20 serves as such a device. A single ENB generally controls multiple cells. For example, the LTE system uses a radio-access technology such as orthogonal frequency-division multiplexing (hereinafter, referred to as "OFDM") in a bandwidth of 20 MHz to achieve a data rate of 100 Mbps. In addition, the LTE system also applies an adaptive modulation & coding (hereinafter, referred to as "AMC") scheme for determining a modulation scheme and a channel-coding rate in accordance with the channel state of a terminal. The S-GW 1-30 is a device for providing a data bearer and generates or releases the data bearer under the control of the MME 1-25. The MME is a device for performing a mobility management function and various control functions for a terminal, and is connected to multiple base stations.

Figure 2:
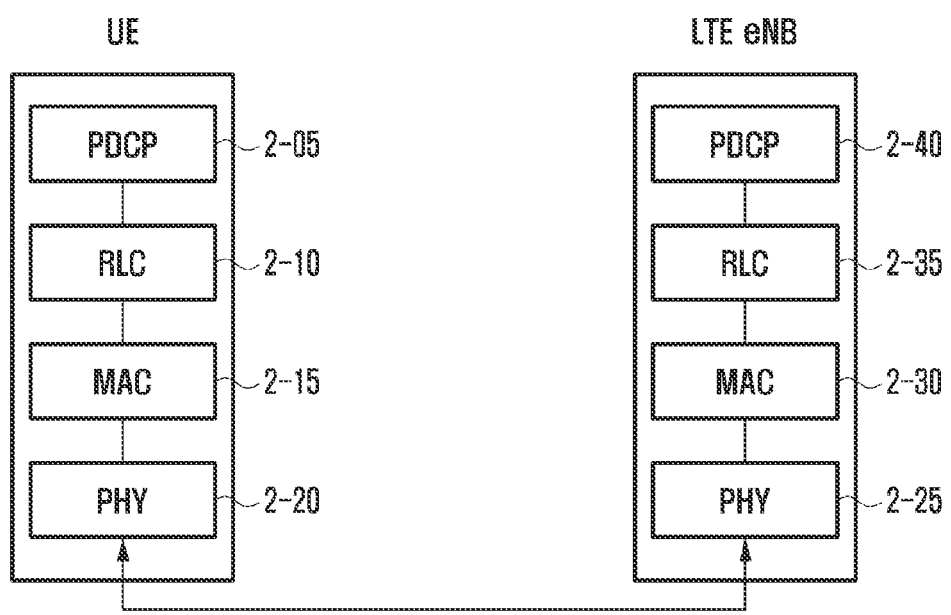
FIG. 2 illustrates a radio protocol structure in the LTE system according to an embodiment of the disclosure.

FIG. 2 illustrates a radio protocol structure in an LTE system according to an embodiment of the disclosure.

Referring to FIG. 2, the radio protocol in the LTE system includes packet data convergence protocols (PDCPs) 2-05 and 2-40, radio link controls (RLCs) 2-10 and 2-35, and medium access controls (MACs) 2-15 and 2-30 in a terminal and an ENB, respectively. The PDCPs 2-05 and 2-40 performs operations of IP header compression/recovery and the like. The main function of the PDCP is summarized below:
Header compression and decompression: ROHC only
Transfer of user data
In-sequence delivery of upper layer protocol data units (PDUs) at PDCP re-establishment procedure for RLC AM
For split bearers in DC (only support for RLC AM): PDCP PDU routing for transmission and PDCP PDU reordering for reception
Duplicate detection of lower layer service data units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The radio link controls (RLCs) 2-10 and 2-35 reconfigure the PDCP packet data unit (PDU) at an appropriate size to perform an automatic repeat reQuest (ARQ) operation or the like. The main functions of the RLC are summarized below:
Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer
Duplicate detection (only for UM and AM data transfer)
Protocol error detection (only for AM data transfer)
RLC SDU discard (only for UM and AM data transfer)
RLC re-establishment The MACs 2-15 and 2-30 are connected to several RLC layer devices configured in one terminal, and perform an operation of multiplexing RLC PDUs into a MAC PDU and demultiplexing the RLC PDUs from the MAC PDU. The main functions of the MAC are summarized below:
Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding Physical layers 2-20 and 2-25 generate an OFDM symbol by performing channel-coding and modulating of upper-layer data and transmit the same through a radio channel, or perform demodulating and channel-decoding of the OFDM symbol received through the radio channel and transmit the same to an upper layer.

Figure 3:
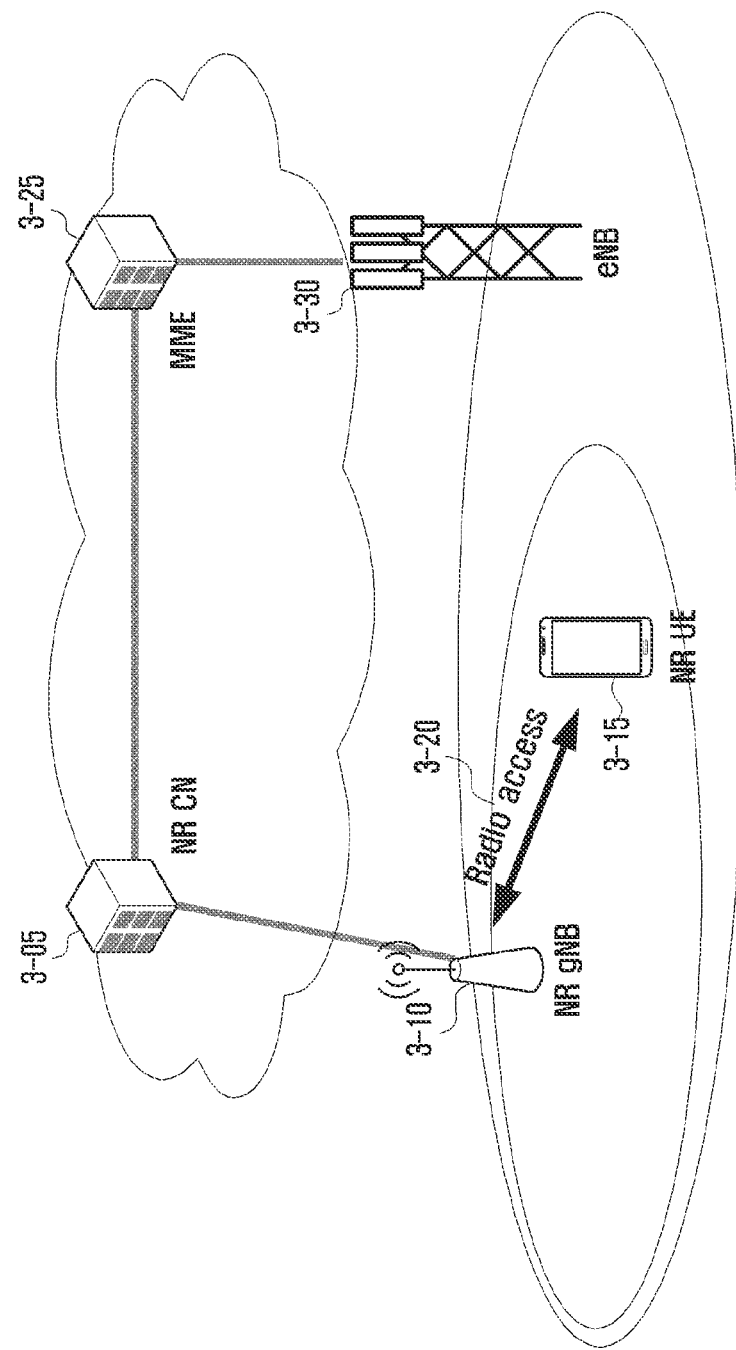
FIG. 3 illustrates a structure of a next-generation mobile communication system according to an embodiment of the disclosure.

FIG. 3 illustrates a structure of a next-generation mobile communication system according to an embodiment of the disclosure.

Referring to FIG. 3, a radio access network in the next-generation mobile communication system (hereinafter referred to as "new radio (NR)" or 5G) includes a new-radio node B (hereinafter, referred to as an "NR gNB" or an "NR base station") 3-10 and a new-radio core network (NR CN) 3-05. A new-radio user equipment (hereinafter, referred to as an "NR UE" or an "NR terminal") 3-15 accesses an external network through the NR gNB 3-10 and the NR CN 3-05.

In FIG. 3, the NR gNB 3-10 corresponds to an evolved node B (eNB) in the existing LTE system. The NR gNB 3-10=5 is connected to the NR UE 3-15 through a radio channel 3-20, and thus provides service superior to that of the existing node B. All user traffic is serviced through shared channels in the next-generation mobile communication system. Accordingly, a device for collecting state information, such as buffer state information of UEs, available transmission power state information of UEs, and channel state information of UEs, and performing scheduling is required, and the NR NB 3-10 serves as such a device. A single NR gNB 3-10 generally controls multiple cells. In order to implement ultra-high-speed data transmission in the next-generation mobile communication system as compared with the existing LTE, a bandwidth that is equal to or higher than the existing maximum bandwidth is applied, and a beamforming technology may be additionally combined using OFDM as radio connection technology. In addition, an adaptive modulation & coding (AMC) scheme that determines a modulation scheme and a channel-coding rate in accordance with the channel state of the terminal is applied. The NR CN 3-05 performs a function such as mobility support, bearer configuration, and quality of service (QOS) configuration. The NR CN is a device that performs not only terminal mobility management functions but also various types of control functions, and is connected to multiple base stations. Further, the next-generation mobile communication system may be linked with the existing LTE system, and the NR CN is connected to the MME 3-25 through a network interface. The MME is connected to an eNB 3-30 (i.e., the existing base station).

Figure 4:
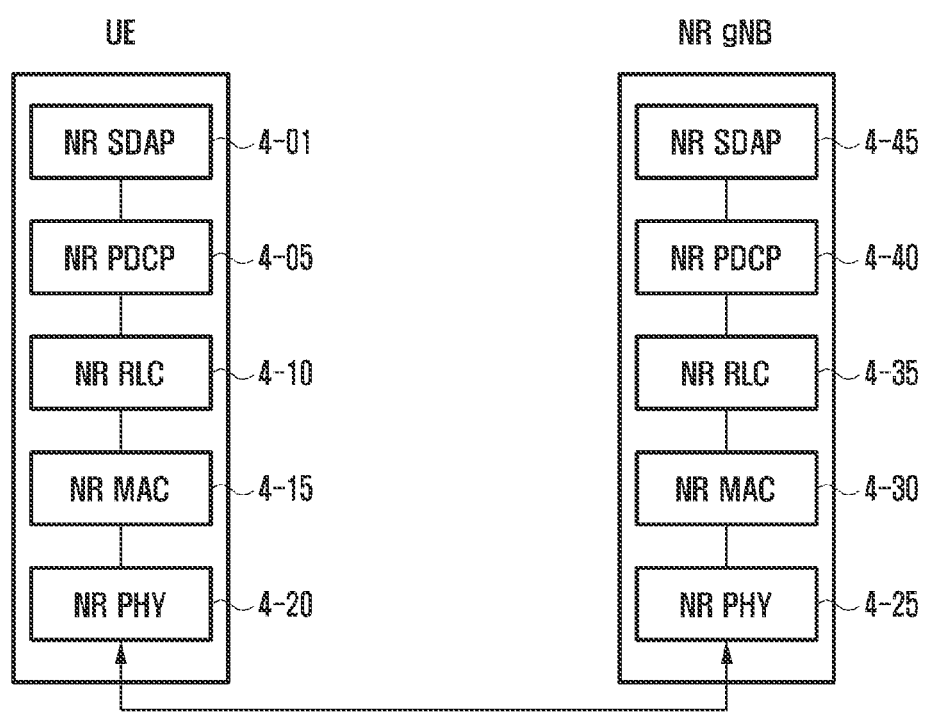
FIG. 4 illustrates a radio protocol structure in the next-generation mobile communication system according to an embodiment of the disclosure.

FIG. 4 illustrates a radio protocol structure in a next-generation mobile communication system according to an embodiment of the disclosure.

The radio protocol structure illustrated in FIG. 4 illustrates a radio protocol structure in a next-generation mobile communication to which the disclosure is applicable.

Referring to FIG. 4, in the radio protocol in the next-generation mobile communication system, a terminal and an NR base station include NR service data adaptation protocols (SDAPs) 4-01 and 4-45, NR PDCPs 4-05 and 4-40, NR RLCs 4-10 and 4-35, and NR MACs 4-15 and 4-30, respectively The main function of the NR SDAPs 4-01 and 4-45 may include some of the following functions:

Transfer of user plane data
Mapping between a QoS flow and a DRB for both DL and UL
Marking QoS flow ID in both DL and UL packets
Reflective QoS flow to DRB mapping for the UL SDAP PDUs.

For an SDAP-layer device, the terminal may receive, through a radio resource control (RRC) message, a configuration as to whether to use a header of the SDAP-layer device or to use a function of the SDAP-layer device for each PDCP layer device, each bearer, or each logical channel. When an SDAP header is configured, the terminal may be indicated to update or reconfigure, with a non-access stratum (NAS) reflective QoS 1-bit indicator and an access stratum (AS) reflective QoS 1-bit indicator of the SDAP header, mapping information for uplink and downlink QoS flows and a data bearer. The SDAP header may include QoS flow ID information indicating the QoS. The QoS information may be used as data-processing priority, scheduling information, or like in order to support a smooth service.

The main functions of the NR PDCPs 4-05 and 4-40 may include one or more of the following functions:

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

In the above description, the reordering function of the NR PDCP device refers to a function of sequentially rearranging PDCP PDUs received in a lower layer, based on a PDCP sequence number (SN). The reordering function of the NR PDCP device may include a function of delivering data to an upper layer in the rearranged order; a function of directly delivering data without considering an order; a function of recording lost PDCP PDUs by rearranging an order; a function of reporting a state of the lost PDCP PDUs to a transmission end; and a function of requesting retransmission of the lost PDCP PDUs.

The main function of the NR RLCs 4-10 and 4-35 may include one or more of the following functions:

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above description, the in-sequence delivery function of the NR RLC device refers to a function of sequentially delivering RLC SDUs received from a lower layer, to an upper layer. When a single RLC SDU is divided into multiple RLC SDUs and the divided multiple RLC SDUs are received, the in-sequence delivery function of the NR RLC device may include a function of rearranging and delivering the same. The in-sequence delivery function of the NR RLC device may include a function of rearranging the received RLC PDUs, based on an RLC sequence number (SN) or a PDCP sequence number (SN); a function of recording lost RLC PDUs by rearranging an order; a function of reporting the state of the lost RLC PDUs to a transmission end; and a function of requesting retransmission of the lost RLC PDUs. When an RLC SDU is lost, the in-sequence delivery function of the NR RLC device may include a function of sequentially delivering only RLC SDUs preceding the lost RLC SDU to the upper layer. When an RLC SDU is lost and the timer expires, the in-sequence delivery function of the NR RLC device may include a function of sequentially delivering, to the upper layer, all RLC SDUs received before a predetermined timer starts. When an RLC SDU is lost and the predetermined timer expires, the in-sequence delivery function of the NR RLC device may include a function of delivering, to the upper layer, all RLC SDUs received up to that point in time. In addition, the NR RLC device may process the RLC PDUs in the received order (in an arriving order, regardless of the order of serial numbers or sequence numbers), and may deliver the processed RLC PDUs to the PDCP device regardless of order (out-of-sequence delivery). When the NR RLC device receives a segment, the NR RLC device may receive segments which are stored in a buffer or are to be received later, reconfigure the segments into one complete RLC PDU, and then deliver the complete RLC PDU to the PDCP device. The NR RLC layer may omit a concatenation function and may perform the function in the NR MAC layer or may replace the function with a multiplexing function of the NR MAC layer.

In the above description, the out-of-sequence delivery function of the NR RLC device refers to a function of directly delivering the RLC SDUs received from the lower layer, to the upper layer regardless of order. When a single RLC SDU is divided into multiple RLC SDUs and the divided multiple RLC SDUs are received, the out-of-sequence delivery function of the NR RLC device may include a function of rearranging and delivering the divided multiple RLC SDUs. The out-of-sequence delivery function of the NR RLC device may include a function of storing the PDCP SN or the RLC SN of each of the received RLC PDUs, arranging the RLC PDUs, and recording the lost RLC PDUs.

The NR MACs 4-15 and 4-30 may be connected to several NR RLC layer devices configured in one terminal, and the main functions of the NR MAC may include some of the following functions:

Mapping between logical channels and transport channels
Multiplexing/demultiplexing of MAC SDUs
Scheduling information reporting
Error correction through HARQ
Priority handling between logical channels of one UE Priority handling between UEs by means of dynamic scheduling
MBMS service identification
Transport format selection
Padding NR Physical layers (NR PHYs) 4-20 and 4-25 may generate an OFDM symbol by performing channel-coding and modulating of upper-layer data and transmit the same through a radio channel, or may perform demodulating and channel-decoding of the OFDM symbol received through the radio channel and transmit the same to the upper layer.

Figure 5:
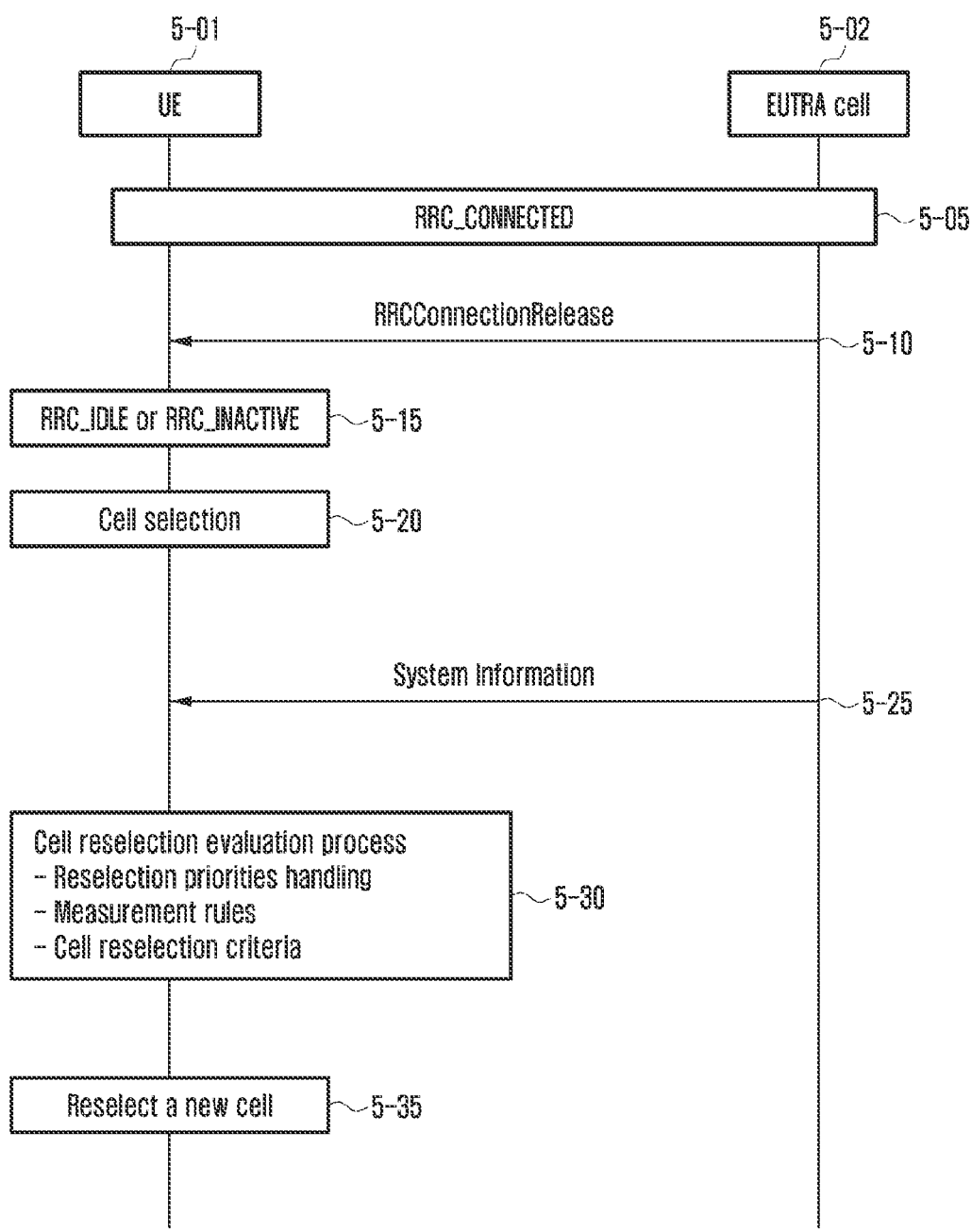
FIG. 5 illustrates a process of performing a cell reselection procedure by a terminal in a radio resource control (RRC) inactive mode (RRC_INACTIVE) or an RRC idle mode (RRC_IDLE) in the existing LTE system according to an embodiment of the disclosure.

FIG. 5 illustrates a process of performing a cell reselection procedure by a terminal in an RRC inactive mode (RRC_INACTIVE) or an RRC idle mode (RRC_IDLE) in the existing LTE system according to an embodiment of the disclosure.

According to an embodiment of the disclosure, an LTE base station may broadcast cell reselection priority configuration information for each radio access technology (RAT)-specific frequency through system information. Accordingly, cell reselection is performed based on the cell reselection priority configuration information for each RAT-specific frequency included in the system information.

According to an embodiment of the disclosure, the cell reselection priority configuration information may include a frequency priority value. The frequency priority value may refer to cellReselectionPriority and/or cellReselectionSubPriority. The cellReselectionPriority may have an integer value, and the cellReselectionSubPriority may have a decimal (fractional) value. When both the cellReselectionPriority and the cellReselectionSubPriority are signaled, the terminal may derive a frequency priority value by adding both values. A frequency having a higher frequency priority value may have a higher cell reselection priority.

The cell reselection procedure may correspond to a process of determining whether to maintain a current serving cell or perform cell reselection by selecting a neighbor cell when the service quality of the serving cell of the terminal in the RRC idle mode or the RRC inactive mode becomes lower than that of the neighbor cell due to a predetermined reason or moving of the terminal.

In a case of handover, whether to perform a handover operation is determined by a network. However, in a case of cell reselection, a terminal itself can determine whether to perform a cell reselection operation by using a cell measurement value. A cell reselected as the terminal moves may mean a neighbor cell using the same radio access technology (hereinafter, referred to as "RAT") as the current serving cell or a cell using a RAT different from that of the current serving cell.

Reselecting a neighbor cell using a RAT different from that of the current serving cell may be referred to as "inter-RAT cell reselection". In a case of using the same RAT as that of the current serving cell, reselecting a neighbor cell positioned in the same frequency as that of the current serving cell (intra-frequency) may be referred to as "intra-frequency cell reselection", and reselecting a cell positioned in the frequency different from that of the current serving cell (inter-frequency) may be referred to as "inter-frequency cell reselection". For example, when the current serving cell is an evolved-universal terrestrial radio access (E-UTRA) cell, the intra-frequency cell reselection and inter-frequency cell reselection may be referred to as "evolved-universal terrestrial radio access network (E-UTRAN) intra-frequency cell reselection" and "E-UTRAN inter-frequency cell reselection", respectively.

Referring to FIG. 5, a terminal 5-01 may be in an RRC-connected mode (RRC_CONNECTED) according to RRC connection configuration with a base station 5-02 in operation 5-05.

When the base station fails to transmit or receive data for a predetermined time or due to a predetermined reason, the base station may transmit an RRC connection release message (RRCConnectionRelease) to a terminal in operation 5-10.

In operation 5-10, the RRC connection release message may include RRC inactive configuration information (rrc-InactiveConfig). When the RRC inactive configuration information is included in the message, the terminal may transition to an RRC inactive mode in operation 515. When no RRC inactive configuration information is included in the message, the terminal may transition to an RRC idle mode in operation 5-15.

In operation 5-10, the RRC connection release message may include at least one cell reselection priority configuration information per frequency for each RAT (RAT (e.g., EUTRA, global system for mobile (GSM) enhanced data rates for global evolution (EDGE) radio access network (GERAN), UTRA-frequency-division duplexing (FDD), UTRA-time-division duplexing (TDD), high rate packet data (HRPD), 1 times radio transmission technology (1×RTT), NR, etc.) and timer values commonly applicable regardless of the RAT.

For example, the configuration information may be received in the idleModeMobilityControlInfo of the RRC connection release message. The idleModeMobilityControlInfo may include at least one of the following parameters:

One or multiple CarrierFreq(s) or bandClass(es): This value indicates each frequency or band. For example, an absolute radio frequency channel number (hereinafter, referred to as an "ARFNN") may be included.

Cell reselection priority value for each CarrierFreq or bandClass: For example, a cell reselection priority value for each CarrierFreq or bandClass may mean cellReselectionPriority and/or cellReselectionSubPriority. The cellReselectionPriority may have an integer value, and the cellReselectionSubPriority may have a decimal value. When both the cellReselectionPriority and the cellReselectionSubPriority are signaled, the terminal may derive a frequency priority value by adding both values.

Timer T320 value

When the RRC connection release message includes one piece of reselection priority configuration information per frequency for each RAT (RAT (for example, EUTRA, GERAN, UTRA-FDD, UTRA-TDD, HRPD, 1×RTT, NR, etc.), the terminal may store the same. When the RRC connection release message includes a timer T320 value, the terminal may operate a timer T320 according to the timer T320 value. While the timer T320 is operated, the terminal 5-01 in the RRC idle mode or the RRC inactive mode may perform a cell reselection procedure by using the one piece of reselection priority configuration information for each RAT-specific frequency, the information being received in the RRC connection release message.

When the RRC connection release message includes neither reselection priority configuration information for each RAT-specific frequency nor a timer value commonly applicable to the RATs, or the timer T320 expires, the terminal 5-01 in the RRC idle mode or the RRC inactive mode may perform a cell reselection procedure by using the cell reselection priority information for each RAT-specific frequency, the information being broadcasted through the system information.

In operation 5-20, the terminal in the RRC idle mode or the RRC inactive mode may perform a cell selection procedure. The terminal may select a cell according to cell selection criteria defined by Equation 1.

Srxlev>0 AND Squal>0
where:

Srxlev=Qrxlevmeas−(Qrxlevmin+Qrxlevminoffset)−
Pcompensation−Qoffsettemp

Squal=Qqualmeas−(Qqualmin+Qqualminoffset)−
Qoffsettemp             Equation 1

The definitions of parameters used in Equation 1 may refer to 3GPP standard document "36.304: UE procedures in idle mode", and the parameters may be included in the system information (e.g., SIB1, and SIB2) broadcasted by the cell. The same approach may be applied to other embodiments in which Equation 1 is used.

In operation 5-25, the terminal may acquire or receive system information (SIB3, SIB4, . . . , SIB8, and SIB24). The system information may include cell reselection priority configuration information for each RAT-specific frequency. For example, in operation 5-25, when the terminal camps on the E-UTRA cell through a cell selection procedure, the cell reselection priority configuration information for each RAT-specific frequency may be included in the system information having the following types. However, the following system information numbers and the cell reselection priority configuration information correspond to a mere embodiment of the disclosure, and the system information numbers including the cell reselection priority configuration information may change.

SIB3: cell reselection priority configuration information relating to a serving frequency (a frequency to which a currently camped-on cell belongs)
SIB4: cell reselection priority configuration information for each E-UTRA intra-frequency
SIB5: cell reselection priority configuration information for each E-UTRA inter-frequency
SIB6: cell reselection priority configuration information for each UTRA frequency (UTRA-FDD or UTRA-TDD)
SIB7: cell reselection priority configuration information for each GERAN frequency
SIB8: cell reselection priority configuration information for each CDMA2000
SIB24: cell reselection priority configuration information for each NR frequency SIB3, SIB4, SIB5, SIB6, SIB7, SIB8, and SIB24 may include additional parameters for cell reselection.

In operation 5-30, the terminal may perform a cell reselection evaluation process. The terminal may perform a cell reselection evaluation process for E-UTRAN frequencies and inter-RAT frequencies broadcasted through the provided system information and cell reselection priority configuration information (The UE shall only perform cell reselection evaluation for E-UTRAN frequencies and inter-RAT frequencies that are given in system information and for which the UE has a priority provided). The cell reselection evaluation process may refer to a series of procedures below:

Frequency priority application scheme (Reselection priorities handling)
Measurement rules for cell reselection
Cell reselection criteria The frequency priority application scheme may be determined according to whether the RRC connection release message received by the terminal in operation 5-10 includes the cell reselection priority configuration information for each RAT-specific frequency and the timer value commonly applied to the RATs. An example of the scheme of determining a frequency priority according to whether the cell reselection priority configuration information for each RAT-specific frequency and the timer value commonly applied to the RATs are included is described below:

In a case in which the RRC connection release message includes one piece of cell reselection priority configuration information for each RAT-specific frequency and a timer value commonly applied to the RATs, while the timer T320 is operated, a frequency priority may be determined by ignoring the cell reselection priority configuration information for each RAT-specific frequency, the information being included in the system information acquired in operation 5-25 and by applying the cell reselection priority configuration information included in the RRC connection release message. When the timer T320 expires, a frequency priority may be determined by applying the cell reselection priority configuration information for each RAT-specific frequency, the information being included in the system information acquired in operation 5-25.

When the RRC connection release message includes neither cell reselection priority configuration information for each RAT-specific frequency nor a timer value commonly applied to the RATs, a frequency priority may be determined by applying the cell reselection priority configuration information for each RAT-specific frequency, the information being included in the system information acquired in operation 5-25.

For a predetermined reason or for minimizing the battery consumption, the terminal may perform neighbor cell measurement according to the measurement rule by applying the determined frequency priority. An example of the measurement rule is described below:

If the reception level and the reception quality of a serving cell are greater than thresholds (Srxlev>SIntraSearchP and SIntraSearchQ), the terminal may not perform EUTRA intra-frequency measurement. Otherwise, the terminal may perform the EUTRA intra-frequency measurement.

With respect to the EUTRA inter-frequency or inter-RAT frequency having a higher cell reselection priority than that of the current serving cell frequency, the terminal may perform neighbor cell measurement according to 3GPP standard document "36.133: Requirements for Support of Radio Resource Management".

If the reception level and the reception quality of a serving cell are greater than thresholds (Srxlev>SnonIntraSearchP and SnonIntraSearchQ), the terminal may perform measurement for neither the EUTRA inter-frequency having a cell reselection priority equal to or lower than that of the current serving cell frequency nor the inter-RAT frequency having a higher cell reselection frequency than that of the current serving cell. Otherwise, the terminal may perform neighbor cell measurement for the EUTRA inter-frequency or the inter-RAT frequency having a cell reselection priority equal to or lower than the current serving cell frequency according to 3GPP standard document "36.133: Requirements for Support of Radio Resource Management".

The thresholds (SIntraSearchP, SIntraSearchQ, SnonIn-traSearchP, SnonIntraSearchQ) and the reception level and the reception quality of the serving cell may be acquired or derived through the system information received in operation 5-30.

Different cell reselection evaluation criteria may be applied depending on the frequency priority determined by the terminal. For example, the terminal may apply different cell reselection criteria for the following three cases:

First case: A case in which there is at least one E-UTRAN frequency or inter-RAT frequency having a higher priority than that of a current serving frequency Second case: A case in which there is at least one E-UTRAN frequency or inter-RAT frequency having a lower priority than that of a current serving frequency Third case: A case of a current serving frequency or a case in which there is at least one E-UTRAN inter-frequency having a priority equal to that of the current serving frequency In a case in which cell reselection evaluation criteria are applied according to the first case:

If the threshServingLowQ is broadcasted through the system information (e.g., SIB3) that is broadcasted in a serving cell, and the terminal has camped on the current serving cell for over one second, Cell reselection is performed by selecting a cell satisfying condition A.

Condition A: This corresponds to a case in which a cell in the EUTRAN, NR, or UTRAN FDD RAT/frequency having a higher priority satisfies Squal>ThreshX,HighQ during a TreselectionRAT period, or a case in which a cell in the UTRAN TDD, GERAN, or CDMA2000 RAT/frequency having a higher priority satisfies Squal>ThreshX,HighP during a TreselectionRAT period.

Otherwise, cell reselection is performed by selecting a cell in the RAT/frequency having a higher priority when the terminal has camped on the current serving cell for over one second and the corresponding cell satisfies Srxlev>ThreshX,HighP during a TreselectionRAT period.

In a case in which cell reselection evaluation criteria are applied according to the second case:

If the threshServingLowQ is broadcasted through the system information (for example, SIB3) that is broadcasted in a serving cell, and the terminal has camped on the current serving cell for over one second, Cell reselection is performed by selecting a cell satisfying condition B.

Condition B: This corresponds to a case in which a serving cell satisfies Squal<ThreshServing,LowQ, and a cell in the EUTRAN, NR, or UTRAN FDD RAT/frequency having a lower priority satisfies Squal>ThreshX,LowQ during a TreselectionRAT period, or a case in which a serving cell satisfies Squal<ThreshServing,LowQ, and a cell in the UTRAN TDD, GERAN, or CDMA2000 RAT/frequency having a lower priority satisfies Squal>ThreshX,LowP during a TreselectionRAT period.

Otherwise, cell reselection is performed by selecting a cell in the RAT/frequency having a lower priority when the terminal has camped on the current serving cell for over one second and the corresponding cell satisfies Srxlev>ThreshX,LowP during a TreselectionRAT period.

In a case in which cell reselection evaluation criteria are applied according to the third case, the terminal may rank all cells satisfying cell selection criteria. That is, for all cells satisfying cell selection criteria, the terminal may derive ranks for cells according to an RSRP measurement value. The ranks of the serving cell and the neighbor cell are obtained according to Equation 2 below:

$$Rs = Qmeas,s + Qhyst - Qoffsettemp + QoffsetSCPTM$$

$$Rn = Qmeas,n - Qoffset - Qoffsettemp + QoffsetSCPTM \quad \text{Equation 2}$$

The definitions of parameters used in Equation 2 may correspond to the definitions provided in the 3GPP standard document "36.304: UE procedures in idle mode", and the parameters may be included in the system information broadcasted by the cell. Hereinafter, the same approach may be applied to other embodiments in which Equation 2 is used. The terminal may perform cell reselection by selecting the highest ranked cell (If a cell is ranked as the best cell, the UE shall perform cell reselection to that cell). In any case, the terminal may perform reselection by selecting a new cell when the following conditions are satisfied:

A case in which a new cell has a higher rank than that of a serving cell during a TreselectionRAT period A case in which the terminal has camped on the current serving cell for over one second When multiple cells satisfying the cell selection criteria according to the first case, the second case, and the third case have different priorities, the terminal may perform cell reselection by prioritizing the RAT/frequency having a higher priority over the RAT/frequency having a lower priority (Cell reselection to a higher priority RAT/frequency shall take precedence over a lower priority RAT/frequency, if multiple cells of different priorities fulfil the cell reselection criteria). In a case in which the cell selection is performed according to the first case or the second case, when multiple cells satisfy the cell reselection criteria, the terminal may perform cell reselection by selecting the highest ranked cell from among cells in the frequency(ies) having the highest priority. Parameters applied to the cell reselection criteria may be included in the system information received in operation 5-25. The TreselectionRAT parameter may be scaled according to a mobility state of the terminal. For example, when the terminal is in the high-mobility state for the E-UTRA cell, the TreselectionEUTRA can be derived by multiplying the TreselectionEUTRA by a speed dependent scaling factor (sf-High) for TreselectionEUTRA. The Qhyst parameter may be scaled according to the mobility state of the terminal. For example, when the terminal is in the high-mobility state for the E-UTRA cell, the Qhyst can be derived by adding the Qhyst and the speed dependent scaling factor (sf-High) for Qhyst.

In operation 5-35, the terminal in the RRC idle mode or the RRC inactive mode may perform cell reselection by selecting a new cell through operation 5-30.

Figure 6:
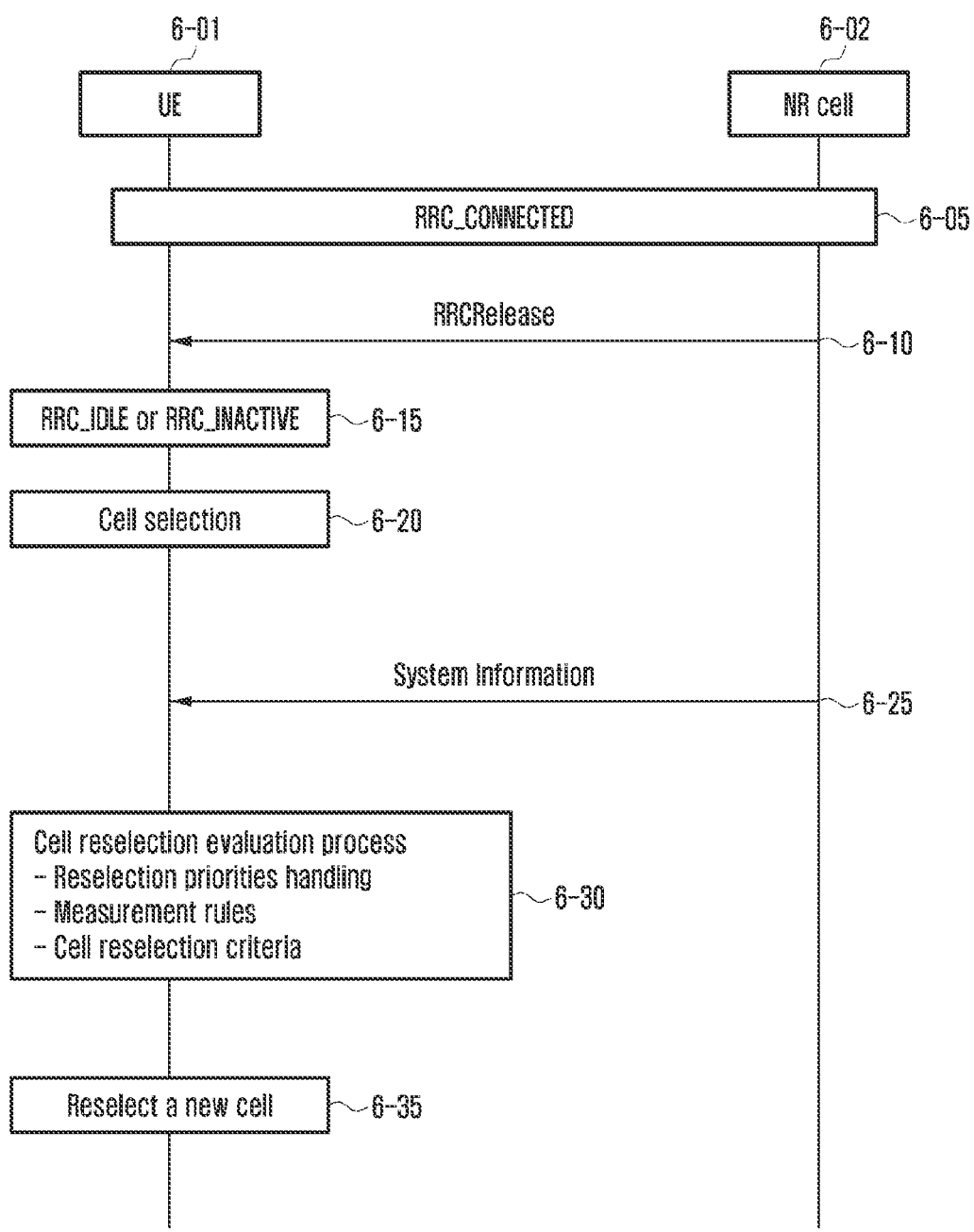
FIG. 6 illustrates a process of performing a cell reselection procedure by a terminal in an RRC inactive mode (RRC_INACTIVE) or an RRC idle mode (RRC_IDLE) in the next-generation system according to an embodiment of the disclosure.

FIG. 6 illustrates a process of performing a cell reselection procedure by a terminal in an RRC inactive mode (RRC_INACTIVE) or an RRC idle mode (RRC_IDLE) in the next-generation system according to an embodiment of the disclosure.

Referring to FIG. 6, an NR base station may broadcast cell reselection priority configuration information for each RAT-specific frequency through system information. Accordingly, cell reselection is performed based on the one piece of cell reselection priority configuration information for each RAT-specific frequency included in the system information. The cell reselection priority configuration information may refer to a frequency priority value. The frequency priority value may refer to cellReselectionPriority and/or cellReselectionSubPriority. The cellReselectionPriority may have an integer value, and the cellReselectionSubPriority may have a decimal value. When both the cellReselectionPriority and the cellReselectionSubPriority are signaled, the terminal may derive a frequency priority value by adding both values. A frequency having a higher frequency priority value may have a higher cell reselection priority.

The cell reselection procedure may correspond to a process of determining whether to maintain a current serving cell or perform cell reselection by selecting a neighbor cell when the service quality of the serving cell of the terminal in the RRC idle mode or the RRC inactive mode gets lower than that of the neighbor cell due to a predetermined reason or moving of the terminal.

In a case of handover, whether to perform a handover operation is determined by a network. However, in a case of cell reselection, a terminal itself can determine whether to perform a cell reselection operation by using a cell measurement value. A cell reselected as the terminal moves may mean a neighbor cell using the same radio access technology (RAT) as the current serving cell or a cell using a RAT different from that of the current serving cell. Reselecting a neighbor cell using a RAT different from that of the current serving cell may be referred to as "inter-RAT cell reselection". In a case of using the same RAT as that of the current serving cell, reselecting a neighbor cell positioned in the same frequency as that of the current serving cell (intra-frequency) may be referred to as "intra-frequency cell reselection", and reselecting a cell positioned in the frequency different from that of the current serving cell (inter-frequency) may be referred to as "inter-frequency cell reselection". For example, when the current serving cell is an NR cell, the intra-frequency cell reselection and inter-frequency cell reselection may be referred to as "NR intra-frequency cell reselection" and "NR inter-frequency cell reselection", respectively.

Referring to FIG. 6, a terminal 6-01 may be in an RRC-connected mode (RRC_CONNECTED) according to RRC connection with a base station 6-02 in operation 6-05.

When the base station fails to transmit or receive data for a predetermined time or due to a predetermined reason, the base station may transmit an RRC connection release message (RRCRelease) to a terminal in operation 6-10.

In operation 6-10, the RRC connection release message may include suspension configuration information (suspendConfig). When the suspension configuration information is included in the message, the terminal may transition to an RRC inactive mode in operation 6-15. When no suspension configuration information is included in the message, the terminal may transition to an RRC idle mode in operation 6-15.

In operation 6-10, the RRC connection release message may include at least one reselection priority configuration information per frequency for each RAT (RAT (e.g., EUTRA and NR) and a timer value commonly applicable regardless of the RAT. For example, the configuration information may be received in the cellReselectionPriorities of the RRC connection release message and provided. The cellReselectionPriorities may include at least one of the following parameters:

freqPriorityListEUTRA: This includes one or multiple FreqPriorityEUTRA(s). Each FreqPriorityEUTRA may include: the carrierFreq including an absolute radio frequency channel number (hereinafter, referred to as an "ARFNN"); and the cellReselectionPriority and the cellReselectionSubPriority including a cell reselection priority value. The cellReselectionPriority may have an integer value, and the cellReselectionSubPriority may have a decimal value. When both the cellReselectionPriority and the cellReselectionSubPriority are signaled, the terminal may derive a cell reselection priority value for the corresponding EUTRA frequency by adding both values.

freqPriorityListNR: This includes one or multiple FreqPriorityNR(s). Each FreqPriorityNR may include: the carrierFreq including an absolute radio frequency channel number (ARFNN); and the cellReselectionPriority and the cellReselectionSubPriority including a cell reselection priority value. The cellReselectionPriority may have an integer value, and the cellReselectionSubPriority may have a decimal value. When both the cellReselectionPriority and the cellReselectionSubPriority are signaled, the terminal may derive a cell reselection priority value for the corresponding NR frequency by adding both values.

Timer T320 value

When the RRC connection release message includes one piece of reselection priority configuration information per frequency for each RAT (RAT (for example, EUTRA and NR), the terminal may store the same. When the RRC connection release message includes a timer T320 value, the terminal may configure a timer T320 according to the timer T320 value. While the timer T320 is operated, the terminal 6-01 in the RRC idle mode or the RRC inactive mode may perform a cell reselection procedure by using the reselection priority configuration information for each RAT-specific frequency, the information being received in the RRC connection release message. When the RRC connection release message includes neither reselection priority configuration information for each RAT-specific frequency nor a timer value commonly applicable to the RATs, or the timer T320 expires, the terminal 6-01 in the RRC idle mode or the RRC inactive mode may perform a cell reselection procedure by using the cell reselection priority information for each RAT-specific frequency, the information being broadcasted through the system information.

In operation 6-20, the terminal in the RRC idle mode or the RRC inactive mode may perform a cell selection procedure. The terminal may select a cell according to cell selection criteria as defined in Equation 3.

Srxlev>0 AND Squal>0 where:

$$Srxlev = Qrxlevmeas - (Qrxlevmin + Qrxlevminoffset) - Pcompensation - Qoffsettemp$$

$$Squal = Qqualmeas - (Qqualmin + Qqualminoffset) - Qoffsettemp \quad \text{Equation 3}$$

The definitions of parameters used in Equation 3 may correspond to the definitions provided in the 3GPP standard document "38.304: UE procedures in idle mode and RRC Inactive state", and the parameters may be included in the system information (for example, SIB1) broadcasted by the cell. The same approach may be applied to other embodiments in which Equation 3 is used.

In operation 6-25, the terminal may acquire or receive system information (SIB2, SIB3, SIB4, and SIB5). The system information may include cell reselection priority configuration information for each RAT-specific frequency. For example, in operation 6-25, when the terminal camps on the NR cell through a cell selection procedure, the cell reselection priority configuration information for each RAT-specific frequency may be included in the system information having the following types. However, the following system information numbers and the cell reselection priority configuration information correspond to a mere embodiment of the disclosure, and the system information numbers including the cell reselection priority configuration information may change.

SIB2: cell reselection priority configuration information relating to a serving frequency (a frequency to which a currently camped-on cell belongs)

SIB3: cell reselection priority configuration information for each NR intra-frequency SIB4: cell reselection priority configuration information for each NR inter-frequency SIB5: cell reselection priority configuration information for each EUTRAN inter-RAT frequency SIB2, SIB3, SIB4, and SIB5 may include additional parameters for cell reselection.

In operation 6-30, the terminal may perform a cell reselection evaluation process. The terminal may perform cell reselection evaluation process for NR frequencies and inter-RAT frequencies broadcasted through the provided system information and cell reselection priority configuration information. The UE shall only perform cell reselection evaluation for NR frequencies and inter-RAT frequencies that are given in system information and for which the UE has a priority provided. The cell reselection evaluation process may refer to a series of procedures below:

Frequency priority application scheme (Reselection priorities handling)

Measurement rules for cell reselection

Cell reselection criteria

The frequency priority application scheme may be determined according to whether the RRC connection release message received by the terminal in operation 6-10 includes the cell reselection priority configuration information for each RAT-specific frequency and the timer value commonly applied to the RATs. An example of the scheme of determining a frequency priority according to whether the cell reselection priority configuration information for each RAT-specific frequency and the timer value commonly applied to the RATs are included is described below:

In a case in which the RRC connection release message includes one piece of cell reselection priority configuration information for each RAT-specific frequency and a timer value commonly applied to the RATs, while the timer T320 is operated, a frequency priority may be determined by ignoring the cell reselection priority configuration information for each RAT-specific frequency, the information being included in the system information acquired in operation 6-25 and by applying the cell reselection priority configuration information included in the RRC connection release message. When the timer T320 expires, a frequency priority may be determined by applying the cell reselection priority configuration information for each RAT-specific frequency, the information being included in the system information acquired in operation 6-25.

When the RRC connection release message includes neither cell reselection priority configuration information for each RAT-specific frequency nor a timer value commonly applied to the RATs, a frequency priority may be determined by applying the cell reselection priority configuration information for each RAT-specific frequency, the information being included in the system information acquired in operation 6-25.

For a predetermined reason or for minimizing the battery consumption, the terminal may perform neighbor cell measurement according to the measurement rule by applying the determined frequency priority. An example of the measurement rule is described below:

If the reception level and the reception quality of a serving cell are greater than thresholds (Srxlev>SIntraSearchP and SIntraSearchQ), the terminal may not perform NR intra-frequency measurement. Otherwise, the terminal may perform the NR intra-frequency measurement.

With respect to the NR inter-frequency or inter-RAT frequency having a higher cell reselection priority than that of the current serving cell frequency, the terminal may perform neighbor cell measurement according to the 3GPP standard document "38.133: NR; Requirements for Support of Radio Resource Management".

If the reception level and the reception quality of a serving cell are greater than thresholds (Srxlev>SnonIntraSearchP and SnonIntraSearchQ), the terminal may perform measurement for neither the NR inter-frequency having a cell reselection priority equal to or lower than that of the current serving cell frequency nor the inter-RAT frequency having a higher cell reselection frequency than that of the current serving cell. Otherwise, the terminal may perform neighbor cell measurement for the NR inter-frequency or the inter-RAT frequency having a cell reselection priority equal to or lower than the current serving cell frequency according to 3GPP standard document "38.133: NR; Requirements for Support of Radio Resource Management".

The thresholds (SIntraSearchP, SIntraSearchQ, SnonIntraSearchP, SnonIntraSearchQ) and the reception level and the reception quality of the serving cell may be acquired or derived through the system information received in operation 6-30.

Different cell reselection evaluation criteria may be applied depending on the frequency priority determined by the terminal. For example, the terminal may apply different cell reselection criteria for the following three cases:

First case: A case in which there is at least one NR frequency or inter-RAT frequency having a higher priority than that of a current serving frequency Second case: A case in which there is at least one NR frequency or inter-RAT frequency having a lower priority than that of a current serving frequency Third case: A case of a current serving frequency, or a case in which there is at least one NR inter-frequency having a priority equal to that of the current serving frequency In a case in which cell reselection evaluation criteria are applied according to the first case:

If the threshServingLowQ is broadcasted according to the system information (for example, SIB3) that is broadcasted in a serving cell, and the terminal has camped on the current serving cell for over one second, Cell reselection is performed by selecting a cell satisfying condition A.

Condition A: This corresponds to a case in which a cell in the NR or EUTRAN RAT/frequency having a higher priority satisfies Squal>ThreshX,HighQ during a TreselectionRAT period.

Otherwise, cell reselection is performed by selecting a cell in the RAT/frequency having a higher priority when the terminal has camped on the current serving cell for over one second and the corresponding cell satisfies Srxlev>ThreshX,HighP during a TreselectionRAT period.

In a case in which cell reselection evaluation criteria are applied according to the second case:
  If the threshServingLowQ is broadcasted according to the system information (for example, SIB2) that is broadcasted in a serving cell, and the terminal has camped on the current serving cell for over one second,
  Cell reselection is performed by selecting a cell satisfying condition B.
  Condition B: This corresponds to a case in which a serving cell satisfies Squal<ThreshServing,LowQ, and a cell in the NR or EUTRAN RAT/frequency having a lower priority satisfies Squal>ThreshX, LowQ during a TreselectionRAT period
  Otherwise, cell reselection is performed by selecting a cell in the RAT/frequency having a lower priority when the terminal has camped on the current serving cell for over one second and the corresponding cell satisfies Srxlev>ThreshX,LowP during a TreselectionRAT period.

In a case in which cell reselection evaluation criteria are applied according to the third case, the terminal may rank all cells satisfying cell selection criteria. That is, for all cells satisfying cell selection criteria, the terminal may derive ranks for cells according to an RSRP measurement value. The ranks of the serving cell and the neighbor cell may be obtained according to Equation 4 below:

$$Rs = Qmeas,s + Qhyst - Qoffsettemp$$

$$Rn = Qmeas,n - Qoffset - Qoffsettemp \qquad \text{Equation 4}$$

The definitions of parameters used in Equation 4 may correspond to the definitions provided in the 3GPP standard document "38.304: UE procedures in idle mode and RRC Inactive state", and the parameters may be included in the system information broadcasted by the cell. The same approach may be applied to other embodiments in which Equation 4 is used. When no rangeToBestCell is configured in the SIB2, the terminal may perform reselection by selecting the highest ranked cell. If rangeToBestCell is not configured, the UE shall perform cell reselection to the highest ranked cell. When the rangeToBestCell is configured in the SIB2, the terminal may perform reselection according to the following condition:

Condition the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them.

In any case, the terminal may perform reselection by selecting a new cell when the following conditions are satisfied:
  A case in which a new cell has a higher rank than that of a serving cell during a TreselectionRAT period
  A case in which the terminal has camped on the current serving cell for over one second When multiple cells satisfying the cell reselection criteria according to the first case, the second case, and the third case have different priorities, the terminal may perform cell reselection by prioritizing the RAT/frequency having a higher priority over the RAT/frequency having a lower priority. Cell reselection to a higher priority RAT/frequency shall take precedence over a lower priority RAT/frequency, if multiple cells of different priorities fulfil the cell reselection criteria. In a case in which the cell selection is performed according to the first case or the second case, when multiple cells satisfy the cell reselection criteria, the terminal may perform cell reselection by selecting the highest ranked cell from among cells in the frequency(ies) having the highest priority. Parameters applied to the cell reselection criteria may be included in the system information received in operation 6-25.

In operation 6-35, the terminal in the RRC idle mode or the RRC inactive mode may perform cell reselection by selecting a new cell through operation 6-30.

Figure 7:
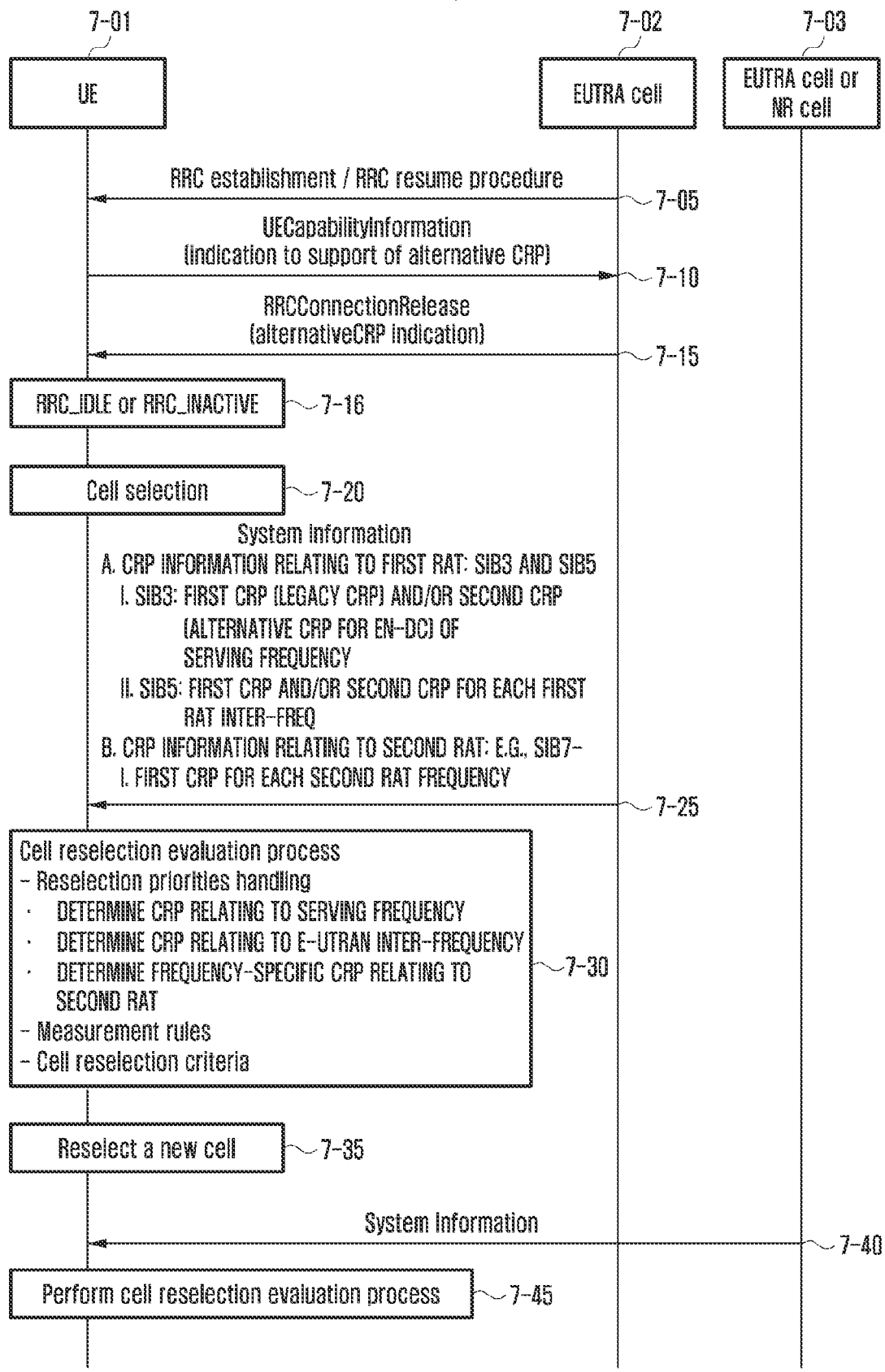
FIG. 7 illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

FIG. 7 illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

Referring to FIG. 7, an LTE base station may broadcast multiple elements of cell reselection priority (CRP) configuration information for each RAT-specific frequency through system information. For example, the LTE base station may broadcast two pieces of cell reselection priority configuration information for an E-UTRA frequency.

The two elements of cell reselection priority configuration information may refer to an E-UTRA frequency (carrierFreq) and two cell reselection priority values mapped to the E-UTRA frequency. The first cell reselection priority value may be referred to as a first CRP or a legacy CRP, and the second cell reselection priority value may be referred to as a second CRP or an alternative CRP.

The terminal may perform a cell reselection procedure based on the two cell reselection priority values. Each cell reselection priority value may be determined based on at least one of the cellReselectionPriority and the cellReselectionSubPriority. For example, each cell reselection priority value may be derived based on the cellReselectionPriority (if broadcast)+ cellReselectionSubPriority (if broadcast).

With respect to each cell reselection priority value, the cellReselectionPriority may have an integer value, and the cellReselectionSubPriority may have a decimal value. A frequency having a higher frequency priority value may have a higher cell reselection priority.

The reason an LTE base station broadcasts multiple cell reselection priority values for each frequency is to perform a cell reselection procedure by selectively applying a particular cell reselection priority value for each frequency according to terminal capability. For example, with respect to the LTE frequency supporting particular (NG)EN-DC, the base station may control a terminal supporting only LTE to have a lower cell reselection priority and a terminal supporting (NG)EN-DC to have a higher cell reselection priority so as to effectively manage a frequency.

Referring to FIG. 7, a terminal 7-01 may be converted into an RRC-connected mode (RRC-CONNECTED) through an RRC establishment procedure or an RRC resume procedure 7-05 with an LTE base station 7-02.

In operation 7-10, the terminal in the RRC-connected mode may transmit a UECapability Information message to the base station 7-02. The message may include at least one of the following information:
  An indicator indicating whether to support en-DC
  An indicator indicating whether to support ng-en-dc
  NR band information supportable by terminal in (NG)en-dc
  An indicator indicating that among multiple pieces of cell reselection priority configuration information for each RAT-specific frequency, the information being broadcasted through the system information, a particular element of cell reselection priority configuration information is applicable according to the configuration of the base station (or an indicator indicating that an alternative CRP is supported: indication to support of alternative CRP)

For example, based on the indicator, the base station may configure an RRC connection release message with an indicator (an alternative CRP indicator) or include the indicator in the RRC connection release message indicating that the terminal supporting (NG)EN-DC is to perform cell reselection by applying a particular piece of cell reselection priority configuration information for each E-UTRA frequency from the system information. The (NG)EN-DC terminal for which the alternative CRP indicator is configured may perform cell reselection based on a newly defined alternative CRP (or a second CRP) among two cell reselection priority values for each EUTRA frequency, the values being included in the system information. Additionally, a new timer (e.g., Txxx) value applicable to the alternative CRP (or the second CRP) may be included. When the RRC connection release message includes the new timer (Txxx) value, the terminal may operate the timer Txxx by using the corresponding timer Txxx value. The terminal may perform cell reselection only when the timer Txxx is operated, by applying the newly defined alternative CRP (or the second CRP) among two cell reselection priority values for each EUTRA frequency, the values being included in the system information. When the timer Txxx expires, the terminal may remove the alternative CRP indicator configured through the RRC connection release message. Alternatively, the terminal may omit, in the UECapabilityInformation, the indication to support of alternative CRP. When the alternative CRP indicator is configured in the RRC connection release message, the terminal supporting (NG)EN-DC can always support the alternative CRP broadcasted through the system information, and thus whether to support the alternative CRP may not be separately reported to the UECapability Information.

The base station 7-02 may transmit the RRC connection release message to the terminal 7-01 in operation 7-15 so that the terminal in the RRC-connected mode can transition to an RRC idle mode or an RRC inactive mode in operation 7-16. The RRC connection release message may include the alternative CRP indicator. Alternatively, the RRC connection release message may include a new timer (Txxx) value to apply a validity time in which the alternative CRP indicator is applied. When the RRC connection release message includes the timer Txxx value, the terminal may operate the timer Txxx by using the corresponding timer Txxx value, and may determine a frequency priority according to the alternative CRP indicator only when the corresponding timer Txxx is in operation.

In operation 7-20, the terminal having transitioned to the RRC idle mode or the RRC inactive mode may perform a cell selection procedure.

In operation 7-25, the terminal may receive system information from a cell camped-on through cell selection. The system information may include parameters for cell reselection. A first RAT may be referred to as E-UTRA, and a second RAT may be referred to as an RAT other than the E-UTRA (for example, GERAN, UTRA-FDD, UTRA-TDD, HRPD, 1×RTT, or NR). Previously defined cell reselection priority information for each RAT-specific frequency may be referred to as a legacy CRP or a first CRP, and additionally defined and introduced cell reselection priority information for each RAT-specific frequency may be referred to as a second CRP or an alternative CRP. The base station 7-02 may broadcast cell reselection priority information for each RAT-specific frequency among the parameters for cell reselection as follows. The following system information number corresponds to one embodiment of the disclosure and may change.

CRP information for first RAT: SIB3 and SIB 5
SIB3 may include serving frequency CRP information. The base station may broadcast only the first CRP (the legacy CRP), only the second CRP, or both the first CRP and the second CRP (the alternative CRP for EN-DC) for the serving frequency.
Through SIB5, only the first CRP, only the second CRP, or both the first CRP and the second CRP for each first RAT inter-frequency may be broadcasted.
CRP information for second RAT: SIB 6, SIB7, SIB8, and SIB 24
A first CRP for each second RAT frequency, such as SIB6 including the legacy CRP for each UTRA frequency and the SIB24 including the legacy CRP for each NR frequency In the above description, an example in that CRP information is included in multiple system information numbers is described, but each element of CRP information or all of the CRP information may be included in a single element of system information.

The system information may include the maximum two CRPs for each E-UTRAN frequency in the case of the first RAT, and may include one CRP for each frequency in the case of the second RAT. This is only for convenience of description and the system information may include multiple CRPs for each RAT frequency in the actual case. When the system information includes multiple CRPs for each RAT-specific frequency, the base station may indicate, to the terminal through an indicator (for example, one or multiple alternative CRP(s)), a CRP to be applied.

In operation 7-30, the terminal may perform a cell reselection evaluation process. The terminal may perform a cell reselection evaluation process for EUTRA frequencies and inter-RAT frequencies broadcasted through the provided system information and frequency priority configuration information. The UE shall only perform cell reselection evaluation for E-UTRAN frequencies and inter-RAT frequencies that are given in system information and for which the UE has a priority provided. The cell reselection evaluation process may refer to a series of procedures below:
Frequency priority application scheme (Reselection priorities handling)
Measurement rules for cell reselection
Cell reselection criteria
The terminal in the RRC idle mode or the RRC inactive mode may apply the frequency priority application scheme separately for the first RAT and the second RAT. An example of the scheme of determining frequency priorities separately for the first RAT and the second RAT is described below:
When the terminal corresponds to an (NG)EN-DC-capable terminal and the RRC connection release message has an alternative CRP indicator configured therein, the terminal may determine whether the CRP information is included in SIB3 for the current serving frequency. That is, when SIB3 includes both the first CRP and the second CRP, or the second CRP only, the terminal may apply the second CRP included in SIB3 for the current serving frequency so as to determine a frequency priority. When SIB3 includes the first CRP only, the terminal may apply the first CRP included in SIB3 for the current serving frequency so as to determine a frequency priority. Alternatively, when SIB3 includes the first CRP only, the terminal may determine that there is no cell reselection priority information for the current serving frequency. When the terminal is configured with the alternative CRP through the RRC connection release message, it may mean that the terminal applies no first CRP or that the current serving frequency is configured to have the lowest frequency priority.

When the terminal corresponds to an (NG)EN-DC-capable terminal and the RRC connection release message has an alternative CRP indicator configured therein, the terminal may apply CRP configuration information included in SIB5 for each E-UTRA inter-frequency. For example, when SIB5 includes both the first CRP and the second CRP, or only the second CRP for a particular E-UTRA inter-frequency, the terminal may apply the second CRP included in SIB5 for the corresponding E-UTRA inter-frequency so as to determine a frequency priority. When SIB5 includes only the first CRP for a particular E-UTRA inter-frequency, the terminal may apply the first CRP included in SIB5 for the corresponding E-UTRA inter-frequency so as to determine a frequency priority. Alternatively, when SIB5 includes only the first CRP for a particular E-UTRA inter-frequency, the terminal may determine that there is no cell reselection priority information for the corresponding E-UTRA inter-frequency. When the terminal is configured with the alternative CRP through the RRC connection release message, it may mean that the terminal applies no first CRP or that the corresponding E-UTRA inter-frequency is configured to have the lowest frequency priority.

When the terminal corresponds to an (NG)EN-DC-capable terminal and the RRC connection release message has no alternative CRP indicator configured therein, the terminal may determine whether the CRP information is included in SIB3 for the current serving frequency. When SIB3 includes both the first CRP and the second CRP, or the first CRP only, the terminal may apply the first CRP included in SIB3 for the current serving frequency so as to determine a frequency priority. When SIB3 includes the second CRP only, the terminal may determine that there is no cell reselection priority information for the current serving frequency. When the terminal is not configured with the alternative CRP through the RRC connection release message, it may mean that the terminal applies no second CRP or that the current serving frequency is configured to have the lowest frequency priority. Alternatively, in a case in which only the second CRP is broadcasted through SIB3, even though the terminal is not configured with the alternative CRP through the RRC connection release message, the terminal may apply the second CRP to determine a frequency priority. This is to apply the second CRP and perform a cell reselection evaluation process also for the serving frequency.

When the terminal corresponds to an (NG)EN-DC-capable terminal and the RRC connection release message has no alternative CRP indicator configured therein, the terminal may apply CRP configuration information included in SIB5 for each E-UTRA inter-frequency. For example, when SIB5 includes both the first CRP and the second CRP, or only the first CRP for a particular E-UTRA inter-frequency, the terminal may apply the first CRP included in SIB5 for the corresponding E-UTRA inter-frequency so as to determine a frequency priority. When SIB5 includes only the second CRP for a particular E-UTRA inter-frequency, the terminal may determine that there is no cell reselection priority information for the corresponding E-UTRA inter-frequency. When the terminal is not configured with the alternative CRP through the RRC connection release message, this may indicate that the terminal applies no second CRP or that the E-UTRA inter-frequency is configured to have the lowest frequency priority. Alternatively, in a case in which only the second CRP is broadcasted through SIB3, even though the terminal is not configured with the alternative CRP through the RRC connection release message, the terminal may apply the second CRP to determine a frequency priority. This is to apply the second CRP and perform a cell reselection evaluation process also for the E-UTRA inter-frequency.

For the second RAT, the terminal may apply the first CRP included in the system information for each frequency, regardless of whether the RRC connection release message is configured with the alternative CRP, so as to determine a frequency priority.

When the RRC connection release message includes a timer Txxx value, the terminal may apply the second CRP only when the timer Txxx is in operation so as to determine the frequency priority.

The terminal may perform neighbor cell measurement according to the measurement rule by applying the determined frequency priority for a predetermined reason or for minimizing the battery consumption. An example of the measurement rule is described below.

Different cell reselection evaluation criteria may be applied depending on the frequency priority determined by the terminal. This follows the above-described embodiment.

According to an embodiment of the disclosure, when the base station broadcasts the alternative CRP (or the second CRP) for each E-UTRA frequency through the system information, a PCI list or cell reselection parameter (for example, q-OffsetCell) values for the corresponding frequency may also be separately broadcasted through the system information. The terminal may perform a cell reselection procedure based on at least one of the PCI list and the cell reselection parameter values separately provided.

In operation 7-35, the terminal in the RRC idle mode or the RRC inactive mode may perform reselection by selecting a new cell 7-03 through operation 7-30. When the inter-RAT cell is reselected, the terminal may also allow autonomous release of the configured alternative CRP indicator. This is because the inter-RAT cell may not support the alternative CRP. When the alternative CRP indicator is released, the timer Txxx in operation may stop.

In operation 7-40, the terminal may acquire system information including a cell reselection parameter from the cell 7-03 selected as cell reselection.

In operation 7-45, the terminal may perform, based on the received system information, the cell reselection evaluation process described in operation 7-30. In this case, with respect to the cell 7-03 selected as cell reselection, when the system information includes only the frequency-specific first CRP for the first RAT, the terminal may perform operation 7-30 by applying the first CRP for the first RAT while maintaining the alternative CRP indicator configured through the RRC connection release message in operation 7-15, so as to perform a cell reselection process. The reason the alternative CRP indicator is maintained is to apply, to the cell reselection evaluation process, system information through which the second CRP is provided in at least one frequency for the first RAT in a cell newly selected later as cell reselection. Alternatively, when the system information includes only the frequency-specific first CRP for the first RAT, the alternative CRP indicator configured through the RRC connection release message in operation 7-15 may be removed. When the alternative CRP indicator is removed, the terminal may perform the cell reselection process by applying the first CRP for the first RAT even though the second CRP is broadcasted in at least one frequency for the first RAT in a cell newly selected later as cell reselection.

An embodiment of the disclosure describes (NG)EN-DC for convenience of description, but is not limited to (NG) EN-DC and may be applied in a similar manner to NE-DC and NR-DC.

A new timer Txxx may be the existing timer T320. That is, the timer T320 value and the timer T320 may be applied to the timer Txxx value and the timer Txxx and the same may be configured together with the alternative CRP indicator through the RRC connection release message. When the RRC connection release message includes the timer Txxx value, the terminal may operate the timer Txxx by using the timer Txxx value, and may determine a frequency priority according the alternative CRP indicator only when the corresponding timer Txxx is in operation.

FIGS. 8A and 8B illustrate a process of performing a cell reselection procedure by a terminal in an RRC inactive mode (RRC_INACTIVE) or an RRC idle mode (RRC_IDLE) in the next-generation mobile communication system according to an embodiment of the disclosure.

Referring to FIG. 8A, a terminal may be converted into an RRC-connected mode (RRC-CONNECTED) through an RRC establishment procedure or an RRC resume procedure 8-05 with an LTE base station.

In operation 8-10, the terminal in the RRC-connected mode may transmit a UECapability Information message to the base station. The message may include at least one of the following information:

An indicator indicating whether to support en-DC
An indicator indicating whether to support ng-en-dc
NR band information supportable by terminal in (NG)en-dc
An indicator indicating that among multiple pieces of cell reselection priority configuration information for each RAT-specific frequency, the information being broadcasted through the system information, a particular element of cell reselection priority configuration information is applicable according to the configuration of the base station, or an indicator indicating that an alternative CRP is supported: indication to support of alternative CRP. For example, based on the indicator, the base station may configure an RRC connection release message with an indicator (an alternative CRP indicator) indicating that the terminal supporting (NG) EN-DC is to perform cell reselection based on a particular element of cell reselection priority configuration information among multiple elements of cell reselection priority configuration information for each E-UTRA frequency from the system information. The (NG)EN-DC terminal for which the alternative CRP indicator is configured may perform cell reselection based on a newly defined alternative CRP among two cell reselection priority values for each EUTRA frequency, the values being included in the system information. Additionally, a new timer (e.g., Txxx) value applicable to the alternative CRP (or the second CRP) may be included. When the RRC connection release message includes the new timer (Txxx) value, the terminal may operate the timer Txxx by using the corresponding timer Txxx value. The terminal may perform cell reselection only when the timer Txxx is in operation by using the newly defined alternative CRP (or the second CRP) among two cell reselection priority values for each EUTRA frequency, the values being included in the system information. When the timer Txxx expires, the terminal may remove the alternative CRP indicator configured through the RRC connection release message. Alternatively, the terminal may omit, in the UECapabilityInformation, the indication to support of alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

In operation 8-15, the base station may transmit the RRC connection release message to the terminal.

In operation 8-20, the terminal may determine whether the received RRC connection release message includes an alternative CRP indicator. Alternatively, the RRC connection release message may include a new timer (for example, Txxx) value to apply a validity time in which the alternative CRP indicator is applied. When the RRC connection release message includes the timer Txxx value, the terminal may operate the timer Txxx by using the corresponding timer Txxx value, and may perform a cell reselection procedure by applying the newly introduced and defined alternative CRP (or the second CRP) according to the alternative CRP indicator only when the corresponding timer Txxx is in operation.

In operation 8-25, when the received RRC connection release message has no alternative CRP indicator configured therein, or the timer Txxx expires or stops, the terminal may perform the cell selection procedure or the cell reselection procedure described above with reference to FIG. 5. The terminal may transition to the RRC idle mode or the RRC inactive mode according to whether there is inactive configuration information (rrc-InacitveConfig) which can be included in the received RRC connection release message, so as to perform the cell selection procedure or the cell reselection procedure.

In operation 8-30, when the received RRC connection release message has an alternative CRP indicator configured therein, the terminal may store and apply the alternative CRP indicator. When the RRC connection release message includes a new timer (e.g., Txxx) value, the terminal may operate the corresponding timer Txxx by using the timer Txxx value. The terminal may transition to the RRC idle mode or the RRC inactive mode according to whether there is inactive configuration information (rrc-InacitveConfig) which can be included in the received RRC connection release message, so as to perform the cell selection procedure.

In operation 8-35, the terminal in the RRC idle mode or the RRC inactive mode may receive or acquire system information from the camped-on cell. The cell may broadcast two CRPs for each E-UTRA frequency and broadcast one CRP for each inter-RAT frequency through the system information. For convenience of description, the legacy CRP (or the first CRP) is described as the existing cell reselection priority value, and the alternative CRP (or the second CRP) is described as the newly introduced and defined cell reselection priority value.

Referring to FIG. 8B, in operation 8-40, the terminal may determine whether the received system information includes the alternative CRP for at least one E-UTRA frequency.

In operation 8-45, when the received system information includes the alternative CRP for at least one E-UTRA frequency, the terminal may determine the alternative CRP broadcasted for each E-UTRA frequency as a cell reselection priority value. When the alternative CRP for each E-UTRA frequency is not broadcasted through the system information, the terminal may determine the legacy CRP broadcasted for each E-UTRA frequency as the cell reselection priority value. The terminal may determine the legacy CRP broadcasted through the system information for each inter-RAT frequency as the cell reselection priority value.

In operation 8-47, when the received system information includes only the legacy CRP for each RAT-specific frequency, the terminal may determine the legacy CRP broadcasted through the system information for each RAT-specific frequency as the cell reselection priority value.

In operation 8-50, the terminal may perform cell reselection by using the determined cell reselection priority value.

In operation 8-55, the terminal may determine whether the cell selected as cell reselection is a suitable cell or an acceptable cell. The suitable cell and the acceptable cells are defined as follows:

Suitable Cell:

A cell is considered as suitable if the following conditions are fulfilled:
  The cell is part of either the selected PLMN or the registered PLMN or PLMN of the Equivalent PLMN list;
  The cell selection criteria are fulfilled
  According to the latest information provided by NAS:
  The cell is not barred
  The cell is part of at least one TA that is not part of the list of "Forbidden Tracking Areas", which belongs to a PLMN that fulfils the first bullet above.

Acceptable Cell:

A cell is considered as acceptable if the following conditions are fulfilled:
  The cell is not barred
  The cell selection criteria are fulfilled When the cell selected by the terminal as cell reselection is a suitable cell in operation 8-55, the terminal may continuously perform the cell reselection procedure by maintaining the alternative CRP indicator configured through the RRC connection release message. For example, the terminal may perform the cell reselection procedure starting from operation 8-35. When the cell selected by the terminal as cell reselection is an acceptable cell in operation 8-55, the terminal may release the alternative CRP indicator configured through the RRC connection release message and may perform the cell reselection procedure in operation 8-60. The terminal may determine, as the cell reselection priority value, the legacy CRP for each RAT-specific frequency, provided through the system information broadcasted by the cell selected as cell reselection, so as to perform the cell reselection procedure. When the timer Txxx is in operation, the timer Txxx may stop.

Figure 9A:
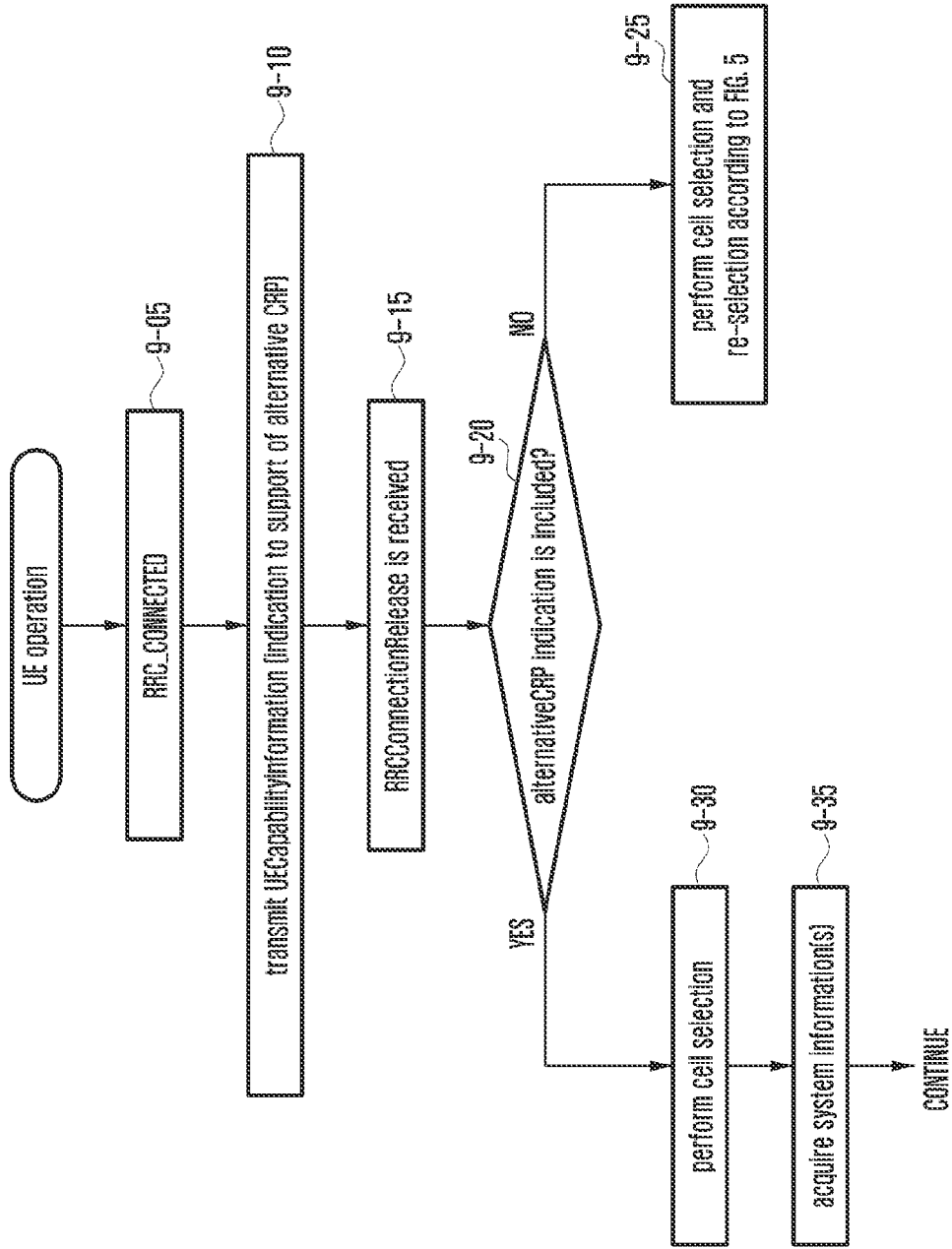
FIG. 9A illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.
Figure 9B:
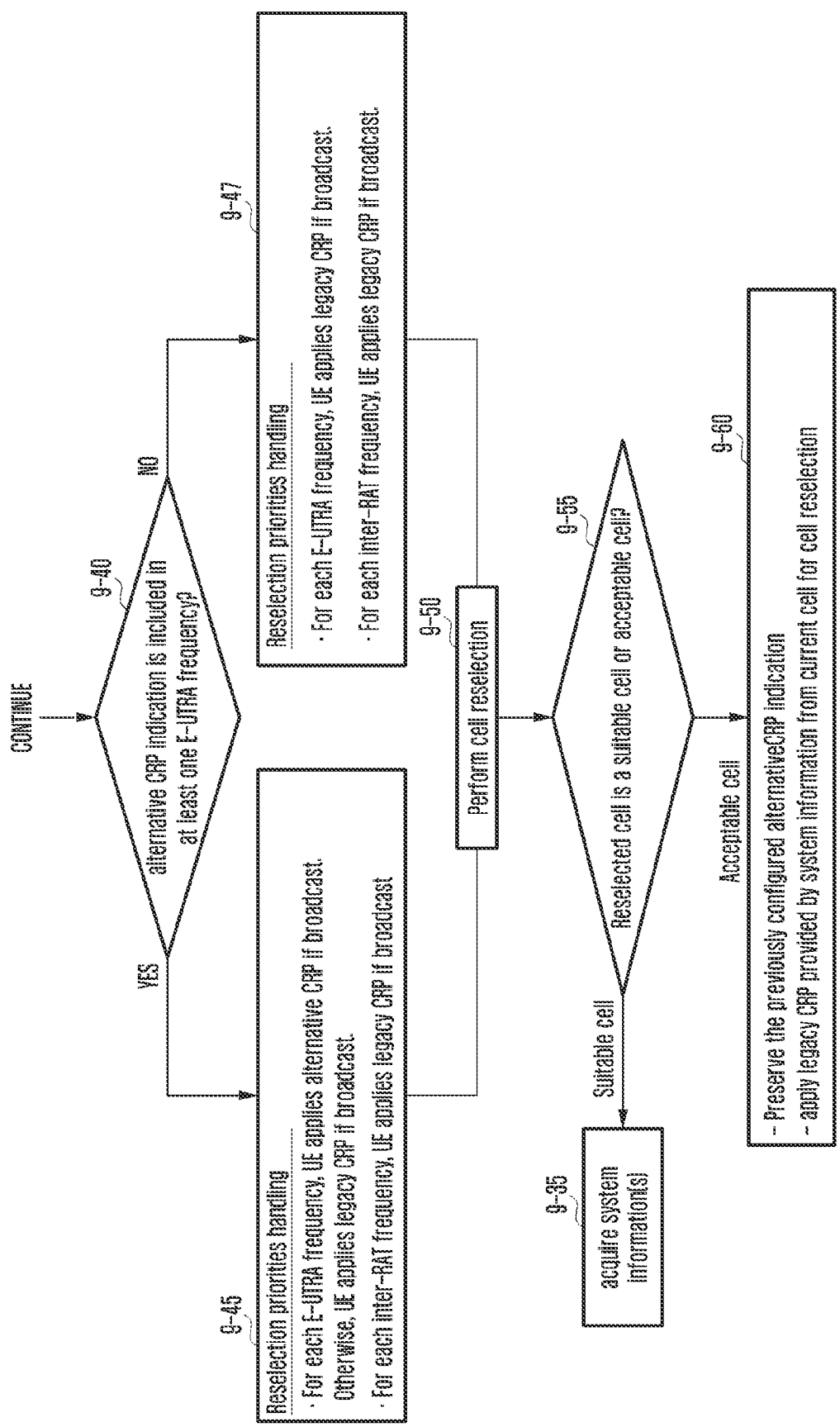
FIG. 9B illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

FIGS. 9A and 9B illustrate a process of performing a cell reselection procedure by a terminal in an RRC inactive mode (RRC_INACTIVE) or an RRC idle mode (RRC_IDLE) in the next-generation mobile communication system according to an embodiment of the disclosure.

Referring to FIG. 9A, a terminal may be converted into an RRC-connected mode (RRC-CONNECTED) through an RRC establishment procedure or an RRC resume procedure 9-05 with an LTE base station.

In operation 9-10, the terminal in the RRC-connected mode may transmit a UECapability Information message to the base station. The message may include at least one of the following information:
  An indicator indicating whether to support en-DC
  An indicator indicating whether to support ng-en-dc
  NR band information supportable by terminal in (NG)en-dc
  An indicator indicating that among multiple elements of cell reselection priority configuration information for each RAT-specific frequency, the information being broadcasted through the system information, a particular element of cell reselection priority configuration information is applicable according to the configuration of the base station (or an indicator indicating that an alternative CRP is supported: indication to support of alternative CRP)

For example, based on the indicator, the base station may configure an RRC connection release message with an indicator (an alternative CRP indicator) indicating that the terminal supporting (NG)EN-DC is to perform cell reselection based on a particular element of cell reselection priority configuration information among multiple cell reselection priority configuration information for each E-UTRA frequency from the system information. The (NG)EN-DC terminal for which the alternative CRP indicator is configured may perform cell reselection based on a newly defined alternative CRP among two cell reselection priority values for each EUTRA frequency, the values being included in the system information. Alternatively, the terminal may not include, in the UECapability Information, the indication to support alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

In operation 9-15, the base station may transmit the RRC connection release message to the terminal.

In operation 9-20, the terminal may determine whether the received RRC connection release message includes an alternative CRP indicator. Alternatively, the RRC connection release message may include a new timer (e.g., Txxx) value to apply a validity time in which the alternative CRP indicator is applied.

In operation 9-25, when the received RRC connection release message has no alternative CRP indicator configured therein, or the timer Txxx expires or stops, the terminal may perform the cell selection procedure or the cell reselection procedure described above with reference to FIG. 5. The terminal may transition to the RRC idle mode or the RRC inactive mode according to whether there is inactive configuration information (rrc-InacitveConfig) which can be included in the received RRC connection release message, so as to perform the cell selection procedure or the cell reselection procedure.

In operation 9-30, when the received RRC connection release message has an alternative CRP indicator configured therein, the terminal may store and apply the alternative CRP indicator. When the RRC connection release message includes a new timer (for example, Txxx) value, the terminal may operate the corresponding timer Txxx by using the timer Txxx value. The terminal may transition to the RRC idle mode or the RRC inactive mode according to whether there is inactive configuration information (rrc-InacitveConfig) which can be included in the received RRC connection release message, so as to perform the cell selection procedure.

In operation 9-35, the terminal in the RRC idle mode or the RRC inactive mode may receive or acquire system information from the camped-on cell. The cell may broadcast two CRPs for each E-UTRA frequency and broadcast one CRP for each inter-RAT frequency through the system information. For convenience of description, the legacy CRP (or the first CRP) is described as the existing cell reselection priority value, and the alternative CRP (or the second CRP) is described as the newly introduced and defined cell reselection priority value.

Referring to FIG. 9B, in operation 9-40, the terminal may determine whether the received system information includes the alternative CRP for at least one E-UTRA frequency.

In operation 9-45, when the received system information includes the alternative CRP for at least one E-UTRA frequency, the terminal may determine the alternative CRP broadcasted for each E-UTRA frequency as a cell reselection priority value. When the alternative CRP for each E-UTRA frequency is not broadcasted through the system information, the terminal may determine the legacy CRP broadcasted for each E-UTRA frequency as the cell reselection priority value. The terminal may determine the legacy CRP broadcasted through the system information for each inter-RAT frequency as the cell reselection priority value.

In operation 9-47, when the received system information includes only the legacy CRP for each RAT-specific frequency, the terminal may determine the legacy CRP broadcasted through the system information for each RAT-specific frequency as the cell reselection priority value.

In operation 9-50, the terminal may perform cell reselection by using the determined cell reselection priority value.

In operation 9-55, the terminal may determine whether the cell selected as cell reselection is a suitable cell or an acceptable cell. The suitable cell and the acceptable cells are defined as follows:

Suitable Cell:
A cell is considered as suitable if the following conditions are fulfilled:
The cell is part of either the selected PLMN or the registered PLMN or PLMN of the Equivalent PLMN list;
The cell selection criteria are fulfilled
According to the latest information provided by NAS:
The cell is not barred
The cell is part of at least one TA that is not part of the list of "Forbidden Tracking Areas", which belongs to a PLMN that fulfils the first bullet above.

Acceptable Cell:
A cell is considered as acceptable if the following conditions are fulfilled:
The cell is not barred
The cell selection criteria are fulfilled When the cell selected by the terminal as cell reselection is a suitable cell in operation 9-55, the terminal may continuously perform the cell reselection procedure by maintaining the alternative CRP indicator configured through the RRC connection release message. For example, the terminal may perform the cell reselection procedure starting from operation 9-35.

When the cell selected by the terminal as cell reselection is an acceptable cell in operation 9-55, the terminal may perform the cell reselection procedure by maintaining the alternative CRP indicator configured through the RRC connection release message and determining, as the cell reselection priority value, the legacy CRP for each RAT-specific frequency, which is provided through the system information broadcasted in the cell selected as cell reselection, in operation 9-60. The reason the alternative CRP indicator is maintained is that when the terminal reselects a suitable cell later, the terminal is to perform cell reselection by determining, as the cell reselection priority value, the alternative CRP for each E-UTRA frequency, which is provided through the system information in the reselected suitable cell. That is, when the terminal reselects the suitable cell later in operation 9-60, the terminal may perform the cell reselection procedure starting from operation 9-35. When the alternative CRP indicator is maintained, the timer Txxx in operation may continue to be operated.

In operation 9-50, while the terminal performs the cell reselection procedure, the terminal may be in any-cell-selection state. In this case, the terminal may maintain or release the configured alternative CRP indicator.

Figure 10A:
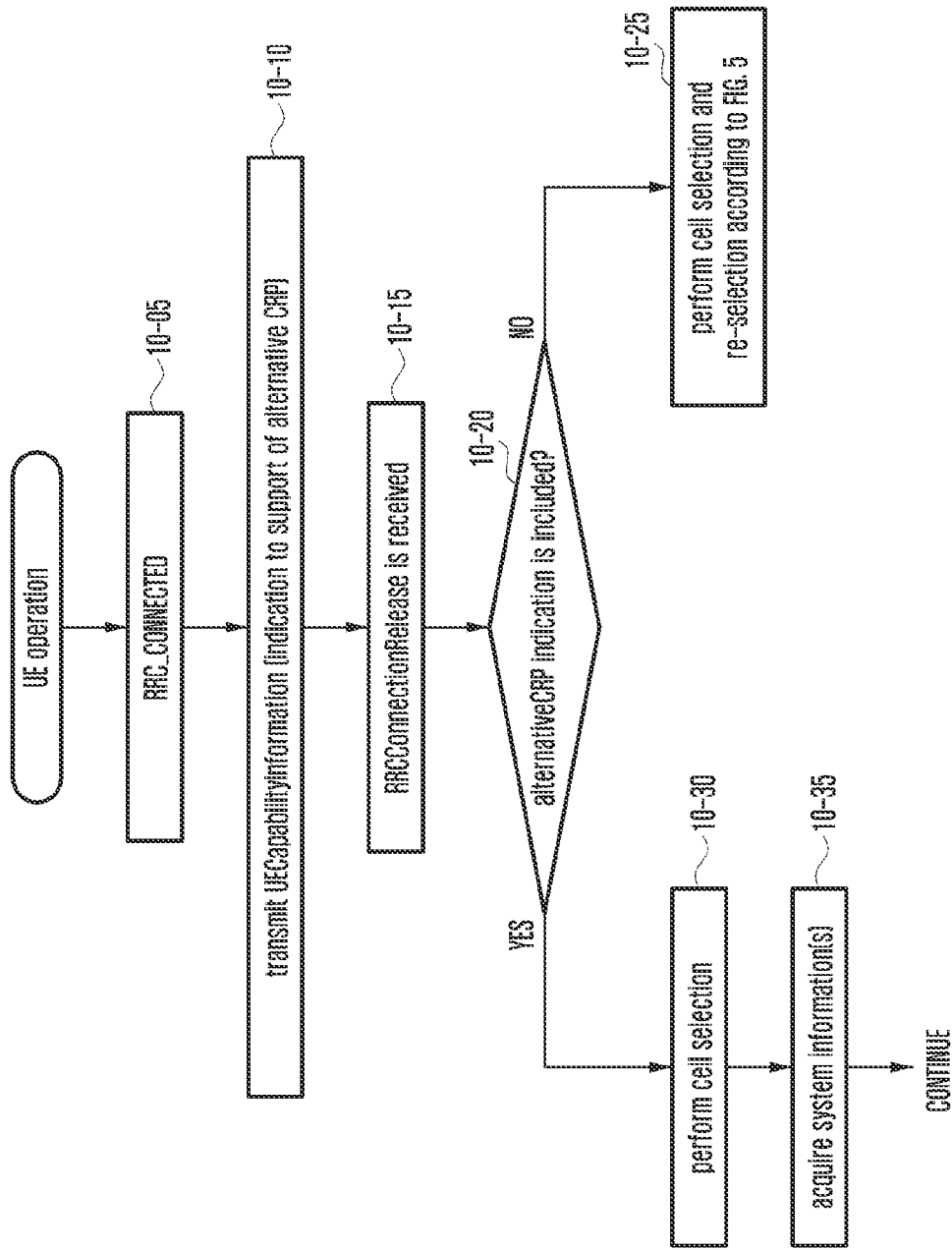
FIG. 10A illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.
Figure 10B:
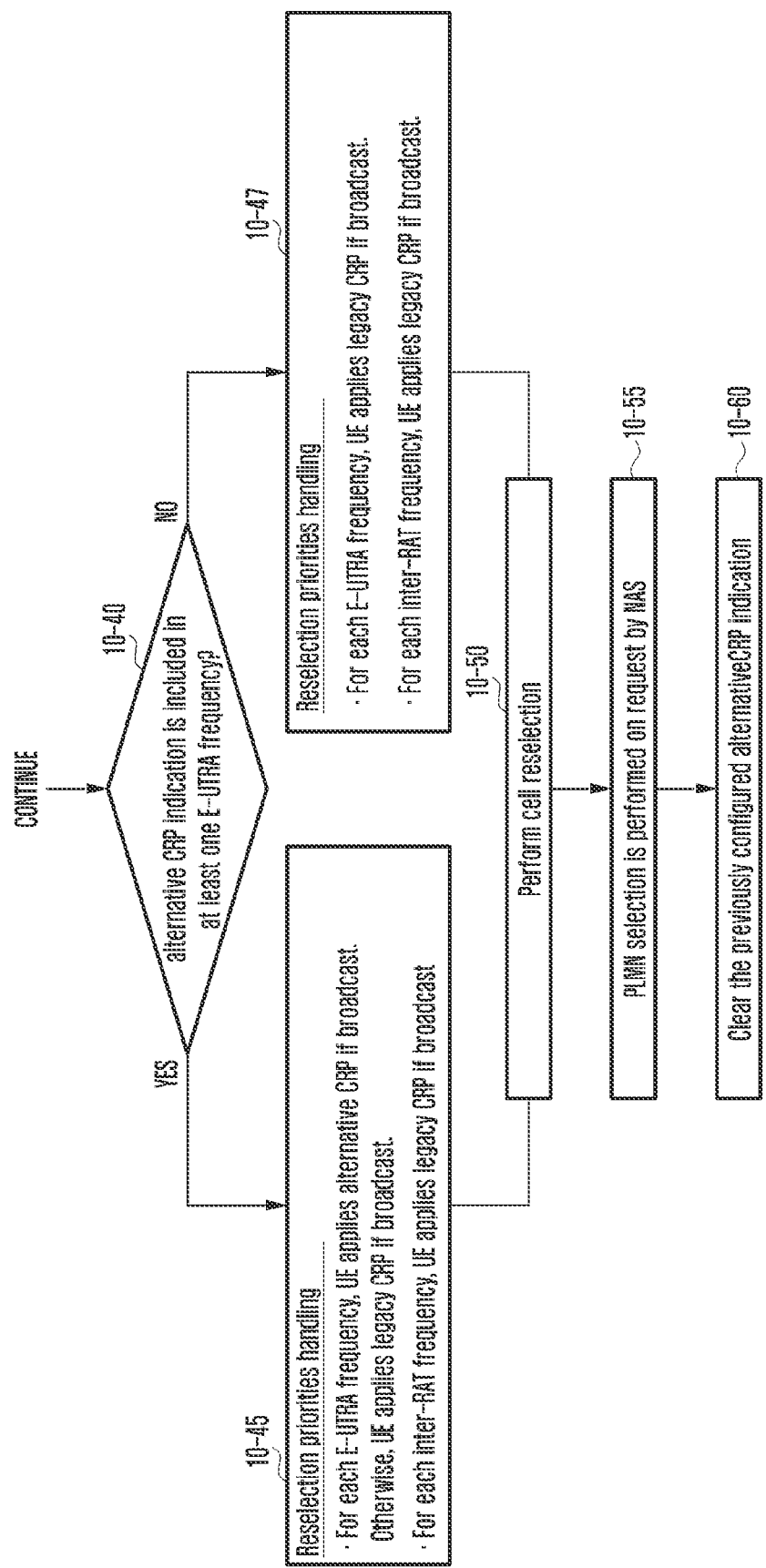
FIG. 10B illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

FIGS. 10A and 10B illustrate a process of performing a cell reselection procedure by a terminal in an RRC inactive mode (RRC_INACTIVE) or an RRC idle mode (RRC_IDLE) in the next-generation mobile communication system according to an embodiment of the disclosure.

Referring to FIG. 10A, a terminal may be entered into an RRC-connected mode (RRC-CONNECTED) through an RRC establishment procedure or an RRC resume procedure 10-05 with an LTE base station.

In operation 10-10, the terminal in the RRC-connected mode may transmit a UECapabilityInformation message to the base station. The message may include at least one of the following information:

An indicator indicating whether to support en-DC
An indicator indicating whether to support ng-en-dc
NR band information supportable by terminal in (NG)en-dc
An indicator indicating that among multiple elements of cell reselection priority configuration information for each RAT-specific frequency, the information being broadcasted through the system information, a particular element of cell reselection priority configuration information is applicable according to the configuration of the base station (or an indicator indicating that an alternative CRP is supported: indication to support of alternative CRP)

For example, based on the indicator, the base station may configure an RRC connection release message with an indicator (an alternative CRP indicator) indicating that the terminal supporting (NG)EN-DC is to perform cell reselection based on a particular piece of cell reselection priority configuration information among multiple pieces of cell reselection priority configuration information for each E-UTRA frequency from the system information. The (NG) EN-DC terminal for which the alternative CRP indicator is configured may perform cell reselection based on a newly defined alternative CRP among two cell reselection priority values for each EUTRA frequency, the values being included in the system information. Alternatively, the terminal may omit, in the UECapabilityInformation, the indication to support of alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

In operation 10-15, the base station may transmit the RRC connection release message to the terminal.

In operation 10-20, the terminal may determine whether the received RRC connection release message includes an alternative CRP indicator. Alternatively, the RRC connection release message may include a new timer (for example, Txxx) value to apply a validity time in which the alternative CRP indicator is applied.

In operation 10-25, when the received RRC connection release message has no alternative CRP indicator configured therein, or the timer Txxx expires or stops, the terminal may perform the cell selection procedure or the cell reselection procedure described above with reference to FIG. 5. The terminal may transition to the RRC idle mode or the RRC inactive mode according to whether there is inactive configuration information (rrc-InacitveConfig) which can be included in the received RRC connection release message, so as to perform the cell selection procedure or the cell reselection procedure.

In operation 10-30, when the received RRC connection release message has an alternative CRP indicator configured therein, the terminal may store and apply the alternative CRP indicator. When the RRC connection release message includes a new timer (for example, Txxx) value, the terminal may operate the corresponding timer Txxx by using the timer Txxx value. The terminal may transition to the RRC idle mode or the RRC inactive mode according to whether there is inactive configuration information (rrc-InacitveConfig) which can be included in the received RRC connection release message, so as to perform the cell selection procedure.

In operation 10-35, the terminal in the RRC idle mode or the RRC inactive mode may receive or acquire system information from the camped-on cell. The cell according to the embodiment may broadcast two CRPs for each E-UTRA frequency and broadcast one CRP for each inter-RAT frequency through the system information. For convenience of description, the legacy CRP (or the first CRP) is described as the existing cell reselection priority value, and the alternative CRP (or the second CRP) is described as the newly introduced and defined cell reselection priority value.

Referring to FIG. 10B, in operation 10-40, the terminal may determine whether the received system information includes the alternative CRP for at least one E-UTRA frequency.

In operation 10-45, when the received system information includes the alternative CRP for at least one E-UTRA frequency, the terminal may determine the alternative CRP broadcasted for each E-UTRA frequency as a cell reselection priority value. When the alternative CRP for each E-UTRA frequency is not broadcasted through the system information, the terminal may determine the legacy CRP broadcasted for each E-UTRA frequency as the cell reselection priority value. The terminal may determine the legacy CRP broadcasted through the system information for each inter-RAT frequency as the cell reselection priority value.

In operation 10-47, when the received system information includes only the legacy CRP for each RAT-specific frequency, the terminal may determine the legacy CRP broadcasted through the system information for each RAT-specific frequency as the cell reselection priority value.

In operation 10-50, the terminal may perform cell reselection by using the determined cell reselection priority value.

In operation 10-55, the terminal may perform an PLMN selection procedure. For example, the terminal may perform the PLMN selection procedure upon the request from an NAS-layer device.

In operation 10-60, the terminal may release the alternative CRP indicator configured through the RRC connection release message. The reason the alternative CRP indicator is released is for the terminal to select another network through PLMN selection. When the timer Txxx is in operation, the timer Txxx may stop.

Figure 11A:
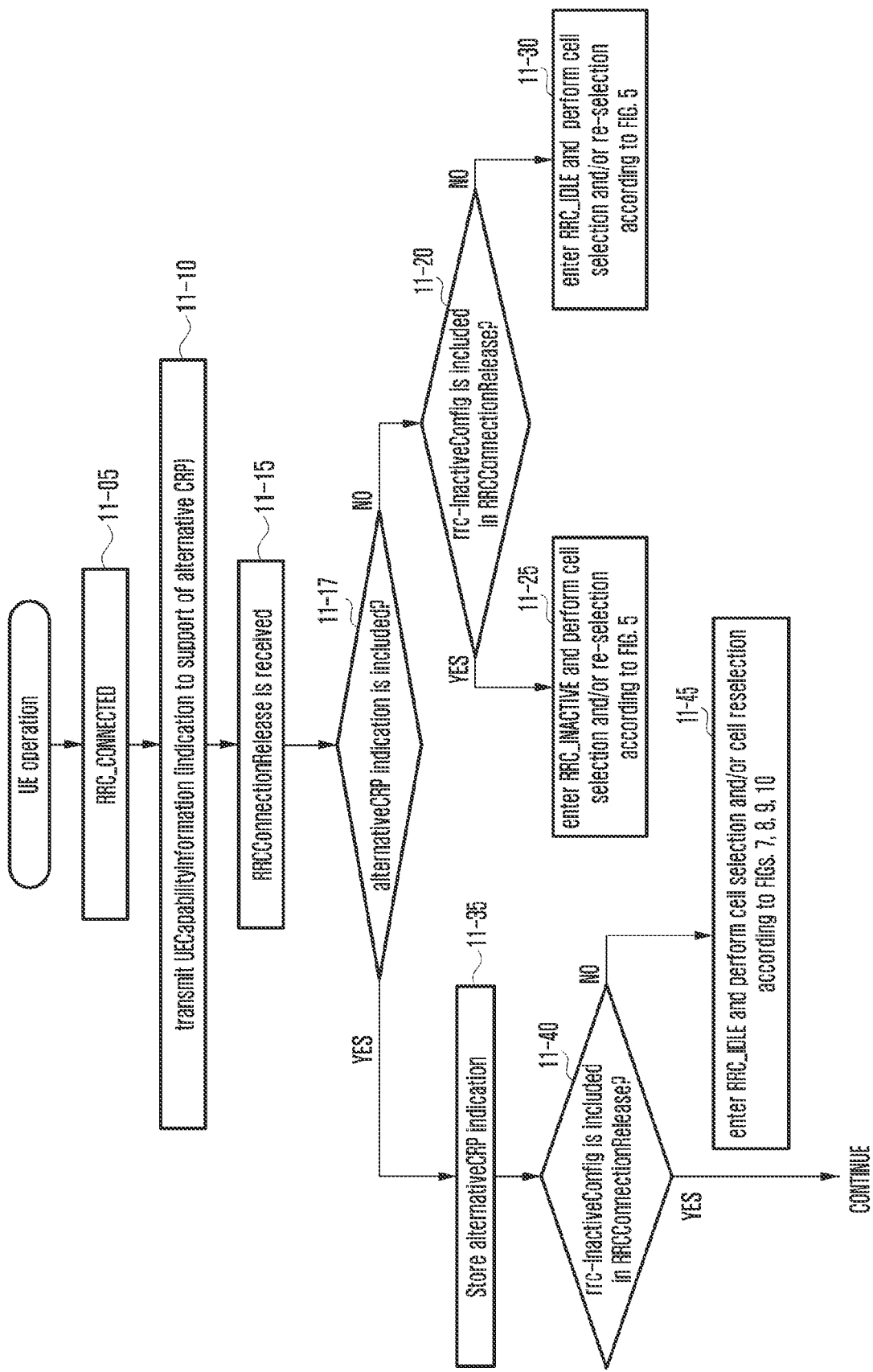
FIG. 11A illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.
Figure 11B:
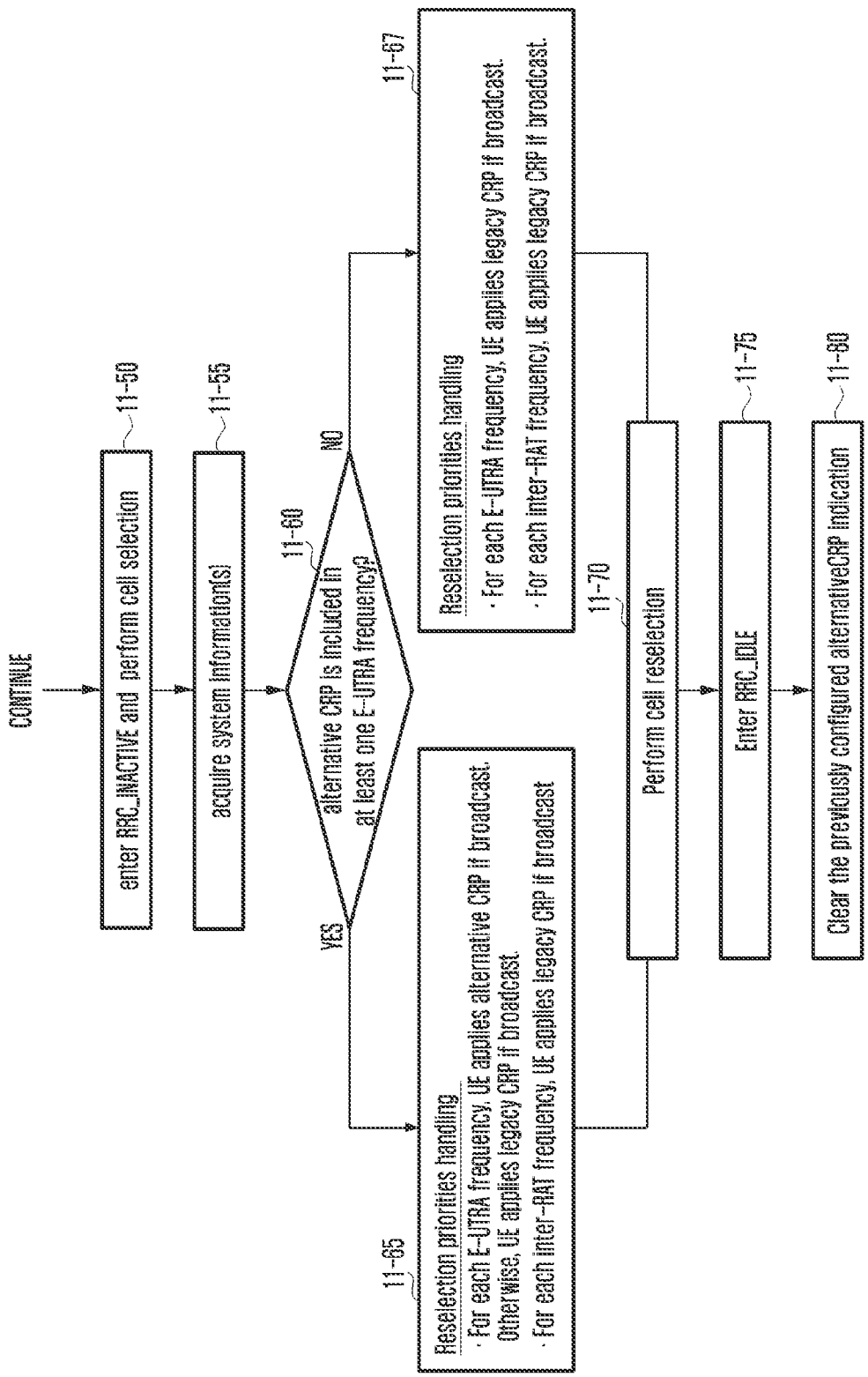
FIG. 11B illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

FIGS. 11A and 11B illustrate a process of performing a cell reselection procedure by a terminal in an RRC inactive mode (RRC_INACTIVE) or an RRC idle mode (RRC_IDLE) in the next-generation mobile communication system according to an embodiment of the disclosure.

Referring to FIG. 11A, a terminal may be converted into an RRC-connected mode (RRC-CONNECTED) through an RRC establishment procedure or an RRC resume procedure 11-05 with an LTE base station.

In operation 11-10, the terminal in the RRC-connected mode may transmit a UECapabilityInformation message to the base station. The message may include at least one of the following information:

An indicator indicating whether to support en-DC
An indicator indicating whether to support ng-en-dc
NR band information supportable by terminal in (NG)en-dc
An indicator indicating that among multiple elements of cell reselection priority configuration information for each RAT-specific frequency, the information being broadcasted through the system information, a particular element of cell reselection priority configuration information is applicable according to the configuration of the base station (or an indicator indicating that an alternative CRP is supported: indication to support of alternative CRP). For example, based on the indicator, the base station may configure an RRC connection release message with an indicator (an alternative CRP indicator) indicating that the terminal supporting (NG) EN-DC is to perform cell reselection based on a particular piece of cell reselection priority configuration information among multiple elements of cell reselection priority configuration information for each E-UTRA frequency from the system information. The (NG)EN-DC terminal for which the alternative CRP indicator is configured may perform cell reselection based on a newly defined alternative CRP among two cell reselection priority values for each EUTRA frequency, the values being included in the system information. Alternatively, the terminal may not include, in the UECapability Information, the indication to support of alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

In operation 11-15, the base station may transmit the RRC connection release message to the terminal.

In operation 11-17, the terminal may determine whether the received RRC connection release message includes an alternative CRP indicator. Alternatively, the RRC connection release message may include a new timer (for example, Txxx) value to apply a validity time in which the alternative CRP indicator is applied. When the received RRC connection release message has no alternative CRP indicator configured therein, or the timer Txxx expires or stops, the terminal may determine whether the received RRC connection release message includes inactive configuration information (rrc-InacitveConfig) in operation 11-20.

In operation 11-25, the terminal may apply the inactive configuration information included in the received RRC connection release message and transition to the RRC inactive mode. The terminal having transitioned to the RRC inactive mode may perform the cell selection procedure or the cell reselection procedure described above with reference to FIG. 5.

In operation 11-30, when the received RRC connection release message includes no inactive configuration information, the terminal may transition to the RRC idle mode. The terminal having transitioned to the RRC idle mode may perform the cell selection procedure or the cell reselection procedure described above with reference to FIG. 5.

In operation 11-35, the terminal may store and apply the alternative CRP indicator configured in the received RRC connection release message.

In operation 11-40, the terminal may determine whether the received RRC connection release message includes the inactive configuration information (rrc-InactiveConfig).

In operation 11-45, when the received RRC connection release message includes no inactive configuration information, the terminal may transition to the RRC idle mode. The terminal having transitioned to the RRC idle mode may perform the cell selection procedure or the cell reselection procedure. The terminal in the RRC idle mode may perform the cell reselection procedure described above with reference to FIGS. 7, 8, 9, and 10. When the NR cell reselection is performed, the terminal in the RRC idle mode may maintain the alternative CRP indicator configured from the LTE base station through the RRC connection release message. This is because the alternative CRP can be broadcasted for the E-UTRA frequency in the NR cell.

Operations subsequent to operation 11-45 are described below with respect to FIG. 11B.

Referring to FIG. 11B, when the RRC connection release message includes the inactive configuration information, the terminal may apply the inactive configuration information included in the RRC connection release message, transition to the RRC inactive mode, and perform the cell selection procedure in operation 11-50.

In operation 11-55, the terminal in the RRC inactive mode may receive or acquire system information from the camped-on cell. The cell may broadcast two CRPs for each E-UTRA frequency and broadcast one CRP for each inter-RAT frequency through the system information. For convenience of description, the legacy CRP (or the first CRP) is described as the existing cell reselection priority value, and the alternative CRP (or the second CRP) is described as the newly introduced and defined cell reselection priority value.

In operation 11-60, the terminal may determine whether the received system information includes the alternative CRP for at least one E-UTRA frequency.

In operation 11-65, when the received system information includes the alternative CRP for at least one E-UTRA frequency, the terminal may determine the alternative CRP broadcasted for each E-UTRA frequency as a cell reselection priority value. When the alternative CRP for each E-UTRA frequency is not broadcasted through the system information, the terminal may determine the legacy CRP broadcasted for each E-UTRA frequency as the cell reselection priority value in operation 11-67. The terminal may determine the legacy CRP broadcasted through the system information for each inter-RAT frequency as the cell reselection priority value.

In operation 11-70, the terminal in the RRC inactive mode may perform cell reselection by using the determined cell reselection priority value.

In operation 11-75, the terminal in the RRC inactive mode may transition to the RRC idle mode.

In operation 11-80, the terminal which has transitioned to the RRC mode (the terminal, the RRC state of which is changed) may remove the alternative CRP indicator configured through the received RRC connection release message in operation 11-15. When the alternative CRP indicator is removed, the terminal may perform the cell selection procedure or the cell reselection procedure (i.e., apply the legacy CRP only) described above with reference to FIG. 5. When the timer Txxx is in operation, the timer Txxx may stop.

Figure 12A:
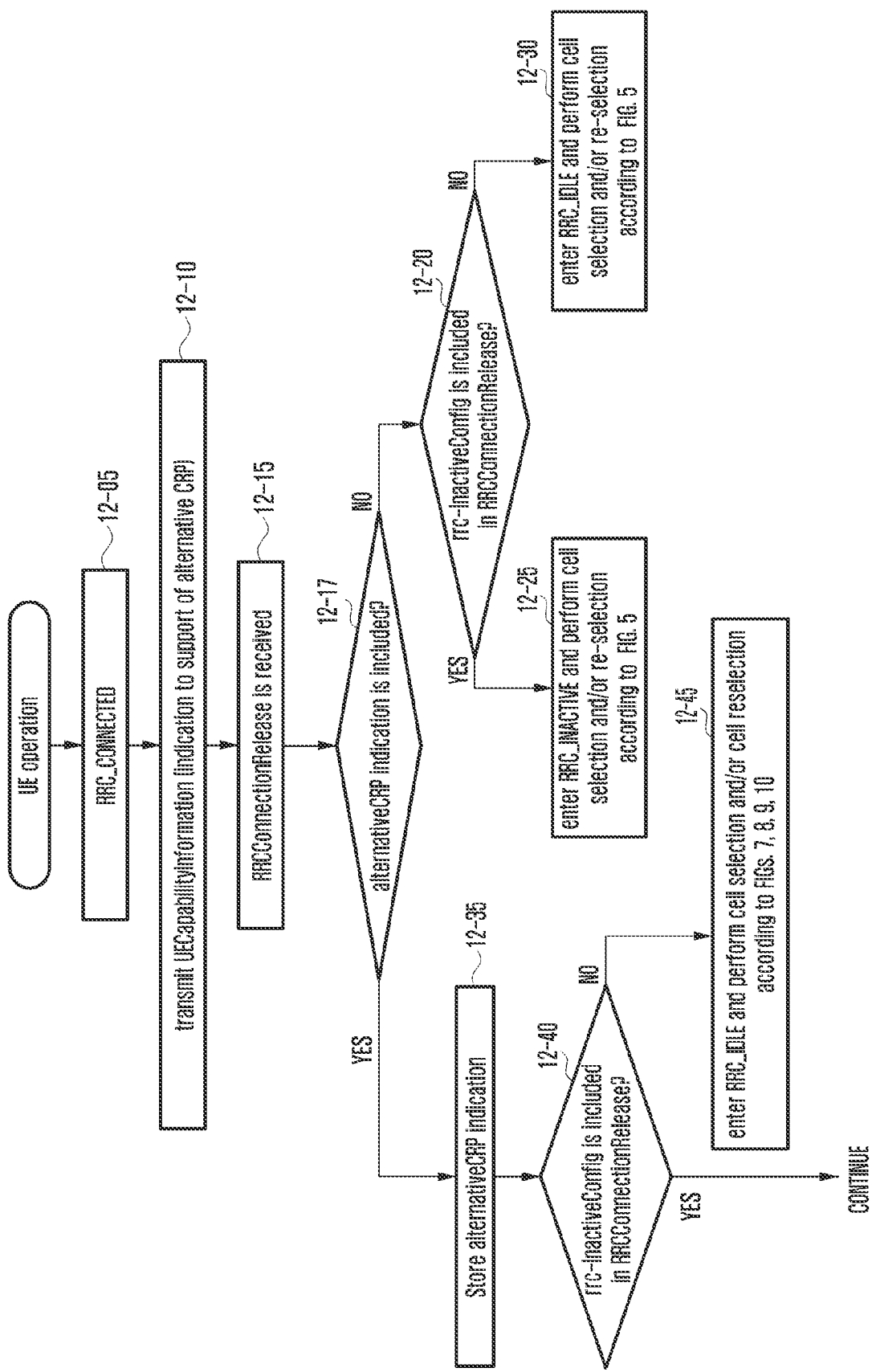
FIG. 12A illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.
Figure 12B:
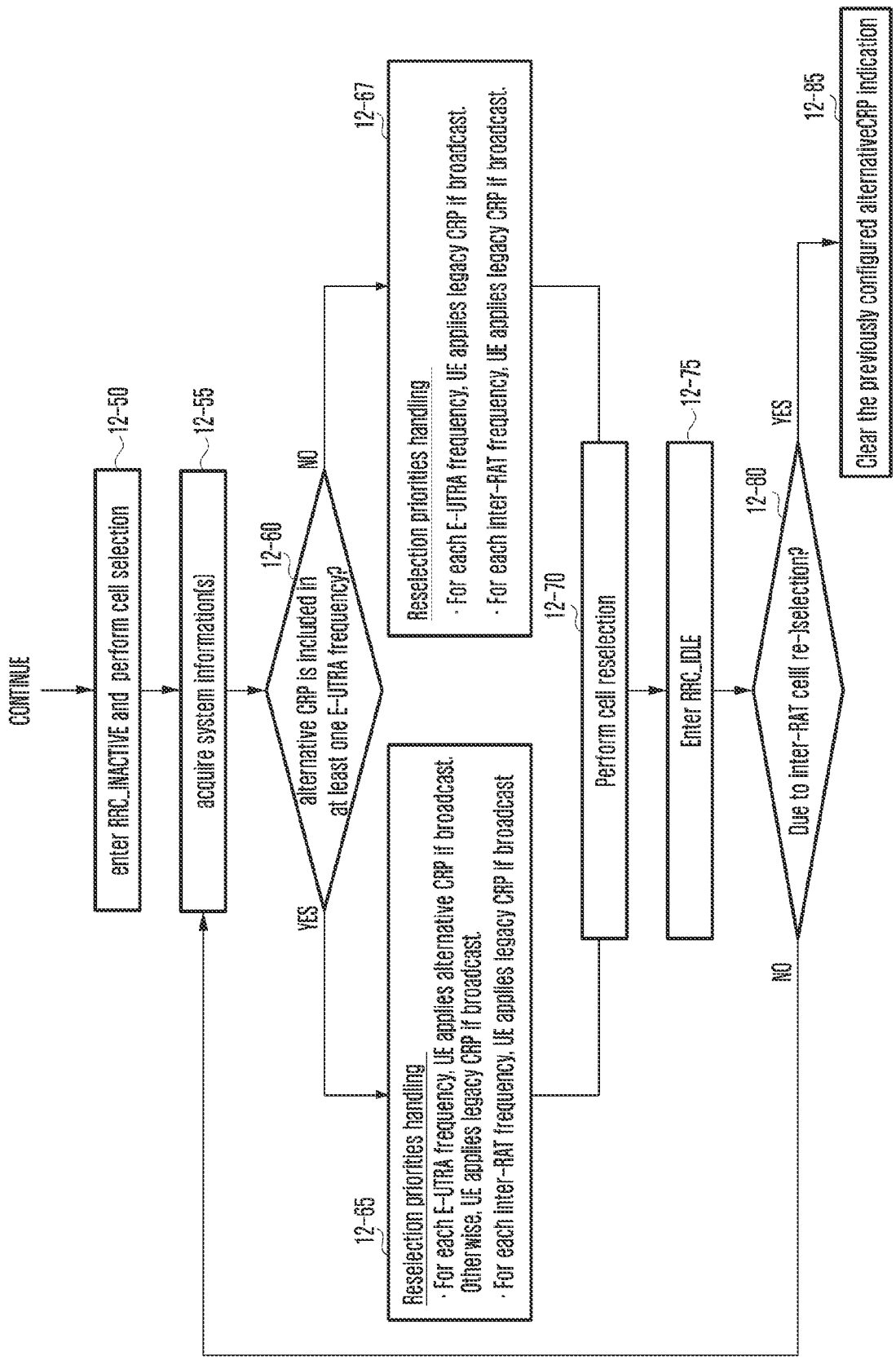
FIG. 12B illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

FIGS. 12A and 12B illustrate a process of performing a cell reselection procedure by a terminal in an RRC inactive mode (RRC_INACTIVE) or an RRC idle mode (RRC_IDLE) in the next-generation mobile communication system according to an embodiment of the disclosure.

Referring to FIG. 12A, a terminal may be converted into an RRC-connected mode (RRC-CONNECTED) through an RRC establishment procedure or an RRC resume procedure 12-05 with a base station.

In operation 12-10, the terminal in the RRC-connected mode may transmit a UECapabilityInformation message to the base station. The message may include at least one of the following information:

An indicator indicating whether to support en-DC

An indicator indicating whether to support ng-en-dc

NR band information supportable by terminal in (NG)en-dc

An indicator indicating that among multiple elements of cell reselection priority configuration information for each RAT-specific frequency, the information being broadcasted through the system information, a particular elements of cell reselection priority configuration information is applicable according to the configuration of the base station (or an indicator indicating that an alternative CRP is supported: indication to support of alternative CRP). For example, based on the indicator, the base station may configure an RRC connection release message with an indicator (an alternative CRP indicator) indicating that the terminal supporting (NG) EN-DC is to perform cell reselection based on a particular element of cell reselection priority configuration information among multiple element of cell reselection priority configuration information for each E-UTRA frequency from the system information. The (NG)EN-DC terminal for which the alternative CRP indicator is configured may perform cell reselection based on a newly defined alternative CRP among two cell reselection priority values for each EUTRA frequency, the values being included in the system information. Alternatively, the terminal may omit, in the UECapability Information, the indication to support of alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

In operation 12-15, the base station may transmit the RRC connection release message to the terminal.

In operation 12-17, the terminal may determine whether the received RRC connection release message includes an alternative CRP indicator. Alternatively, the RRC connection release message may include a new timer (e.g., Txxx) value to apply a validity time in which the alternative CRP indicator is applied. When the received RRC connection release message has no alternative CRP indicator configured therein, or the timer Txxx expires or stops, the terminal may determine whether the received RRC connection release message includes inactive configuration information (rrc-InactiveConfig) in operation 12-20.

In operation 12-25, the terminal may apply the inactive configuration information included in the received RRC connection release message and transition to the RRC inactive mode. The terminal having transitioned to the RRC inactive mode may perform the cell selection procedure or the cell reselection procedure according to the embodiment described with reference to FIG. 5.

In operation 12-30, when the received RRC connection release message includes no inactive configuration information, the terminal may transition to the RRC idle mode. The terminal having transitioned to the RRC idle mode may perform the cell selection procedure or the cell reselection procedure described above with reference to FIG. 5.

In operation 12-35, the terminal may store and apply the alternative CRP indicator configured in the received RRC connection release message.

In operation 12-40, the terminal may determine whether the received RRC connection release message includes the inactive configuration information (rrc-InactiveConfig).

In operation 12-45, when the received RRC connection release message includes no inactive configuration information, the terminal may transition to the RRC idle mode. The terminal having transitioned to the RRC idle mode may perform the cell selection procedure or the cell reselection procedure. The terminal in the RRC idle mode may perform a cell reselection procedure described above with reference to FIGS. 7, 8, 9, and 10. When the inter-RAT cell reselection is performed, the terminal in the RRC idle mode may release the alternative CRP indicator configured from the LTE base station through the RRC connection release message.

Operations subsequent to operation 12-45 described below with respect to FIG. 12B.

Referring to FIG. 12B, when the RRC connection release message includes the inactive configuration information, the terminal may apply the inactive configuration information included in the RRC connection release message, transition to the RRC inactive mode, and perform the cell selection procedure in operation 12-50.

In operation 12-55, the terminal in the RRC inactive mode may receive or acquire system information from the camped-on cell. The cell according to the embodiment may broadcast two CRPs for each E-UTRA frequency and broadcast one CRP for each inter-RAT frequency through the system information. For convenience of description, the legacy CRP (or the first CRP) is described as the existing cell reselection priority value, and the alternative CRP (or the second CRP) is described as the newly introduced and defined cell reselection priority value.

In operation 12-60, the terminal may determine whether the received system information includes the alternative CRP for at least one E-UTRA frequency.

In operation 12-65, when the received system information includes the alternative CRP for at least one E-UTRA frequency, the terminal may determine the alternative CRP broadcasted for each E-UTRA frequency as a cell reselection priority value. When the alternative CRP for each E-UTRA frequency is not broadcasted through the system information, the terminal may determine the legacy CRP broadcasted for each E-UTRA frequency as the cell reselection priority value in operation 12-67. The terminal may determine the legacy CRP broadcasted through the system information for each inter-RAT frequency as the cell reselection priority value.

In operation 12-70, the terminal in the RRC inactive mode may perform cell reselection by using the determined cell reselection priority value.

In operation 12-75, the terminal in the RRC inactive mode may transition to the RRC idle mode.

In operation 12-80, it may be determined whether the terminal has transitioned into the RRC idle mode according to the inter-RAT cell selection or the inter-RAT cell reselection. When the terminal has transitioned to the RRC idle mode according to the inter-RAT cell selection or the inter-RAT cell reselection, the terminal in the RRC idle mode may remove the alternative CRP indicator in operation 12-85, which is configured through the received RRC connection release message in operation 12-15. When the terminal has transitioned to the RRC idle mode for other predetermined reasons other than the inter-RAT cell selection or the inter-RAT cell reselection (e.g., in a case in which a timer operated when the RRC resume procedure starts or the RRC connection resume message is transmitted expires), the terminal may perform the cell selection or cell reselection procedure (starting from operation 12-55) by maintaining and applying the alternative CRP indicator configured through the received RRC connection release message in operation 12-15.

Figure 13:
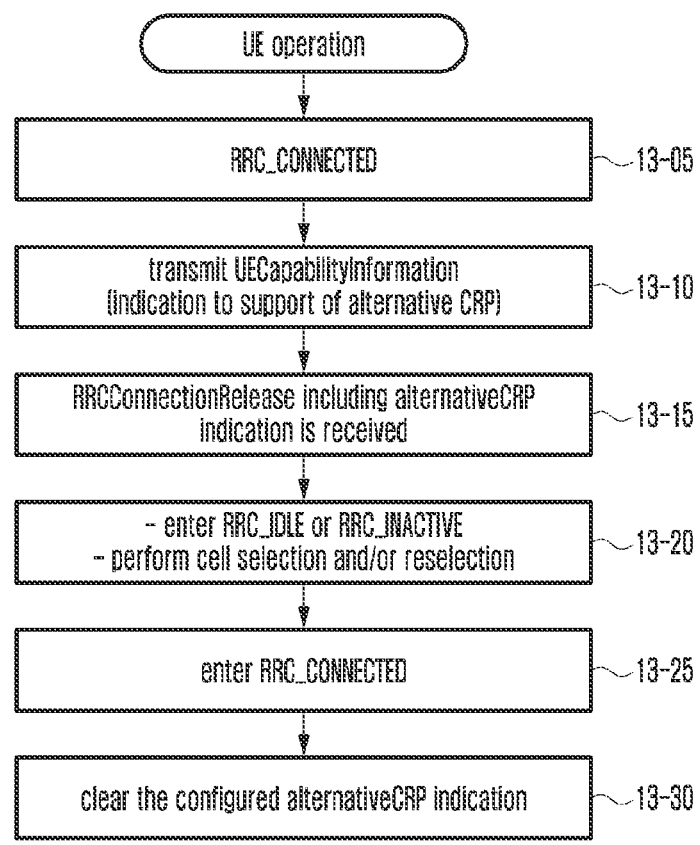
FIG. 13 illustrates a procedure of transitioning to an RRC-connected mode by a terminal in an RRC inactive mode (RRC_INACTIVE) or an RRC idle mode (RRC_IDLE) in the next-generation mobile communication system according to an embodiment of the disclosure.

FIG. 13 illustrates a procedure of transitioning to an RRC-connected mode by a terminal in an RRC inactive mode (RRC_INACTIVE) or an RRC idle mode (RRC_IDLE) in the next-generation mobile communication system according to an embodiment of the disclosure.

Referring to FIG. 13, a terminal may be entered into an RRC-connected mode (RRC-CONNECTED) through an RRC establishment procedure or an RRC resume procedure 13-05 with an LTE base station.

In operation 13-10, the terminal in the RRC-connected mode may transmit a UECapabilityInformation message to the base station. The message may include at least one of the following information:

An indicator indicating whether to support en-DC

An indicator indicating whether to support ng-en-dc

NR band information supportable by terminal in (NG)en-dc

An indicator indicating that among multiple elements of cell reselection priority configuration information for each RAT-specific frequency, the information being broadcasted through the system information, a particular element of cell reselection priority configuration information is applicable according to the configuration of the base station (or an indicator indicating that an alternative CRP is supported: indication to support of alternative CRP). For example, based on the indicator, the base station may configure an RRC connection release message with an indicator (an alternative CRP indicator) indicating that the terminal supporting (NG) EN-DC is to perform cell reselection based on a particular element of cell reselection priority configuration information among multiple cell reselection priority configuration information for each E-UTRA frequency from the system information. The (NG)EN-DC terminal for which the alternative CRP indicator is configured may perform cell reselection based on a newly defined alternative CRP among two cell reselection priority values for each EUTRA frequency, the values being included in the system information. Alternatively, the terminal may omit, in the UECapability Information, the indication to support of alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

In operation 13-15, the base station may include the alternative CRP indicator in the RRC connection release message and transmit the RRC connection release message to the terminal. Alternatively, the RRC connection release message may include a new timer (for example, Txxx) value to apply a validity time to which the alternative CRP indicator is applied.

In operation 13-20, the terminal may receive the RRC connection release message and then transition to the RRC idle mode or the RRC inactive mode. The terminal may perform the cell selection or cell reselection procedure by storing and applying the alternative CRP indicator configured in the RRC connection release message. When the RRC connection release message includes a new timer (Txxx) value, the terminal may operate the corresponding timer Txxx by using the timer Txxx value.

In operation 13-25, the terminal in the RRC idle mode or the RRC inactive mode may transition to the RRC-connected mode (RRC_CONNECTED) through the RRC establishment procedure or the RRC resume procedure. The terminal in the RRC inactive mode may maintain the RRC inactive mode through the RRC resume procedure. For example, in response to the RRC connection resume request message, the base station may transmit the RRC connection release message to the terminal. When the newly received RRC connection release message has no alternative CRP indicator configured therein, the terminal may release the alternative CRP indicator configured in the previously received RRC connection release message. Alternatively, when the RRC connection release message newly received for supporting delta configuration has no alternative CRP indicator configured therein, the terminal may continue to apply the alternative CRP indicator configured in the previously received RRC connection release message.

In operation 13-30, the terminal having transitioned to the RRC-connected mode may remove the alternative CRP indicator configured in operation 13-15. When the timer Txxx is in operation, the timer Txxx may stop.

Figure 14:
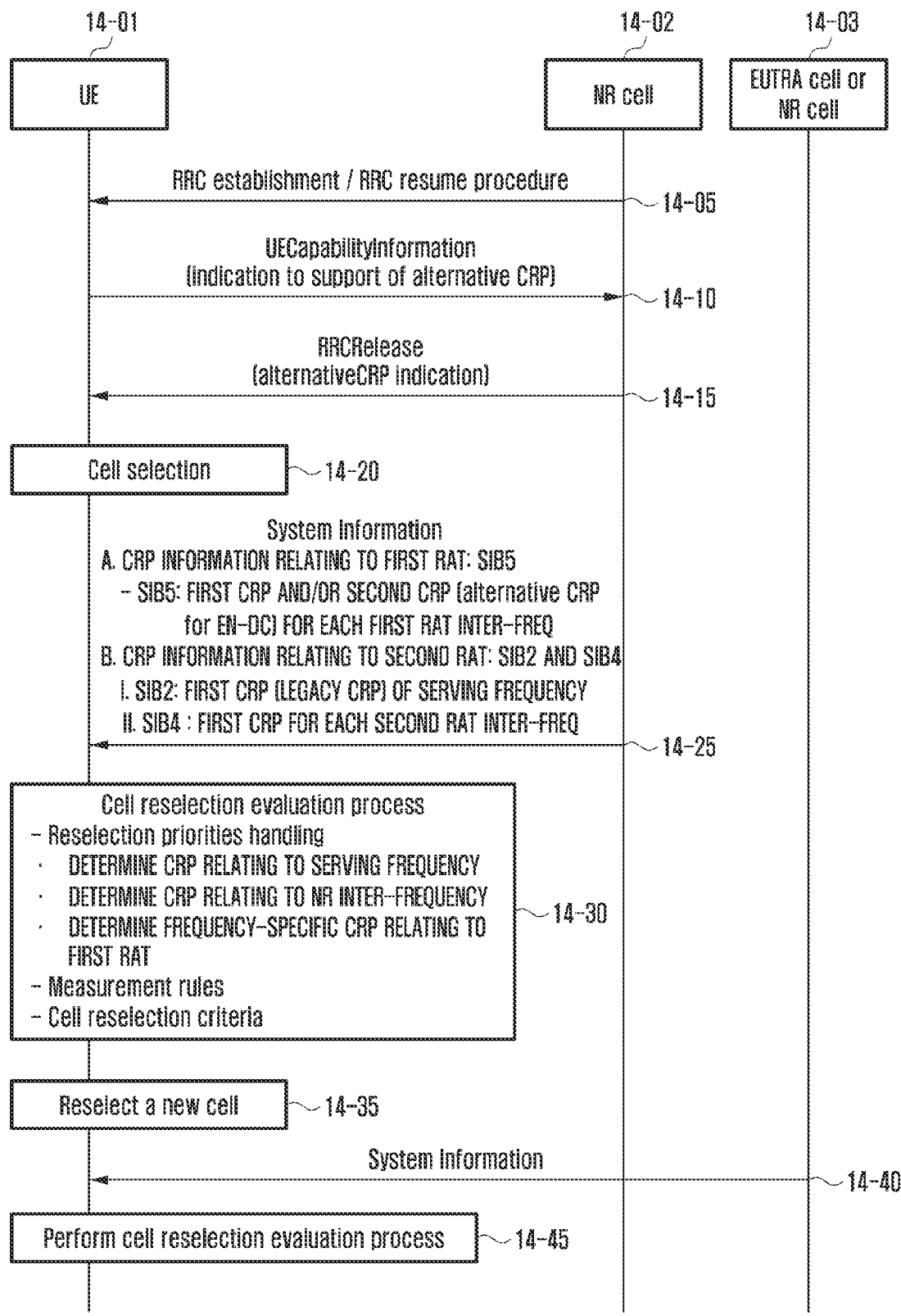
FIG. 14 illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

FIG. 14 illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

Referring to FIG. 14, an NR base station may broadcast multiple pieces of cell reselection priority (CRP) configuration information for each RAT-specific frequency through system information. For example, the NR base station may broadcast two elements of cell reselection priority configuration information for an E-UTRA frequency. The two elements of cell reselection priority configuration information may refer to an E-UTRA frequency (carrierFreq) and two cell reselection priority values mapped to the E-UTRA frequency. The first cell reselection priority value may be referred to as a first CRP or a legacy CRP, and the second cell reselection priority value may be referred to as a second CRP or an alternative CRP. The terminal may perform a cell reselection procedure by applying only one of the two cell reselection priority values. Each cell reselection priority value may be determined based on at least one of the cellReselectionPriority and the cellReselectionSubPriority. For example, each cell reselection priority value may be derived based on the cellReselectionPriority (if broadcast)+ cellReselectionSubPriority (if broadcast). With respect to each cell reselection priority value, the cellReselectionPriority may have an integer value, and the cellReselectionSubPriority may have a decimal value. A frequency having a higher frequency priority value may have a higher cell reselection priority.

The reason an NR base station broadcasts multiple cell reselection priority values for each frequency is to perform a cell reselection procedure by selectively applying a particular cell reselection priority value for each frequency according to terminal capability. For example, with respect to the LTE frequency supporting the particular (NG)EN-DC, the base station may control a terminal supporting only LTE to have a lower cell reselection priority and a terminal supporting (NG)EN-DC to have a higher cell reselection priority so as to effectively manage a frequency.

Referring to FIG. 14, a terminal 14-01 may be converted into an RRC-connected mode (RRC-CONNECTED) through an RRC establishment procedure or an RRC resume procedure 14-05 with an NR base station 14-02.

In operation 14-10, the terminal in the RRC-connected mode may transmit a UECapabilityInformation message to the base station 14-02. The message may include at least one of the following information:

An indicator indicating whether to support en-DC
An indicator indicating whether to support ng-en-dc
NR band information supportable by terminal in (NG)en-dc
An indicator indicating that among multiple elements of cell reselection priority configuration information for each RAT-specific frequency, the information being broadcasted through the system information, a particular element of cell reselection priority configuration information is applicable according to the configuration of the base station (or an indicator indicating that an alternative CRP is supported: indication to support of alternative CRP). For example, based on the indicator, the base station may configure an RRC connection release message with an indicator (an alternative CRP indicator) indicating that the terminal supporting (NG) EN-DC is to perform cell reselection based on a particular piece of cell reselection priority configuration information for each E-UTRA frequency from the system information. Additionally, a new timer (e.g., Txxx) value applicable to the alternative CRP (or the second CRP) may be included. When the RRC connection release message includes the new timer (Txxx) value, the terminal may operate the timer Txxx by using the corresponding timer Txxx value. The terminal may perform cell reselection only when the timer Txxx is in operation, by applying the newly defined alternative CRP (or the second CRP) among two cell reselection priority values for each EUTRA frequency, the values being included in the system information. When the timer Txxx expires, the terminal may remove the alternative CRP indicator configured through the RRC connection release message. The (NG)EN-DC terminal configured with the alternative CRP indicator may perform cell reselection based on the newly defined alternative CRP among two cell reselection priority values for each EUTRA frequency, the values being included in the system information. Alternatively, the terminal may omit, in the UECapability Information, the indication to support of alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

The base station 14-02 may transmit the RRC connection release message to the terminal 14-01 in operation 14-15 so that the terminal in the RRC-connected mode can transition to an RRC idle mode or an RRC inactive mode. The RRC connection release message may include the alternative CRP indicator. Alternatively, the RRC connection release message may include a new timer (e.g., Txxx) value to apply a validity time in which the alternative CRP indicator is applied. When the RRC connection release message includes the timer Txxx value, the terminal may operate the timer Txxx by using the corresponding timer Txxx value, and may determine a frequency priority according to the alternative CRP indicator only when the corresponding timer Txxx is in operation.

In operation 14-20, the terminal having transitioned to the RRC idle mode or the RRC inactive mode may perform a cell selection procedure. When the received RRC connection release message includes suspension configuration information (suspendConfig), the terminal may apply the suspension configuration information and transition to the RRC inactive mode to perform a cell selection procedure. When the received RRC connection release message includes no suspension configuration information, the terminal may transition to the RRC idle mode to perform a cell selection procedure.

In operation 14-25, the terminal may receive system information from a cell camped-on through cell selection. The system information may include parameters for cell reselection. In the embodiment, a first RAT may be referred to as E-UTRA, and a second RAT may be referred to as an RAT other than the E-UTRA (for example, NR). Previously defined cell reselection priority information for each RAT-specific frequency may be referred to as a legacy CRP or a first CRP, and additionally defined and introduced cell reselection priority information for each RAT-specific frequency may be referred to as a second CRP or an alternative CRP. The base station 14-02 may broadcast cell reselection priority information for each RAT-specific frequency among the parameters for cell reselection as follows. The following system information number corresponds to a mere embodiment of the disclosure and may change.

CRP information for first RAT: SIB 5
  Through SIB5, only the first CRP, only the second CRP, or both the first CRP and the second CRP for each first RAT inter-frequency (E-UTRA inter-frequency) may be broadcasted.
CRP information for second RAT: SIB 2 and SIB4
  SIB2 including a first CRP for a second RAT for a serving frequency (an NR serving frequency or an NR intra-frequency)
  SIB4 including a first CRP for each second RAT inter-frequency (NR inter-frequency)

In the above description, an example in that CRP information is included in multiple system information numbers is described, but each element of CRP information or all of the CRP information may be included in a single system information block.

The system information may include the maximum two CRPs for each E-UTRAN frequency in the case of the first RAT, and may include one CRP for each frequency in the case of the second RAT. This is only for convenience of description and the system information may include multiple CRPs for each RAT frequency in the actual case. When the system information includes multiple CRPs for each RAT-specific frequency, the base station may indicate, to the terminal through an indicator (for example, one or multiple alternative CRP(s)), a CRP to be applied.

In operation 14-30, the terminal may perform a cell reselection evaluation process. The terminal may perform a cell reselection evaluation process for NR frequencies and inter-RAT frequencies broadcasted through the provided system information and frequency priority configuration information (The UE shall only perform cell reselection evaluation for NR frequencies and inter-RAT frequencies that are given in system information and for which the UE has a priority provided). The cell reselection evaluation process may mean a series of procedures below:
  Frequency priority application scheme (Reselection priorities handling)
  Measurement rules for cell reselection
  Cell reselection criteria The terminal in the RRC idle mode or the RRC inactive mode may apply the frequency priority application scheme separately for the first RAT and the second RAT. An example of the scheme of determining frequency priorities separately for the first RAT and the second RAT is described below:
  When the terminal corresponds to an (NG)EN-DC-capable terminal and the RRC connection release message has an alternative CRP indicator configured therein, the terminal may determine CRP information included in SIB5 for each E-UTRA inter-frequency. For example, when SIB5 includes both the first CRP and the second CRP, or only the second CRP for a particular E-UTRA inter-frequency, the terminal may apply the second CRP included in SIB5 for the corresponding E-UTRA inter-frequency so as to determine a frequency priority. When SIB5 includes only the first CRP for a particular E-UTRA inter-frequency, the terminal may apply the first CRP included in SIB5 for the corresponding E-UTRA inter-frequency so as to determine a frequency priority. Alternatively, when SIB5 includes only the first CRP for a particular E-UTRA inter-frequency, the terminal may determine that there is no cell reselection priority information for the corresponding E-UTRA inter-frequency. When the terminal is configured with the alternative CRP through the RRC connection release message, the terminal applies no first CRP or that the corresponding E-UTRA inter-frequency is configured to have the lowest frequency priority.
  When the terminal corresponds to an (NG)EN-DC-capable terminal and the RRC connection release message has no alternative CRP indicator configured therein, the terminal may apply CRP configuration information included in SIB5 for each E-UTRA inter-frequency. For example, when SIB5 includes both the first CRP and the second CRP, or only the first CRP for a particular E-UTRA inter-frequency, the terminal may apply the first CRP included in SIB5 for the corresponding E-UTRA inter-frequency so as to determine a frequency priority. When SIB5 includes only the second CRP for a particular E-UTRA inter-frequency, the terminal may determine that there is no cell reselection priority information for the corresponding E-UTRA inter-frequency. When the terminal is not configured with the alternative CRP through the RRC connection release message, the terminal applies no second CRP or that the E-UTRA inter-frequency is configured to have the lowest frequency priority.

For the second RAT (NR), the terminal may apply the first CRP included in the system information for each frequency, regardless of whether the RRC connection release message is configured with the alternative CRP, so as to determine a frequency priority.

When the RRC connection release message includes a timer Txxx value, the terminal may operate the corresponding timer Txxx by using the timer Txxx value.

For a predetermined reason or for minimizing the battery consumption, the terminal may perform neighbor cell measurement according to the measurement rule by applying the determined frequency priority. This follows the above-described embodiment.

Different cell reselection evaluation criteria may be applied depending on the frequency priority determined by the terminal. When the NR base station broadcasts the alternative CRP (or the second CRP) for each E-UTRA frequency through the system information, a PCI list or cell reselection (e.g., q-OffsetCell) values for the corresponding frequency may also be separately broadcasted through the system information. The terminal may perform a cell reselection procedure based on at least one of the PCI list and the cell reselection parameter values separately provided.

In operation 14-35, the terminal in the RRC idle mode or the RRC inactive mode may perform reselection by selecting a new cell 14-03 through operation 14-30.

In operation 14-40, the terminal may acquire system information including a cell reselection parameter from the cell 14-03 selected as cell reselection.

In operation 14-45, the terminal may perform, based on the received system information, the cell reselection evaluation process described in operation 14-30. In this case, with respect to the cell 14-03 selected as cell reselection, when the system information includes only the frequency-specific first CRP for the first RAT, the terminal may perform operation 14-30 by applying the first CRP for the first RAT while maintaining the alternative CRP indicator configured through the RRC connection release message in operation 14-15, so as to perform a cell reselection process. The reason the alternative CRP indicator is maintained is to apply, to the cell reselection evaluation process, system information through which the second CRP is provided in at least one frequency for the first RAT in a cell newly selected later as cell reselection. Alternatively, when the system information includes only the frequency-specific first CRP for the first RAT, the alternative CRP indicator configured through the RRC connection release message in operation 14-15 may be removed. When the alternative CRP indicator is removed, the terminal may perform the cell reselection process by applying the first CRP for the first RAT even though the second CRP is broadcasted in at least one frequency for the first RAT in a cell newly selected later as cell reselection. When the alternative CRP indicator is released, the timer Txxx in operation may stop.

An embodiment of the disclosure describes (NG)EN-DC for convenience of description, but is not limited to (NG)EN-DC and is applied the same to NE-DC and NR-DC.

A new timer Txxx may be the existing timer T320. The timer T320 value and the timer T320 may be applied to the timer Txxx value and the timer Txxx and the Txxx may be configured together with the alternative CRP indicator through the RRC connection release message. When the RRC connection release message includes the timer Txxx value, the terminal may operate the timer Txxx by using the timer Txxx value, and may determine a frequency priority according the alternative CRP indicator only when the corresponding timer Txxx is in operation.

Figure 15A:
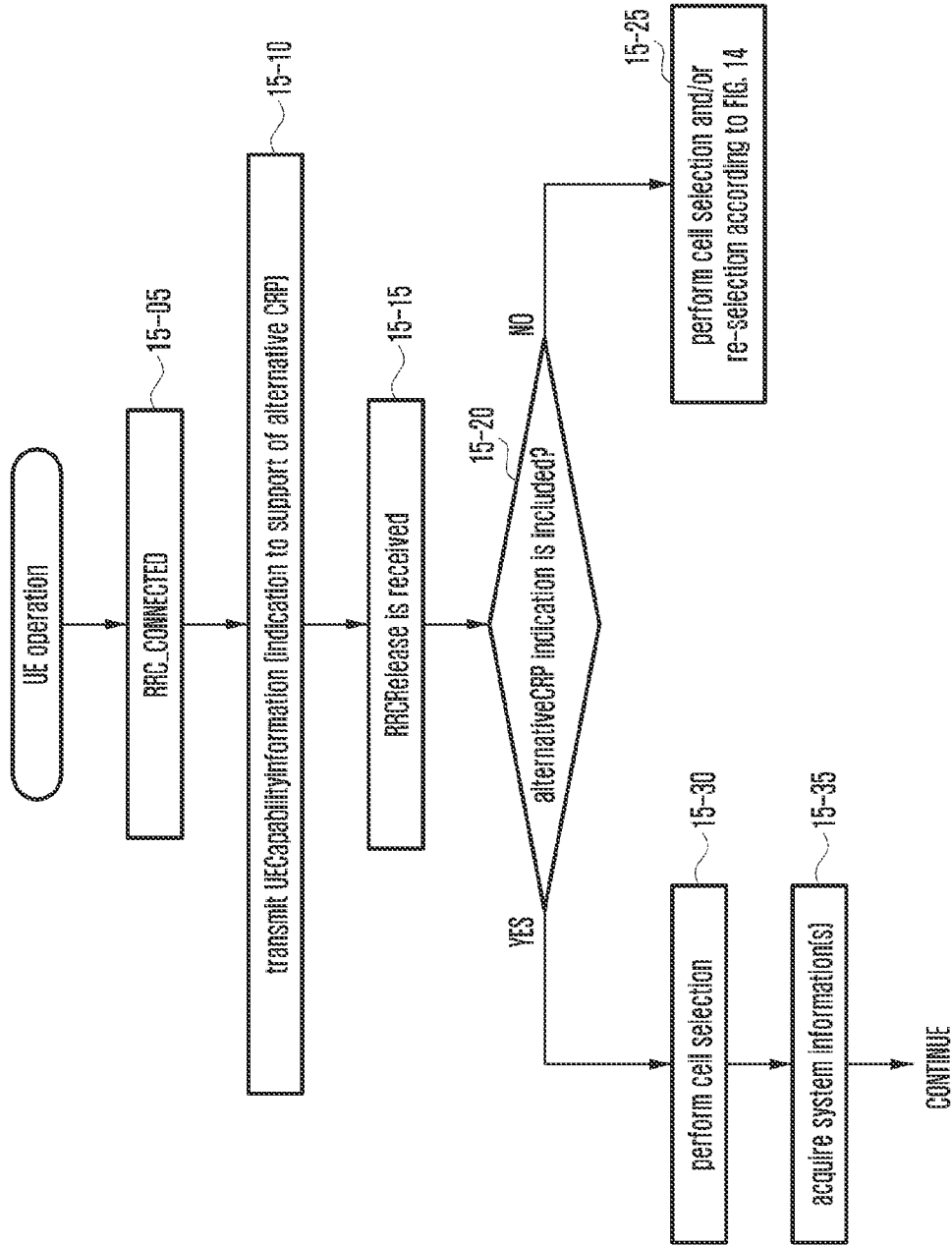
FIG. 15A illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.
Figure 15B:
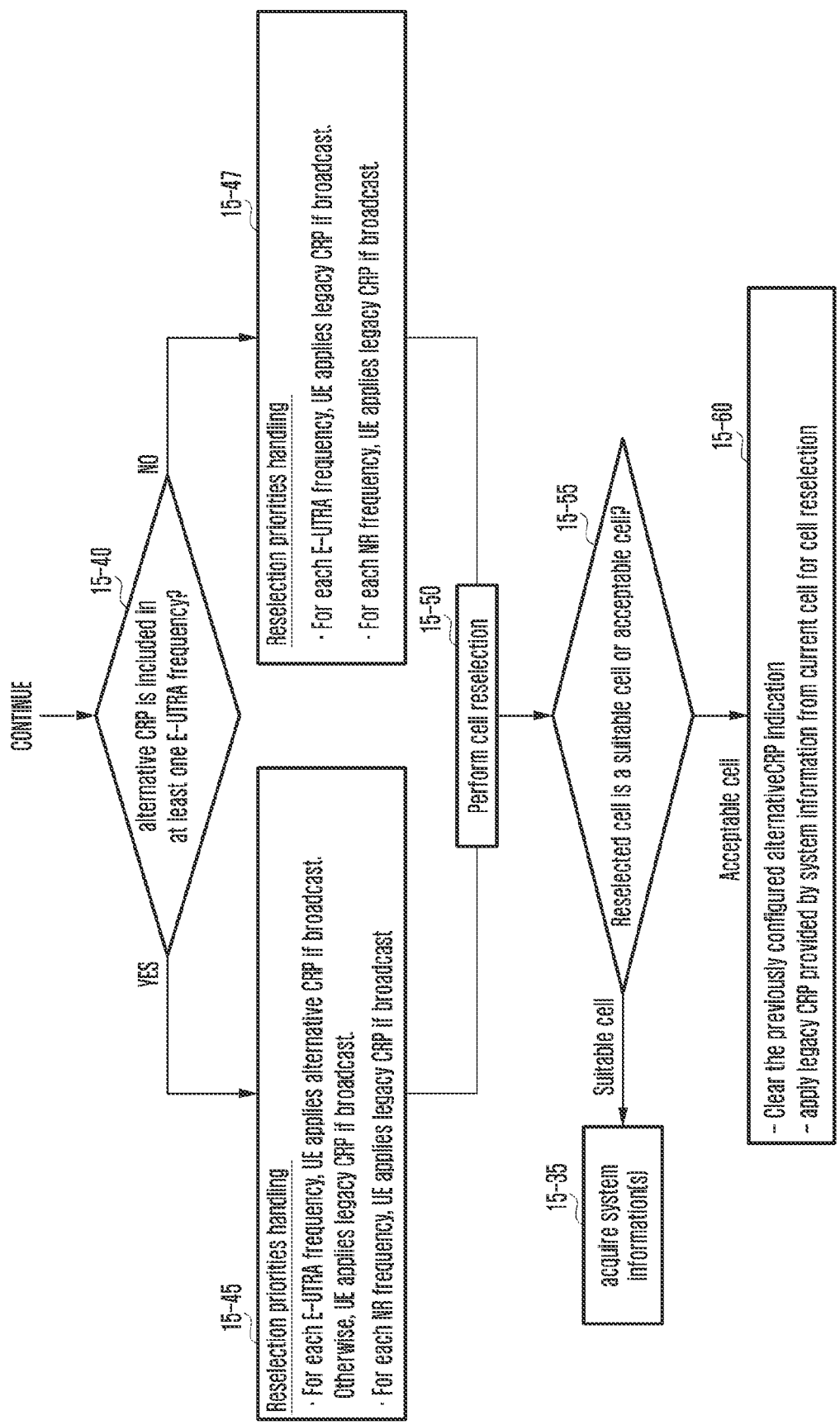
FIG. 15B illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

FIGS. 15A and 15B illustrate a process of performing a cell reselection procedure by a terminal in an RRC inactive mode (RRC_INACTIVE) or an RRC idle mode (RRC_IDLE) in the next-generation mobile communication system according to an embodiment of the disclosure.

Referring to FIG. 15A, a terminal may be converted into an RRC-connected mode (RRC-CONNECTED) through an RRC establishment procedure or an RRC resume procedure 15-05 with an NR base station.

In operation 15-10, the terminal in the RRC-connected mode may transmit a UECapabilityInformation message to the base station. The message may include at least one of the following information:

An indicator indicating whether to support en-DC
An indicator indicating whether to support ng-en-dc
NR band information supportable by terminal in (NG)en-dc
An indicator indicating that among multiple elements of cell reselection priority configuration information for each RAT-specific frequency, the information being broadcasted through the system information, a particular element of cell reselection priority configuration information is applicable according to the configuration of the base station (or an indicator indicating that an alternative CRP is supported: indication to support of alternative CRP). For example, based on the indicator, the base station may configure an RRC connection release message with an indicator (an alternative CRP indicator) indicating that the terminal supporting (NG) EN-DC is to perform cell reselection based on a particular element of cell reselection priority configuration information among multiple elements of cell reselection priority configuration information for each E-UTRA frequency from the system information. Additionally, a new timer (e.g., Txxx) value applicable to the alternative CRP (or the second CRP) may be included. When the RRC connection release message includes the new timer (Txxx) value, the terminal may operate the timer Txxx by using the corresponding timer Txxx value. The terminal may perform cell reselection only when the timer Txxx is in operation, by using the newly defined alternative CRP (or the second CRP) among two cell reselection priority values for each EUTRA frequency, the values being included in the system information. When the timer Txxx expires, the (NG) EN-DC terminal may remove the alternative CRP indicator configured through the RRC connection release message. The (NG)EN-DC terminal configured with the alternative CRP indicator may perform cell reselection based on the newly defined alternative CRP among two cell reselection priority values for each EUTRA frequency, the values being included in the system information. Alternatively, the terminal may omit, in the UECapability Information, the indication to support of alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

In operation 15-15, the base station may transmit the RRC connection release message to the terminal.

In operation 15-20, the terminal may determine whether the received RRC connection release message includes an alternative CRP indicator. Alternatively, the RRC connection release message may include a new timer (for example, Txxx) value to apply a validity time in which the alternative CRP indicator is applied. When the RRC connection release message includes the timer Txxx value, the terminal may operate the timer Txxx by using the corresponding timer Txxx value, and may perform a cell reselection procedure by applying the newly introduced and defined alternative CRP (or the second CRP) according to the alternative CRP indicator only when the corresponding timer Txxx is in operation.

In operation 15-25, when the received RRC connection release message has no alternative CRP indicator configured therein, or the timer Txxx expires or stops, the terminal may perform the cell selection procedure or the cell reselection procedure described above with reference to FIG. 14. The terminal may transition to the RRC idle mode or the RRC inactive mode according to whether there is suspension configuration information (suspendConfig) which can be included in the received RRC connection release message, so as to perform the cell selection procedure or the cell reselection procedure.

In operation 15-30, when the received RRC connection release message has an alternative CRP indicator configured therein, the terminal may store and apply the alternative CRP indicator. When the RRC connection release message includes a new timer (Txxx) value, the terminal may operate the corresponding timer Txxx by using the timer Txxx value. The terminal may transition to the RRC idle mode or the RRC inactive mode according to whether there is suspension configuration information (suspendConfig) which can be included in the received RRC connection release message, so as to perform the cell selection procedure.

In operation 15-35, the terminal in the RRC idle mode or the RRC inactive mode may receive or acquire system information from the camped-on cell. The cell may broadcast two CRPs for each E-UTRA frequency and broadcast one CRP for each NR frequency through the system information. For convenience of description, the legacy CRP (or the first CRP) is described as the existing cell reselection priority value, and the alternative CRP (or the second CRP) is described as the newly introduced and defined cell reselection priority value.

Referring to FIG. 15B, in operation 15-40, the terminal may determine whether the received system information includes the alternative CRP for at least one E-UTRA frequency.

In operation 15-45, when the received system information includes the alternative CRP for at least one E-UTRA frequency, the terminal may determine the alternative CRP broadcasted for each E-UTRA frequency as a cell reselection priority value. When the alternative CRP for each E-UTRA frequency is not broadcasted through the system information, the terminal may determine the legacy CRP broadcasted for each E-UTRA frequency as the cell reselection priority value. The terminal may determine the legacy CRP broadcasted through the system information for each NR frequency as the cell reselection priority value.

In operation 15-47, when the received system information includes only the legacy CRP for each RAT-specific frequency, the terminal may determine the legacy CRP broadcasted through the system information for each RAT-specific frequency as the cell reselection priority value.

In operation 15-50, the terminal may perform cell reselection by using the determined cell reselection priority value.

In operation 15-55, the terminal may determine whether the cell selected as cell reselection is a suitable cell or an acceptable cell. The suitable cell and the acceptable cells are defined as follows:

Suitable Cell:
A cell is considered as suitable if the following conditions are fulfilled:
 The cell is part of either the selected PLMN or the registered PLMN or PLMN of the Equivalent PLMN list;
 The cell selection criteria are fulfilled
 According to the latest information provided by NAS:
 The cell is not barred
 The cell is part of at least one TA that is not part of the list of "Forbidden Tracking Areas", which belongs to a PLMN that fulfils the first bullet above.

Acceptable Cell:
A cell is considered as acceptable if the following conditions are fulfilled:
 The cell is not barred
 The cell selection criteria are fulfilled When the cell selected by the terminal as cell reselection is a suitable cell in operation 15-55, the terminal may continuously perform the cell reselection procedure by maintaining the alternative CRP indicator configured through the RRC connection release message. For example, the terminal may perform the cell reselection procedure starting from operation 15-35.

When the cell selected by the terminal as cell reselection is an acceptable cell in operation 15-55, the terminal may release the alternative CRP indicator configured through the RRC connection release message and may perform the cell reselection procedure in operation 15-60. The terminal may determine, as the cell reselection priority value, the legacy CRP for each RAT-specific frequency, provided through the system information broadcasted by the cell selected as cell reselection, so as to perform the cell reselection procedure. When the timer Txxx is in operation, the timer Txxx may stop.

Figure 16A:
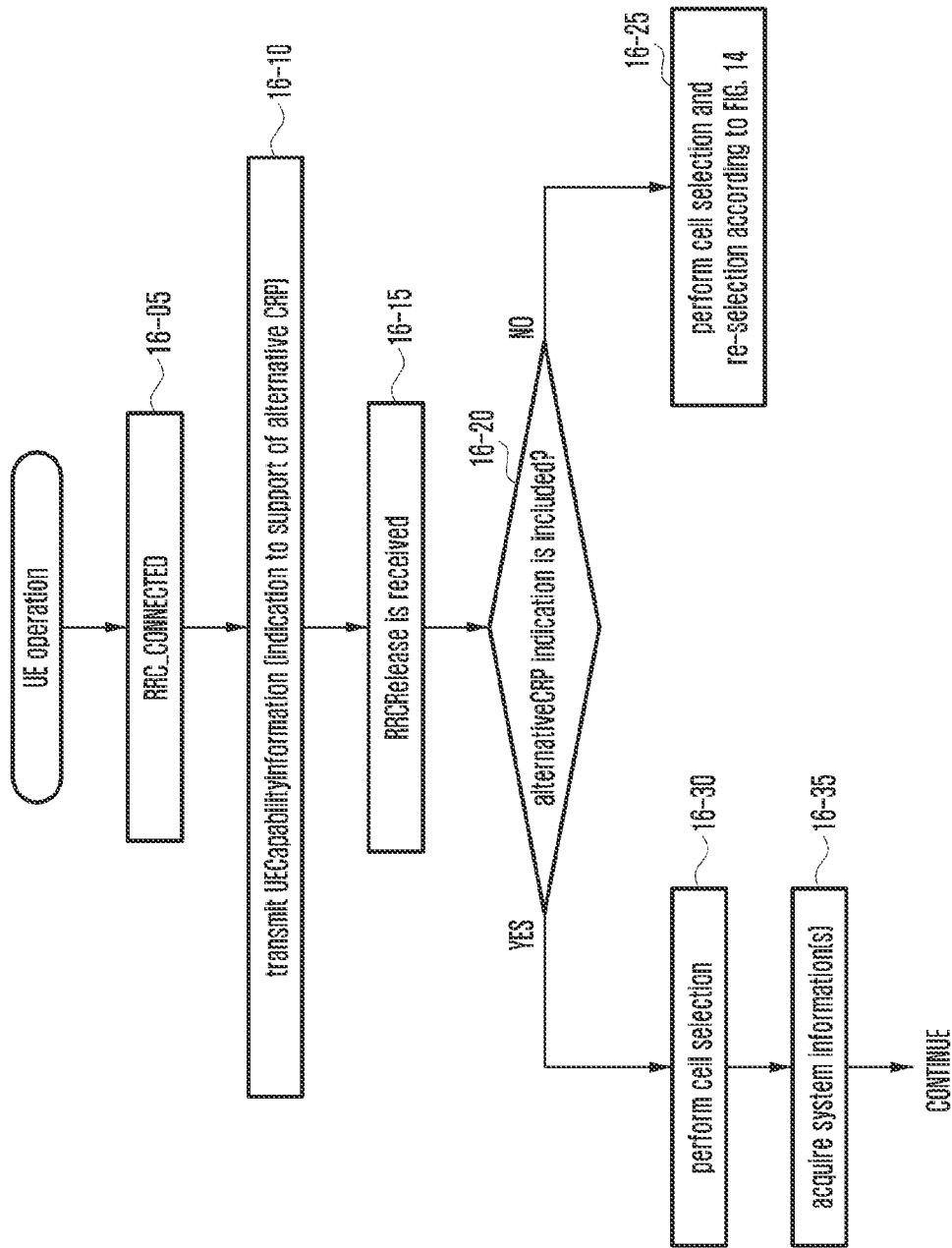
FIG. 16A illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.
Figure 16B:
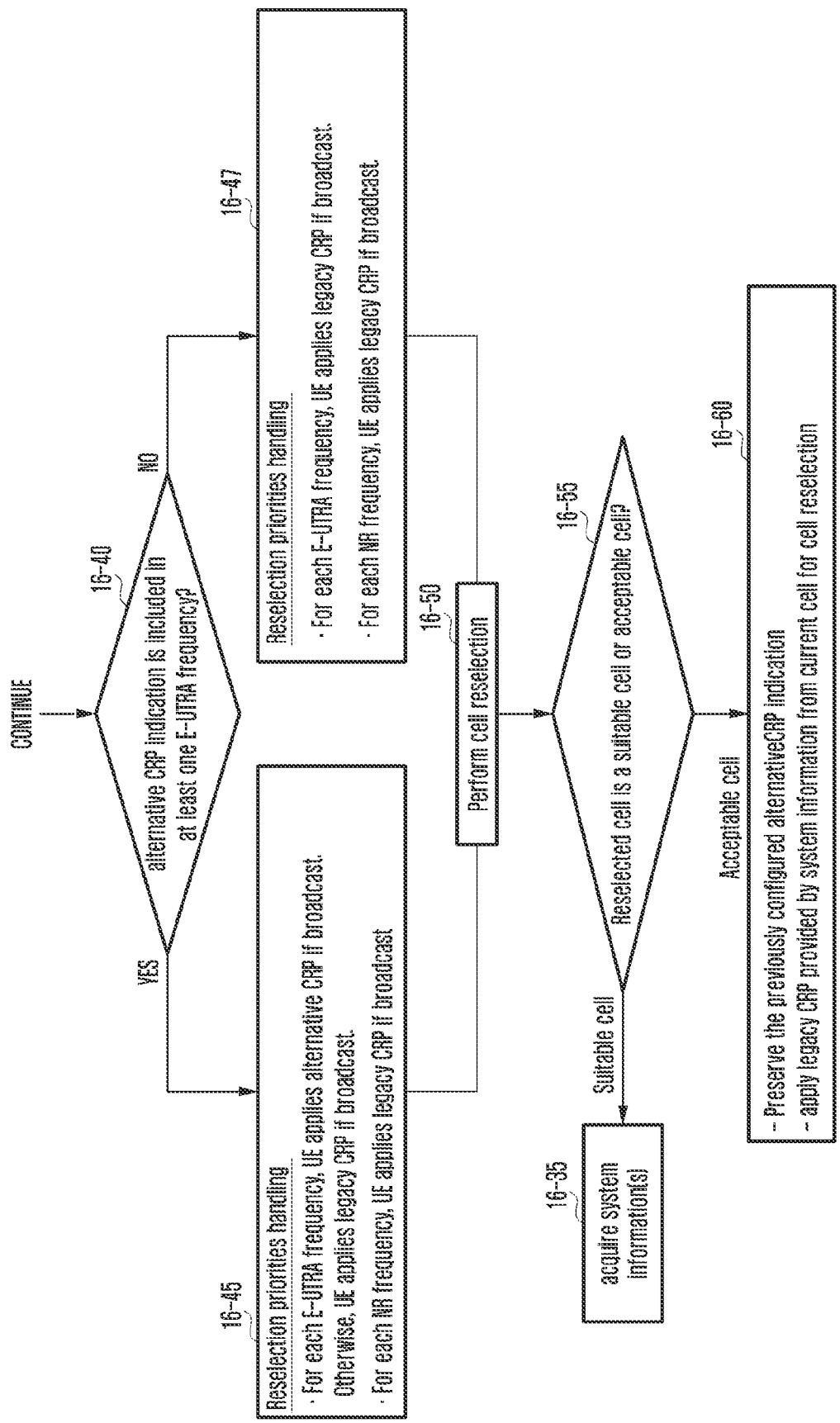
FIG. 16B illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

FIGS. 16A and 16B illustrate a process of performing a cell reselection procedure by a terminal in an RRC inactive mode (RRC_INACTIVE) or an RRC idle mode (RRC_IDLE) in the next-generation mobile communication system according to an embodiment of the disclosure.

Referring to FIG. 16A, a terminal may be converted into an RRC-connected mode (RRC-CONNECTED) through an RRC establishment procedure or an RRC resume procedure 16-05 with a base station.

In operation 16-10, the terminal in the RRC-connected mode may transmit a UECapabilityInformation message to the base station. The message may include at least one of the following information:
 An indicator indicating whether to support en-DC
 An indicator indicating whether to support ng-en-dc
 NR band information supportable by terminal in (NG)en-dc
 An indicator indicating that among multiple elements of cell reselection priority configuration information for each RAT-specific frequency, the information being broadcasted through the system information, a particular element of cell reselection priority configuration information is applicable according to the configuration of the base station (or an indicator indicating that an alternative CRP is supported: indication to support of alternative CRP). For example, based on the indicator, the base station may configure an RRC connection release message with an indicator (an alternative CRP indicator) indicating that the terminal supporting (NG) EN-DC is to perform cell reselection based on a particular piece of cell reselection priority configuration information among multiple elements of cell reselection priority configuration information for each E-UTRA frequency from the system information. The (NG)EN-DC terminal for which the alternative CRP indicator is configured may perform cell reselection based on a newly defined alternative CRP among two cell reselection priority values for each EUTRA frequency, the values being included in the system information. Alternatively, the terminal may not include, in the UECapability Information, the indication to support of alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

In operation 16-15, the base station may transmit the RRC connection release message to the terminal.

In operation 16-20, the terminal may determine whether the received RRC connection release message includes an alternative CRP indicator. Alternatively, the RRC connection release message may include a new timer (e.g., Txxx) value to apply a validity time in which the alternative CRP indicator is applied.

In operation 16-25, when the received RRC connection release message has no alternative CRP indicator configured therein, the terminal may perform the cell selection procedure or the cell reselection procedure described above with reference to FIG. 14. The terminal may transition to the RRC idle mode or the RRC inactive mode according to whether there is suspension configuration information (suspendConfig) which can be included in the received RRC connection release message, so as to perform the cell selection procedure or the cell reselection procedure.

In operation 16-30, when the received RRC connection release message has an alternative CRP indicator configured therein, the terminal may store and apply the alternative CRP indicator. When the RRC connection release message includes a new timer (Txxx) value, the terminal may operate the corresponding timer Txxx by using the timer Txxx value. The terminal may transition to the RRC idle mode or the RRC inactive mode according to whether there is suspension configuration information (suspendConfig) which can be included in the received RRC connection release message, so as to perform the cell selection procedure.

In operation 16-35, the terminal in the RRC idle mode or the RRC inactive mode may receive or acquire system information from the camped-on cell. The cell may broadcast two CRPs for each E-UTRA frequency and broadcast one CRP for each NR frequency through the system information. For convenience of description, the legacy CRP (or the first CRP) is described as the existing cell reselection priority value, and the alternative CRP (or the second CRP) is described as the newly introduced and defined cell reselection priority value.

Referring to FIG. 16B, in operation 16-40, the terminal may determine whether the received system information includes the alternative CRP for at least one E-UTRA frequency.

In operation 16-45, when the received system information includes the alternative CRP for at least one E-UTRA frequency, the terminal may determine the alternative CRP broadcasted for each E-UTRA frequency as a cell reselection priority value. When the alternative CRP for each E-UTRA frequency is not broadcasted through the system information, the terminal may determine the legacy CRP broadcasted for each E-UTRA frequency as the cell reselection priority value. The terminal may determine the legacy CRP broadcasted through the system information for each NR frequency as the cell reselection priority value.

In operation 16-47, when the received system information includes only the legacy CRP for each RAT-specific frequency, the terminal may determine the legacy CRP broadcasted through the system information for each RAT-specific frequency as the cell reselection priority value.

In operation 16-50, the terminal may perform cell reselection by using the determined cell reselection priority value.

In operation 16-55, the terminal may determine whether the cell selected as cell reselection is a suitable cell or an acceptable cell. The suitable cell and the acceptable cells are defined as follows:

Suitable Cell:
  A cell is considered as suitable if the following conditions are fulfilled:
    The cell is part of either the selected public land mobile network (PLMN) or the registered PLMN or PLMN of the Equivalent PLMN list;
    The cell selection criteria are fulfilled
    According to the latest information provided by NAS:
    The cell is not barred
    The cell is part of at least one TA that is not part of the list of "Forbidden Tracking Areas", which belongs to a PLMN that fulfils the first bullet above.

Acceptable Cell:
  A cell is considered as acceptable if the following conditions are fulfilled:
    The cell is not barred
    The cell selection criteria are fulfilled When the cell selected by the terminal as cell reselection is a suitable cell in operation 16-55, the terminal may continuously perform the cell reselection procedure by maintaining the alternative CRP indicator configured through the RRC connection release message. For example, the terminal may perform the cell reselection procedure starting from operation 16-35.

When the cell selected by the terminal as cell reselection is an acceptable cell in operation 16-55, the terminal may perform the cell reselection procedure by maintaining the alternative CRP indicator configured through the RRC connection release message and determining, as the cell reselection priority value, the legacy CRP for each RAT-specific frequency, which is provided through the system information broadcasted in the cell selected as cell reselection, in operation 16-60. The reason the alternative CRP indicator is maintained is that when the terminal reselects a suitable cell later, the terminal is to perform cell reselection by determining, as the cell reselection priority value, the alternative CRP for each E-UTRA frequency, which is provided through the system information in the reselected suitable cell. When the terminal reselects the suitable cell later in operation 16-60, the terminal may perform the cell reselection procedure starting from operation 16-35. When the alternative CRP is maintained, the timer Txxx in operation may continue to be operated.

In operation 16-50, while the terminal performs the cell reselection procedure, the terminal may be in any-cell-selection state. In this case, the terminal may maintain or release the configured alternative CRP indicator.

Figure 17A:
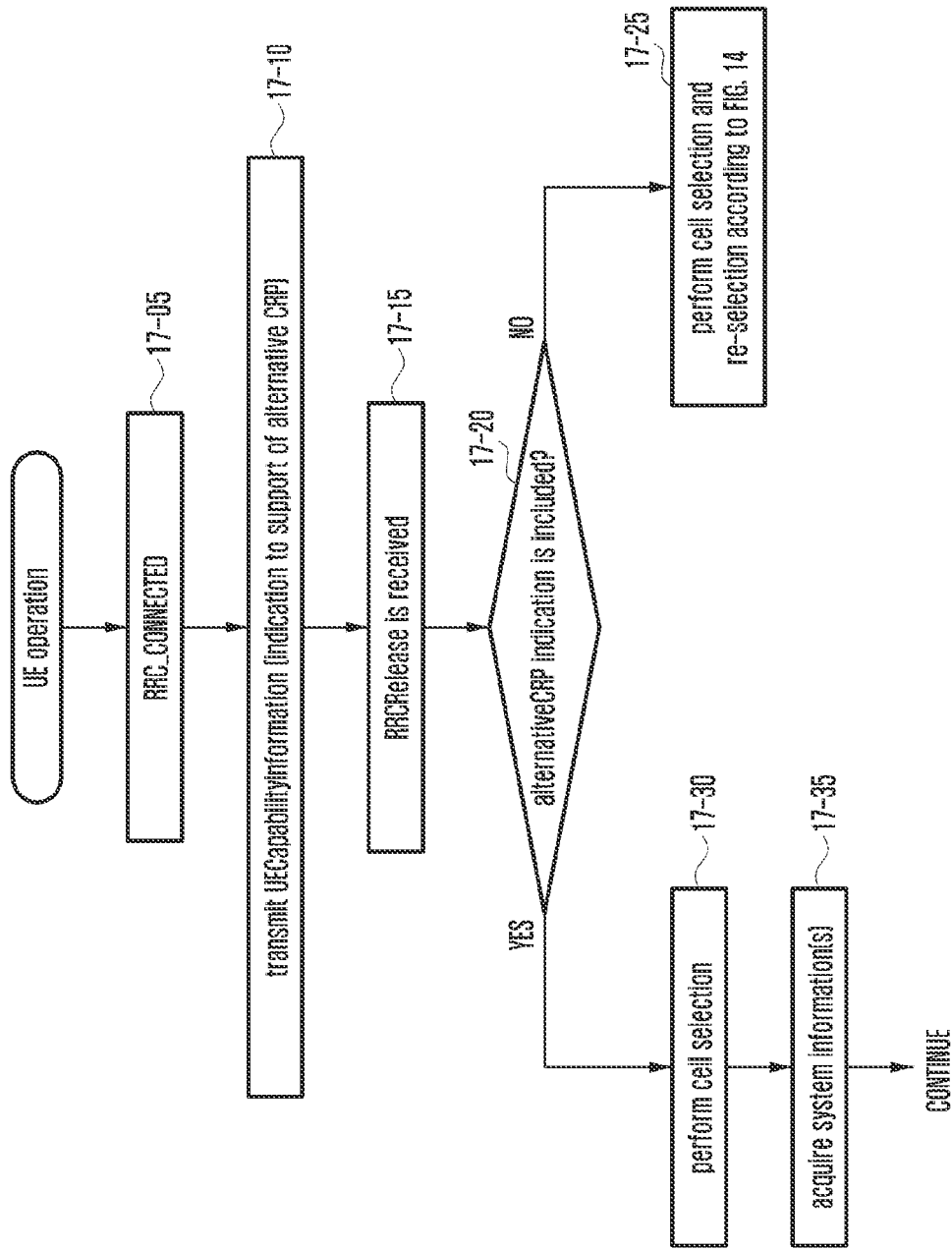
FIG. 17A illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.
Figure 17B:
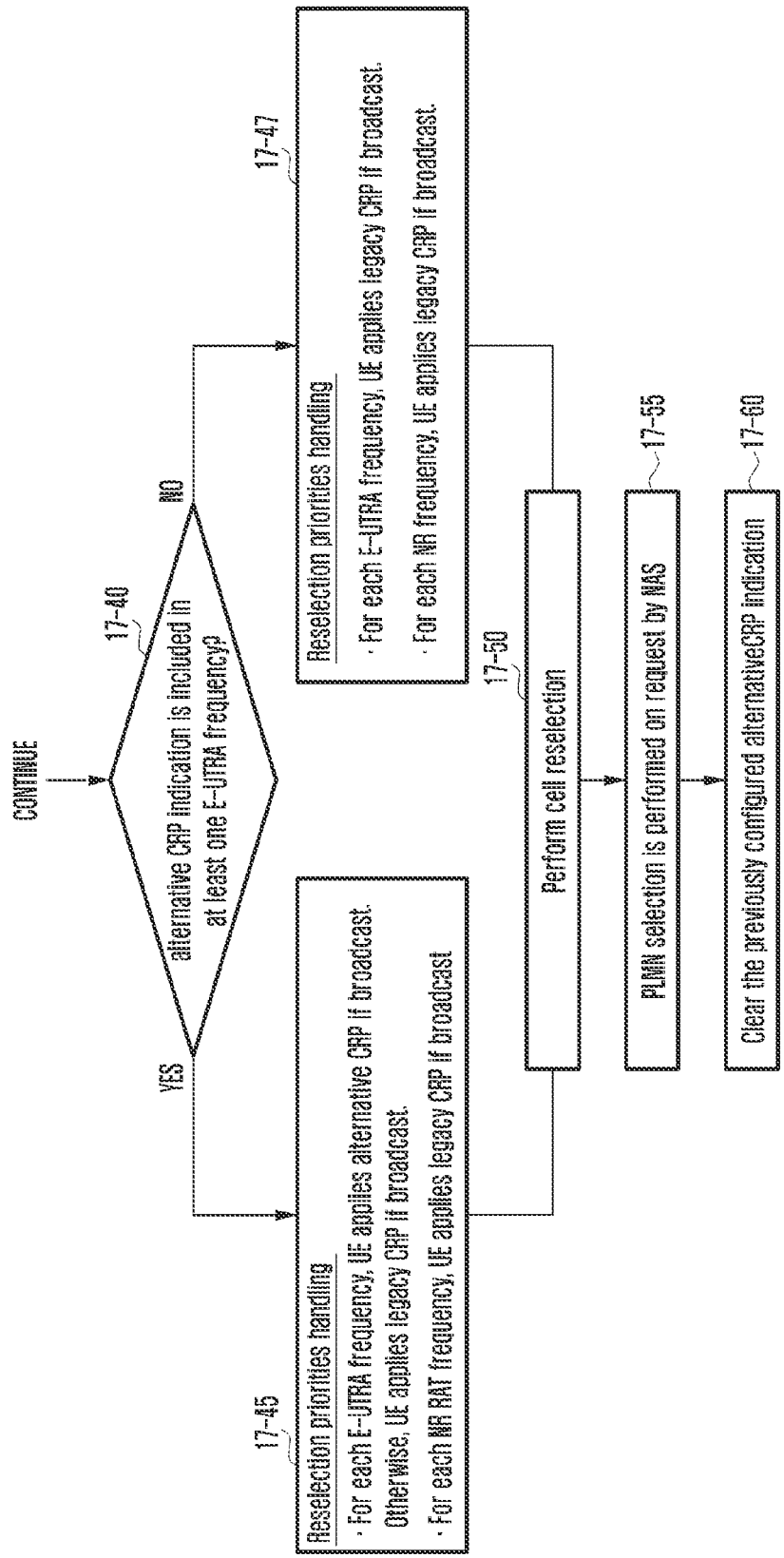
FIG. 17B illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

FIGS. 17A and 17B illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

Referring to FIG. 17A, a terminal may be enterered into an RRC-connected mode (RRC-CONNECTED) through an RRC establishment procedure or an RRC resume procedure 17-05 with a base station.

In operation 17-10, the terminal in the RRC-connected mode may transmit a UECapabilityInformation message to the base station. The message may include at least one of the following information:

An indicator indicating whether to support en-DC
An indicator indicating whether to support ng-en-dc
NR band information supportable by terminal in (NG)en-dc
An indicator indicating that among multiple elements of cell reselection priority configuration information for each RAT-specific frequency, the information being broadcasted through the system information, a particular element of cell reselection priority configuration information is applicable according to the configuration of the base station (or an indicator indicating that an alternative CRP is supported: indication to support of alternative CRP). For example, based on the indicator, the base station may configure an RRC connection release message with an indicator (an alternative CRP indicator) indicating that the terminal supporting (NG) EN-DC is to perform cell reselection based on a particular element of cell reselection priority configuration information among multiple elements of cell reselection priority configuration information for each E-UTRA frequency from the system information. The (NG)EN-DC terminal for which the alternative CRP indicator is configured may perform cell reselection based on a newly defined alternative CRP among two cell reselection priority values for each EUTRA frequency, the values being included in the system information. Alternatively, the terminal may omit, in the UECapability Information, the indication to support of alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

In operation 17-15, the base station may transmit the RRC connection release message to the terminal.

In operation 17-20, the terminal may determine whether the received RRC connection release message includes an alternative CRP indicator. Alternatively, the RRC connection release message may include a new timer (e.g., Txxx) value to apply a validity time in which the alternative CRP indicator is applied.

In operation 17-25, when the received RRC connection release message has no alternative CRP indicator configured therein, or the timer Txxx expires or stops, the terminal may perform the cell selection procedure or the cell reselection procedure according to the embodiment described with reference to FIG. 14. The terminal may transition to the RRC idle mode or the RRC inactive mode according to whether there is suspension configuration information (suspendConfig) which can be included in the received RRC connection release message, so as to perform the cell selection procedure or the cell reselection procedure.

In operation 17-30, when the received RRC connection release message has an alternative CRP indicator configured therein, the terminal may store and apply the alternative CRP indicator. When the RRC connection release message includes a new timer (Txxx) value, the terminal may operate the corresponding timer Txxx by using the timer Txxx value. The terminal may transition to the RRC idle mode or the RRC inactive mode according to whether there is suspension configuration information (suspendConfig) which can be included in the received RRC connection release message, so as to perform the cell selection procedure.

In operation 17-35, the terminal in the RRC idle mode or the RRC inactive mode may receive or acquire system information from the camped-on cell. The cell according to the embodiment may broadcast two CRPs for each E-UTRA frequency and broadcast one CRP for each NR frequency through the system information. In the embodiment, for convenience of description, the legacy CRP (or the first CRP) is described as the existing cell reselection priority value, and the alternative CRP (or the second CRP) is described as the newly introduced and defined cell reselection priority value.

Referring to FIG. 17B, in operation 17-40, the terminal may determine whether the received system information includes the alternative CRP for at least one E-UTRA frequency.

In operation 17-45, when the received system information includes the alternative CRP for at least one E-UTRA frequency, the terminal may determine the alternative CRP broadcasted for each E-UTRA frequency as a cell reselection priority value. When the alternative CRP for each E-UTRA frequency is not broadcasted through the system information, the terminal may determine the legacy CRP broadcasted for each E-UTRA frequency as the cell reselection priority value. The terminal may determine the legacy CRP broadcasted through the system information for each NR frequency as the cell reselection priority value.

In operation 17-47, when the received system information includes only the legacy CRP for each RAT-specific frequency, the terminal may determine the legacy CRP broadcasted through the system information for each RAT-specific frequency as the cell reselection priority value.

In operation 17-50, the terminal may perform cell reselection by using the determined cell reselection priority value.

In operation 17-55, the terminal may perform an PLMN selection procedure. For example, the terminal may perform the PLMN selection procedure upon the request from an NAS-layer device.

In operation 17-60, the terminal may release the alternative CRP indicator configured through the RRC connection release message.

Figure 18A:
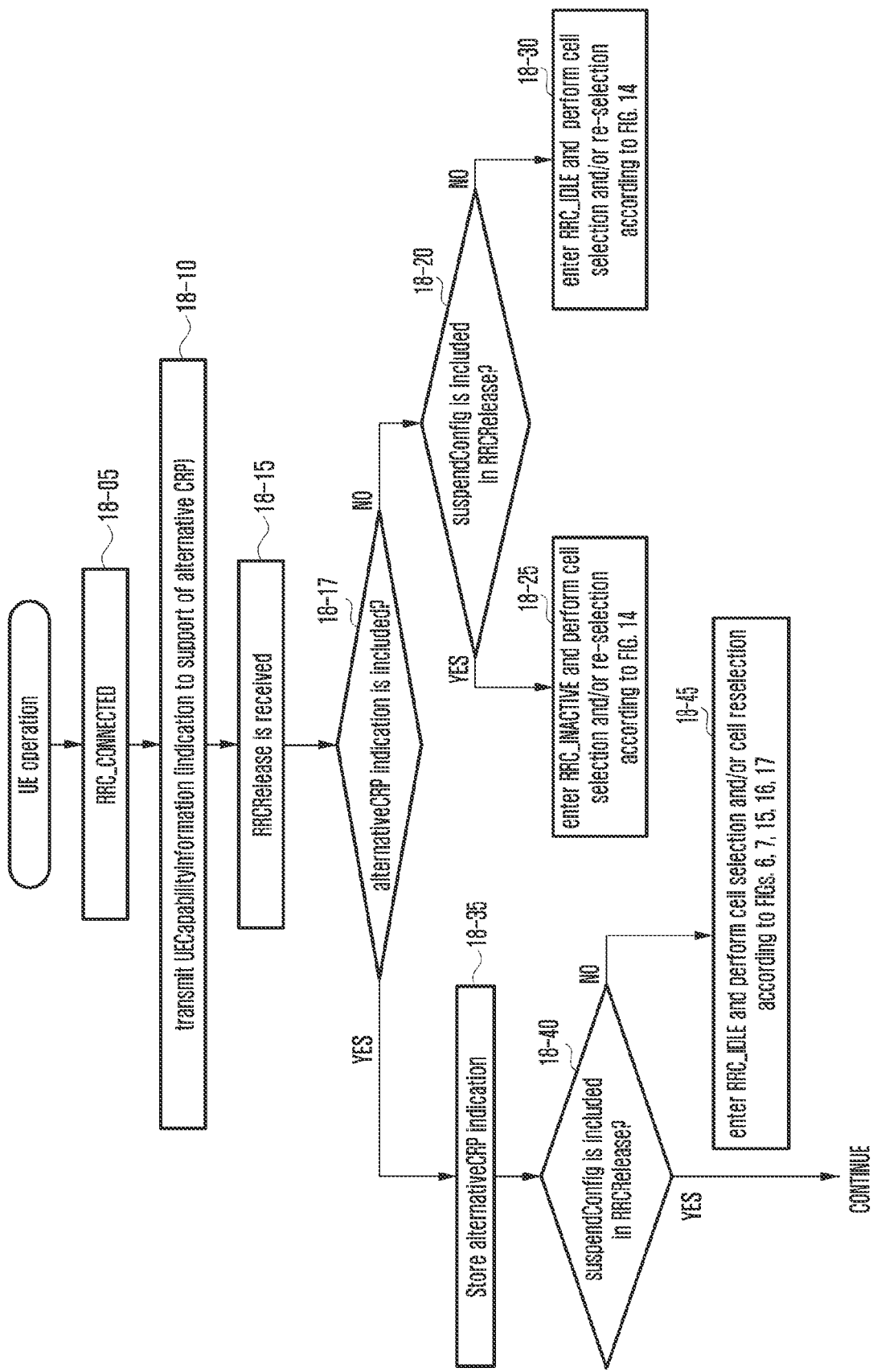
FIG. 18A illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.
Figure 18B:
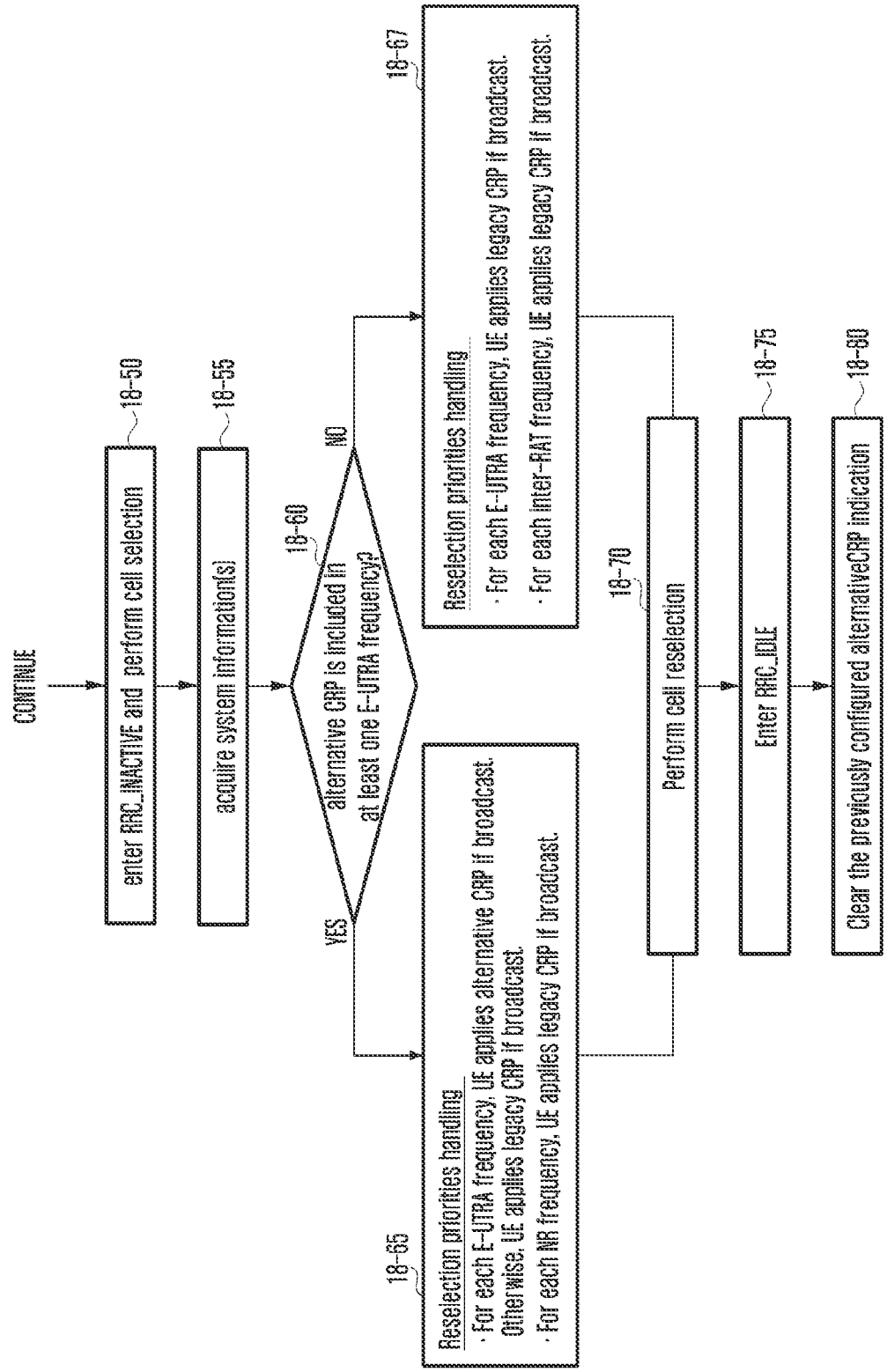
FIG. 18B illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

FIGS. 18A and 18B illustrate a process of performing a cell reselection procedure by a terminal in an RRC inactive mode (RRC_INACTIVE) or an RRC idle mode (RRC_IDLE) in the next-generation mobile communication system according to an embodiment of the disclosure.

Referring to FIG. 18A, a terminal may be entered into an RRC-connected mode (RRC-CONNECTED) through an RRC establishment procedure or an RRC resume procedure 18-05 with a base station.

In operation 18-10, the terminal in the RRC-connected mode may transmit a UECapabilityInformation message to the base station 18-02. The message may include at least one of the following information:

An indicator indicating whether to support en-DC

An indicator indicating whether to support ng-en-dc

NR band information supportable by terminal in (NG)en-dc

An indicator indicating that among multiple elements of cell reselection priority configuration information for each RAT-specific frequency, the information being broadcasted through the system information, a particular element of cell reselection priority configuration information is applicable according to the configuration of the base station (or an indicator indicating that an alternative CRP is supported: indication to support of alternative CRP). For example, based on the indicator, the base station may configure an RRC connection release message with an indicator (an alternative CRP indicator) indicating that the terminal supporting (NG) EN-DC is to perform cell reselection based on a particular piece of cell reselection priority configuration information among multiple elements of cell reselection priority configuration information for each E-UTRA frequency from the system information. The (NG)EN-DC terminal for which the alternative CRP indicator is configured may perform cell reselection based on a newly defined alternative CRP among two cell reselection priority values for each EUTRA frequency, the values being included in the system information. Alternatively, the terminal may not include, in the UECapabilityInformation, the indication to support alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

In operation 18-15, the base station may transmit the RRC connection release message to the terminal.

In operation 18-17, the terminal may determine whether the received RRC connection release message includes an alternative CRP indicator.

When the received RRC connection release message has no alternative CRP indicator configured therein, the terminal may determine in operation 18-20 whether the received RRC connection release message includes suspension configuration information (suspendConfig).

In operation 18-25, the terminal may apply the suspension configuration information included in the received RRC connection release message and transition to the RRC inactive mode. The terminal having transitioned to the RRC inactive mode may perform the cell selection procedure or the cell reselection procedure described above with reference to FIG. 14.

In operation 18-30, when the received RRC connection release message includes no suspension configuration information, the terminal may transition to the RRC idle mode. The terminal having transitioned to the RRC idle mode may perform the cell selection procedure or the cell reselection procedure described above with reference to FIG. 14.

In operation 18-35, the terminal may store and apply the alternative CRP indicator configured in the received RRC connection release message. When the RRC connection release message includes a new timer (e.g., Txxx) value, the terminal may operate the corresponding timer Txxx by using the timer Txxx value.

In operation 18-40, the terminal may determine whether the received RRC connection release message includes the suspension configuration information (suspendConfig).

In operation 18-45, when the received RRC connection release message includes no suspension configuration information, the terminal may transition to the RRC idle mode. The terminal having transitioned to the RRC idle mode may perform the cell selection procedure or the cell reselection procedure. The terminal in the RRC idle mode may perform a cell reselection procedure described above with reference to FIGS. 6, 7, 15, 16, and 17. When the inter-RAT cell reselection is performed, the terminal in the RRC idle mode may maintain the alternative CRP indicator configured from the NR base station through the RRC connection release message.

Operations subsequent to operation 18-45 are described below with respect to FIG. 18B.

Referring to FIG. 18B, when the RRC connection release message includes the suspension configuration information, the terminal may apply the suspension configuration information included in the RRC connection release message, transition to the RRC inactive mode, and perform the cell selection procedure in operation 18-50.

In operation 18-55, the terminal in the RRC inactive mode may receive or acquire system information from the camped-on cell. The cell may broadcast two CRPs for each E-UTRA frequency and broadcast one CRP for each NR frequency through the system information. For convenience of description, the legacy CRP (or the first CRP) is described as the existing cell reselection priority value, and the alternative CRP (or the second CRP) is described as the newly introduced and defined cell reselection priority value.

In operation 18-60, the terminal may determine whether the received system information includes the alternative CRP for at least one E-UTRA frequency.

In operation 18-65, when the received system information includes the alternative CRP for at least one E-UTRA frequency, the terminal may determine the alternative CRP broadcasted for each E-UTRA frequency as a cell reselection priority value. When the alternative CRP for each E-UTRA frequency is not broadcasted through the system information, the terminal may determine the legacy CRP broadcasted for each E-UTRA frequency as the cell reselection priority value in operation 18-67. The terminal may determine the legacy CRP broadcasted through the system information for each NR frequency as the cell reselection priority value.

In operation 18-70, the terminal in the RRC inactive mode may perform cell reselection by using the determined cell reselection priority value.

In operation 18-75, the terminal in the RRC inactive mode may transition to the RRC idle mode.

In operation 18-80, the terminal which has transitioned to the RRC mode (the terminal, the RRC state of which is changed) may remove the alternative CRP indicator configured through the received RRC connection release message in operation 18-15. When the alternative CRP indicator is removed, the terminal may perform the cell selection procedure or the cell reselection procedure (i.e., apply the legacy CRP only) described above with reference to FIG. 14. When the timer Txxx is in operation, the timer Txxx may stop.

Figure 19A:
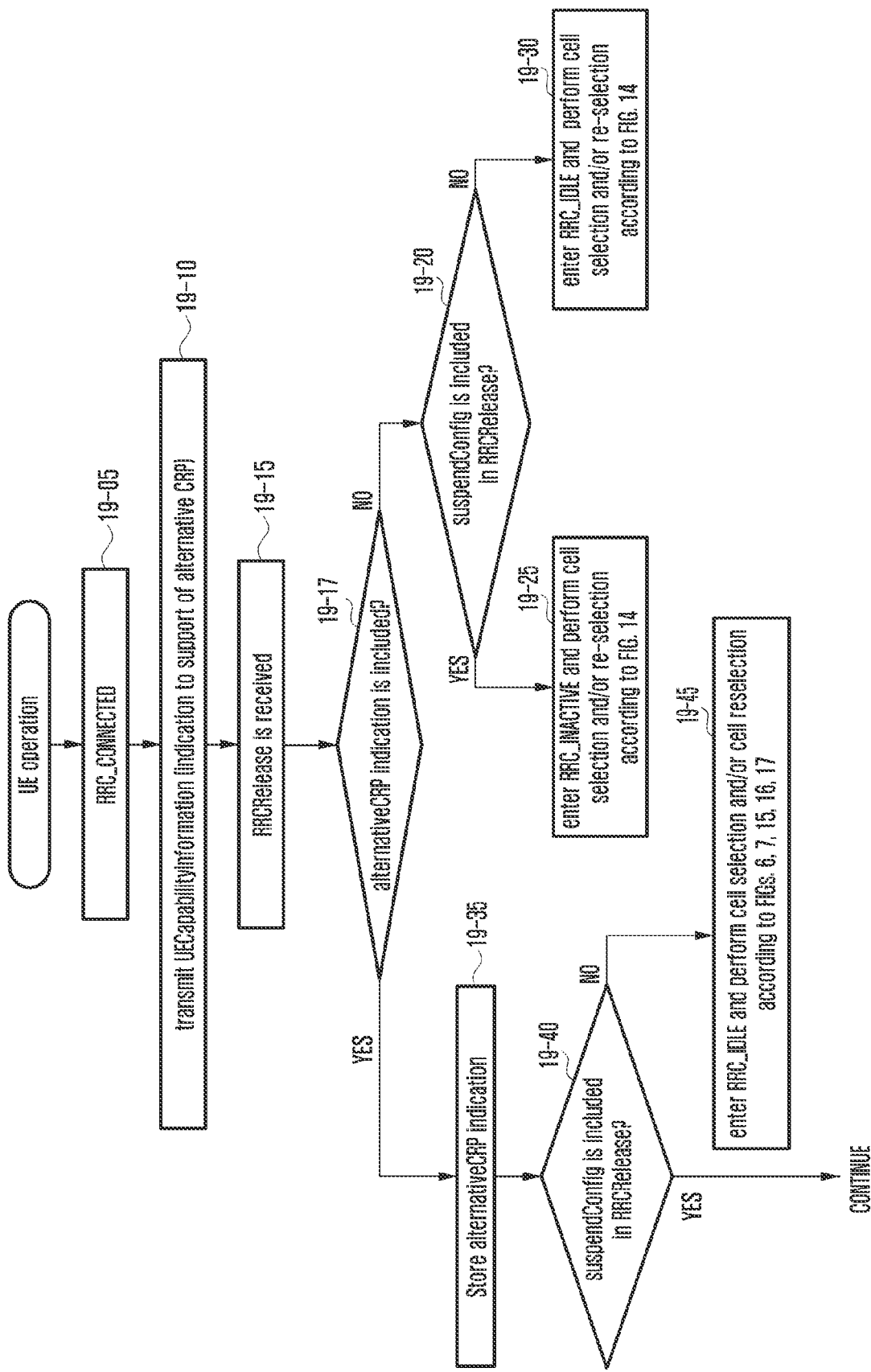
FIG. 19A illustrates a process of performing a cell reselection procedure by a terminal in an RRC inactive mode (RRC_INACTIVE) or an RRC idle mode (RRC_IDLE) in the next-generation mobile communication system according to an embodiment of the disclosure.

FIGS. 19A and 19B illustrate a process of performing a cell reselection procedure by a terminal in an RRC inactive mode (RRC_INACTIVE) or an RRC idle mode (RRC_IDLE) in the next-generation mobile communication system according to an embodiment of the disclosure.

Referring to FIG. 19A, a terminal may be entered into an RRC-connected mode (RRC-CONNECTED) through an RRC establishment procedure or an RRC resume procedure 19-05 with a base station.

In operation 19-10, the terminal in the RRC-connected mode may transmit a UECapabilityInformation message to the base station. The message may include at least one of the following information:

An indicator indicating whether to support en-DC
An indicator indicating whether to support ng-en-dc
NR band information supportable by terminal in (NG)en-dc
An indicator indicating that among multiple of cell reselection priority configuration information for each RAT-specific frequency, the information being broadcasted through the system information, a particular element of cell reselection priority configuration information is applicable according to the configuration of the base station (or an indicator indicating that an alternative CRP is supported: indication to support of alternative CRP). For example, based on the indicator, the base station may configure an RRC connection release message with an indicator (an alternative CRP indicator) indicating that the terminal supporting (NG) EN-DC is to perform cell reselection based on a particular element of cell reselection priority configuration information among multiple elements of cell reselection priority configuration information for each E-UTRA frequency from the system information. The (NG)EN-DC terminal for which the alternative CRP indicator is configured may perform cell reselection based on a newly defined alternative CRP among two cell reselection priority values for each EUTRA frequency, the values being included in the system information. Alternatively, the terminal may omit, in the UECapability Information, the indication to support of alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

In operation 19-15, the base station may transmit the RRC connection release message to the terminal.

In operation 19-17, the terminal may determine whether the received RRC connection release message includes an alternative CRP indicator.

When the received RRC connection release message has no alternative CRP indicator configured therein, the terminal may determine whether the received RRC connection release message includes the suspension configuration information (suspendConfig) in operation 19-20.

In operation 19-25, the terminal may apply the suspension configuration information included in the received RRC connection release message and transition to the RRC inactive mode. The terminal having transitioned to the RRC inactive mode may perform the cell selection procedure or the cell reselection procedure according to the embodiment described with reference to FIG. 14.

In operation 19-30, when the received RRC connection release message has no suspension configuration information configured therein, the terminal may transition to the RRC idle mode. The terminal having transitioned to the RRC idle mode may perform the cell selection procedure or the cell reselection procedure according to the embodiment described with reference to FIG. 14.

In operation 19-35, the terminal may store and apply the alternative CRP indicator configured in the received RRC connection release message. Alternatively, the RRC connection release message may include a new timer (e.g., Txxx) value to apply a validity time to which the alternative CRP indicator is applied.

In operation 19-40, the terminal may determine whether the received RRC connection release message includes the suspension configuration information (suspendConfig).

In operation 19-45, when the received RRC connection release message includes no suspension configuration information, the terminal may transition to the RRC idle mode. The terminal having transitioned to the RRC idle mode may perform the cell selection procedure or the cell reselection procedure. The terminal in the RRC idle mode may perform the cell reselection procedure described above with reference to FIGS. 6, 7, 15, 16 and 17. When the E-UTRA cell reselection is performed, the terminal in the RRC idle mode may release the alternative CRP indicator configured from the NR base station through the RRC connection release message.

Operations subsequent to operation 19-45 are described below with respect to FIG. 19B.

Referring to FIG. 19B, when the RRC connection release message includes the suspension configuration information, the terminal may apply the suspension configuration information included in the RRC connection release message, transition to the RRC inactive mode, and perform the cell selection procedure in operation 19-50.

In operation 19-55, the terminal in the RRC inactive mode may receive or acquire system information from the camped-on cell. The cell may broadcast two CRPs for each E-UTRA frequency and broadcast one CRP for each NR frequency through the system information. For convenience of description, the legacy CRP (or the first CRP) is described as the existing cell reselection priority value, and the alternative CRP (or the second CRP) is described as the newly introduced and defined cell reselection priority value.

In operation 19-60, the terminal may determine whether the received system information includes the alternative CRP for at least one E-UTRA frequency.

In operation 19-65, when the received system information includes the alternative CRP for at least one E-UTRA frequency, the terminal may determine the alternative CRP broadcasted for each E-UTRA frequency as a cell reselection priority value. When the alternative CRP for each E-UTRA frequency is not broadcasted through the system information, the terminal may determine the legacy CRP broadcasted for each E-UTRA frequency as the cell reselection priority value in operation 19-67. The terminal may determine the legacy CRP broadcasted through the system information for each NR frequency as the cell reselection priority value.

In operation 19-70, the terminal in the RRC inactive mode may perform cell reselection by using the determined cell reselection priority value.

In operation 19-75, the terminal in the RRC inactive mode may transition to the RRC idle mode.

In operation 19-80, it may be determined whether the terminal has transitioned into the RRC idle mode according to the inter-RAT cell selection or the inter-RAT cell (E-UTRA cell) reselection. When the terminal has transitioned to the RRC idle mode according to the inter-RAT cell selection or the inter-RAT cell reselection, the terminal in the RRC idle mode may remove the alternative CRP indicator in operation 19-85, which is configured through the received RRC connection release message in operation 19-15. When the timer Txxx is in operation, the timer Txxx may stop. When the terminal has transitioned to the RRC idle mode for predetermined reasons other than the inter-RAT cell selection or the inter-RAT cell reselection (e.g., the timer T319 expires), the terminal may perform the cell selection or cell reselection procedure (starting from operation 19-55) by maintaining and applying the alternative CRP indicator configured through the received RRC connection release message in operation 19-15.

Figure 20:
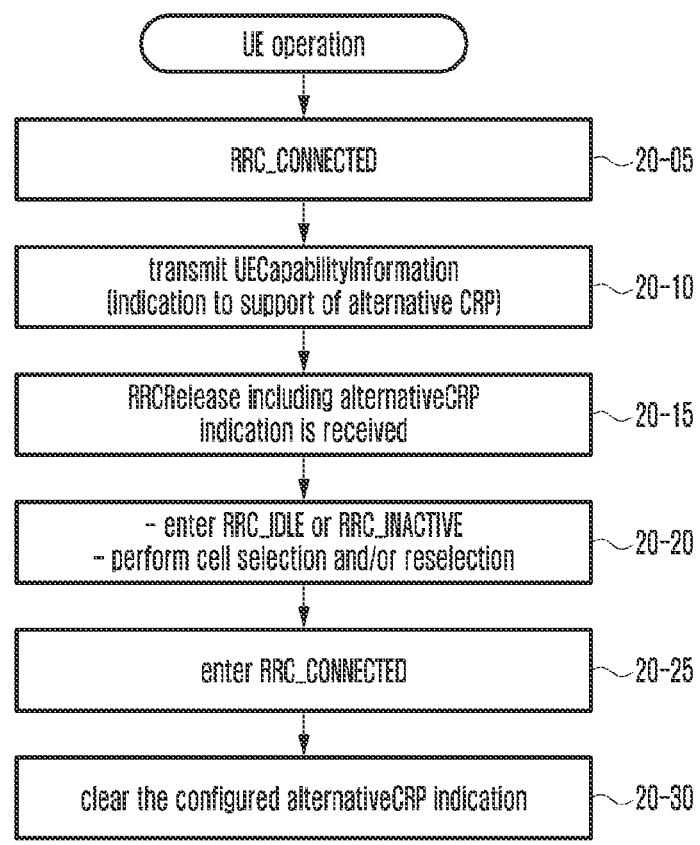
FIG. 20 illustrates a procedure of transitioning to an RRC-connected mode by a terminal in an RRC inactive mode (RRC_INACTIVE) or an RRC idle mode (RRC_IDLE) in the next-generation mobile communication system according to an embodiment of the disclosure.

FIG. 20 illustrates a procedure of transitioning to an RRC-connected mode by a terminal in an RRC inactive mode (RRC_INACTIVE) or an RRC idle mode (RRC_IDLE) in the next-generation mobile communication system according to an embodiment of the disclosure.

Referring to FIG. 20, a terminal may be entered into an RRC-connected mode (RRC-CONNECTED) through an RRC establishment procedure or an RRC resume procedure 20-05 with an NR base station.

In operation 20-10, the terminal in the RRC-connected mode may transmit a UECapabilityInformation message to the base station. The message may include at least one of the following information:

An indicator indicating whether to support en-DC

An indicator indicating whether to support ng-en-dc

NR band information supportable by terminal in (NG)en-dc

An indicator indicating that among multiple elements of cell reselection priority configuration information for each RAT-specific frequency, the information being broadcasted through the system information, a particular element of cell reselection priority configuration information is applicable according to the configuration of the base station (or an indicator indicating that an alternative CRP is supported: indication to support of alternative CRP). For example, based on the indicator, the base station may configure an RRC connection release message with an indicator (an alternative CRP indicator) indicating that the terminal supporting (NG) EN-DC is to perform cell reselection based on a particular element of cell reselection priority configuration information among multiple elements of cell reselection priority configuration information for each E-UTRA frequency from the system information. The (NG)EN-DC terminal for which the alternative CRP indicator is configured may perform cell reselection based on a newly defined alternative CRP among two cell reselection priority values for each EUTRA frequency, the values being included in the system information. Additionally, a new timer (e.g., Txxx) value applicable to the alternative CRP (or the second CRP) may be included. When the RRC connection release message includes the new timer (Txxx) value, the terminal may operate the timer Txxx by using the corresponding timer Txxx value. The terminal may perform cell reselection only when the timer Txxx is in operation, by applying the newly defined alternative CRP (or the second CRP) among two cell reselection priority values for each EUTRA frequency, the values being included in the system information. When the timer Txxx expires, the terminal may remove the alternative CRP indicator configured through the RRC connection release message. Alternatively, the terminal may omit, in the UECapability Information, the indication to support of alternative CRP. When the alternative CRP indicator is configured in the RRC connection release message, the terminal supporting (NG)EN-DC mandatorily supports the alternative CRP broadcasted through the system information, and thus whether to support the alternative CRP may not be separately reported to the UECapability Information.

In operation 20-15, the base station may include the alternative CRP indicator in the RRC connection release message and transmit the RRC connection release message to the terminal. Alternatively, the RRC connection release message may include a new timer (Txxx) value to apply a validity time to which the alternative CRP indicator is applied.

In operation 20-20, the terminal may receive the RRC connection release message and then transition to the RRC idle mode or the RRC inactive mode. The terminal may perform the cell selection or cell reselection procedure by storing and applying the alternative CRP indicator configured in the RRC connection release message. When the RRC connection release message includes a new timer (Txxx) value, the terminal may operate the corresponding timer Txxx by using the timer Txxx value.

In operation 20-25, the terminal in the RRC idle mode or the RRC inactive mode may transition to the RRC-connected mode (RRC_CONNECTED) through the RRC establishment procedure or the RRC resume procedure. The terminal in the RRC inactive mode may maintain the RRC inactive mode through the RRC resume procedure. For example, in response to the RRC connection resume request message, the base station may transmit the RRC connection release message to the terminal. When the newly received RRC connection release message has no alternative CRP indicator configured therein, the terminal may release the alternative CRP indicator configured in the previously received RRC connection release message. Alternatively, when the RRC connection release message newly received for supporting delta configuration has no alternative CRP indicator configured therein, the terminal may continue to apply the alternative CRP indicator configured in the previously received RRC connection release message.

In operation 20-30, the terminal having transitioned to the RRC-connected mode may remove the alternative CRP indicator configured in operation 20-15. When the timer Txxx is in operation, the timer Txxx may stop.

Figure 21:
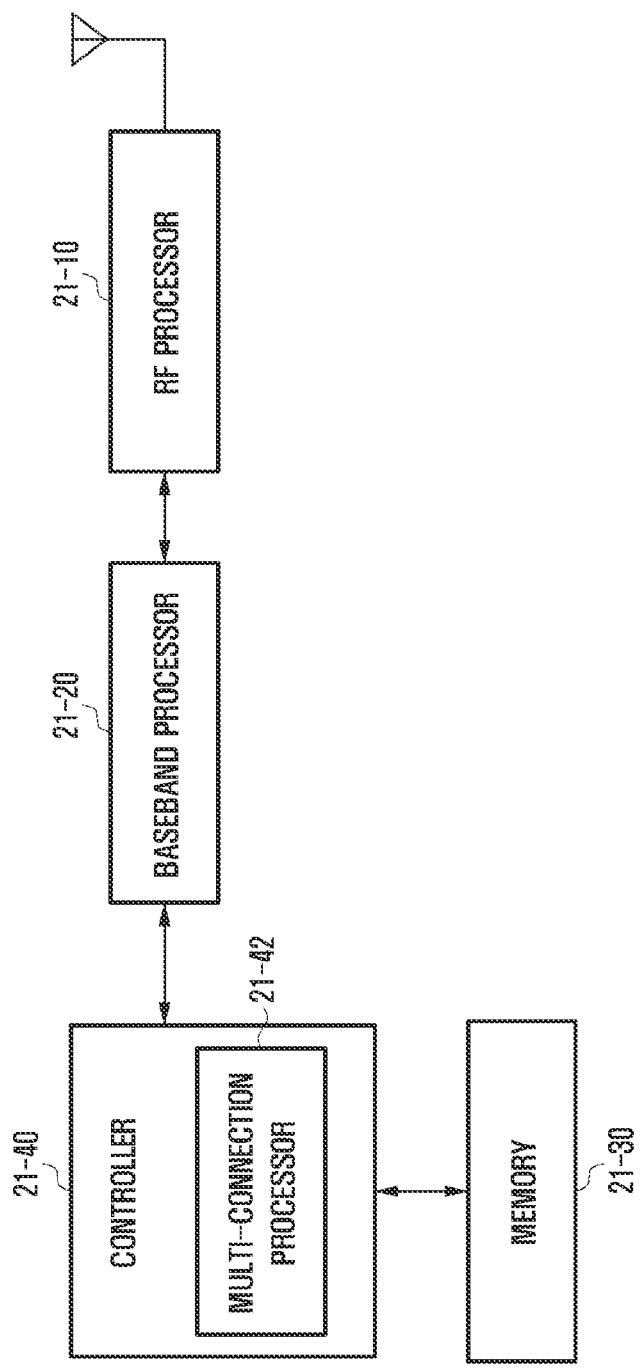
FIG. 21 is a block diagram illustrating an inner structure of a terminal according to an embodiment of the disclosure.

FIG. 21 is a block diagram illustrating an inner structure of a terminal according to an embodiment of the disclosure.

Referring to FIG. 21, the terminal includes a radio frequency (RF) processor 21-10, a baseband processor 21-20, a memory 21-30, and a controller 21-40.

The RF processor 21-10 may perform a function for transmitting or receiving a signal through a radio channel, such as signal band conversion, amplification, and the like. The RF processor 21-10 up-converts a baseband signal provided from the baseband processor 21-20 to an RF-band signal and then transmits the RF-band signal through an antenna, and down-converts an RF-band signal received through an antenna into a baseband signal. For example, the RF processor 21-10 may include a transmission filter, a reception filter, an amplifier, a mixer, an oscillator, a digital-to-analog converter (DAC), an analog-to-digital converter (ADC), and the like. Although only a single antenna is illustrated in FIG. 21, the terminal may include multiple antennas. In addition, the RF processor 21-10 may include multiple RF chains. Furthermore, the RF processor 21-10 may perform beamforming. For beamforming, the RF processor 21-10 may adjust the phases and amplitudes of signals transmitted or received through multiple antennas or antenna elements. The RF processor 21-10 may also perform MIMO and may receive data of multiple layers of data during the MIMO operation.

The baseband processor 21-20 converts between a baseband signal and a bitstream according to the physical layer specifications of a system. For example, during data transmission, the baseband processor 21-20 generates complex symbols by encoding and modulating a transmission bitstream. In addition, during data reception, the baseband processor 21-20 reconstructs a received bitstream by demodulating and decoding a baseband signal provided from the RF processor 21-10. For example, according to an OFDM scheme, during data transmission, the baseband processor 21-20 generates complex symbols by encoding and modulating a transmission bitstream, maps the complex symbols to subcarriers, and then configures OFDM symbols by performing inverse fast Fourier transformation (IFFT) operation and cyclic prefix (CP) insertion. Further, during data reception, the baseband processor 21-20 segments a baseband signal provided from the RF processor 21-10 into units of OFDM symbols, reconstructs signals mapped to subcarriers by performing a fast Fourier transformation (FFT) operation, and then reconstructs a received bitstream by demodulating and decoding the signals.

The baseband processor 21-20 and the RF processor 21-10 transmit and receive signals as described above. Accordingly, each of the baseband processor 21-20 and the RF processor 21-10 may also be referred to as a transmitter, a receiver, a transceiver, or a communication unit. Furthermore, at least one of the baseband processor 21-20 and the RF processor 21-10 may include multiple communication modules to support multiple different radio-access technologies. In addition, at least one of the baseband processor 21-20 and the RF processor 21-10 may include multiple communication modules to process signals of different frequency bands. For example, the different radio-access technologies may include a wireless LAN (e.g., IEEE 802.11), a cellular network (e.g., LTE), and the like. In addition, the different frequency bands may include a super-high frequency (SHF) (e.g., 2·NRHz, NRhz) band and a millimeter-wave (mmWave) (e.g., 60 GHz) band.

The memory 21-30 stores data such as basic programs, applications, configuration information, or the like for the operation of the terminal. The memory 21-30 may store information related to a second connection node for performing wireless communication by using a second wireless connection technology. In addition, the memory 21-30 provides the stored data in response to a request from the controller 21-40.

The controller 21-40 controls the overall operation of the terminal. For example, the controller 21-40 transmits or receives signals through the baseband processor 21-20 and the RF processor 21-10. Further, the controller 21-40 records and reads data on or from the memory 21-30. To this end, the controller 21-40 may include at least one processor, such as multi-connection processor 21-42. For example, the controller 21-40 may include a communication processor (CP) for controlling communication and an application processor (AP) for controlling an upper layer such as an application.

Figure 22:
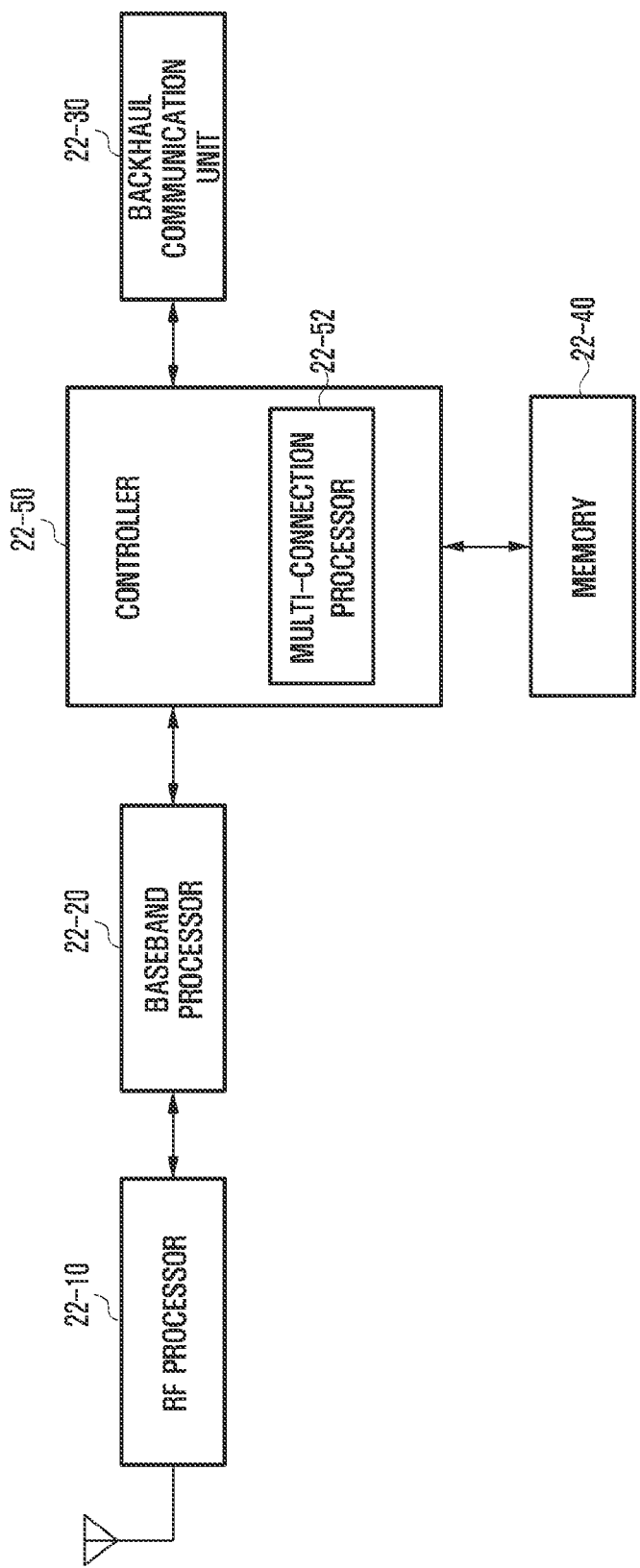
FIG. 22 is a diagram illustrating a new radio (NR) base station configuration according to an embodiment of the disclosure.

FIG. 22 is a diagram illustrating an NR base station configuration according to an embodiment of the disclosure.

Referring to FIG. 22, the base station includes an RF processor 22-10, a baseband processor 22-20, a backhaul communication unit 22-30, a memory 22-40, and a controller 22-50.

The RF processor 22-10 transmits and receives a signal through a radio channel, such as signal band conversion and amplification. The RF processor 22-10 up-converts a baseband signal provided from the baseband processor 22-20 to an RF-band signal and transmits the converted RF-band signal through an antenna, and down-converts an RF-band signal received through an antenna to a baseband signal. For example, the RF processor 22-10 may include a transmission filter, a reception filter, an amplifier, a mixer, an oscillator, a DAC, an ADC, and the like. Although only a single antenna is illustrated in FIG. 22, the RF processor 22-10 may include multiple antennas. In addition, the RF processor 22-10 may include multiple RF chains. Furthermore, the RF processor 22-10 may perform beamforming. For beamforming, the RF processor 22-10 may adjust phases and amplitudes of signals transmitted or received through multiple antennas or antenna elements. The RF processor may perform downlink MIMO operation by transmitting data of one or more layers.

The baseband processor 22-20 converts between a baseband signal and a bitstream based on the physical layer specifications of a first radio-access technology. For example, during data transmission, the baseband processor 22-20 generates complex symbols by encoding and modulating a transmission bitstream. In addition, during data reception, the baseband processor 22-20 reconstructs a received bitstream by demodulating and decoding a baseband signal provided from the RF processor 22-10. For example, according to an OFDM scheme, during data transmission, the baseband processor 22-20 generates complex symbols by encoding and modulating a transmission bitstream, maps the complex symbols to subcarriers, and then configures OFDM symbols by performing IFFT operation and CP insertion. Further, during data reception, the baseband processor 22-20 segments a baseband signal provided from the RF processor 22-10 into units of OFDM symbols, reconstructs signals mapped to subcarriers by performing FFT operation, and then reconstructs a received bitstream by demodulating and decoding the signals. The baseband processor 22-20 and the RF processor 22-10 transmits and receives signals as described above. Accordingly, each of the baseband processor 22-20 and the RF processor 22-10 may also be referred to as a transmitter, a receiver, a transceiver, a communication unit, or a wireless communication unit.

The backhaul communication unit 22-30 provides an interface for communicating with other nodes in a network. The backhaul communication unit 22-30 converts a bitstream transmitted from a primary base station to another node, for example, the secondary base station, the core network, and the like, into a physical signal, and converts a physical signal received from another node into a bitstream.

The memory 22-40 stores data such as basic programs, applications, configuration information, or the like for the operation of the primary base station. The memory 22-40 may store information related to a bearer allocated to a connected terminal, the result of measurement reported from the connected terminal, and the like. In addition, the memory 22-40 may store information which serves as criteria for determining whether or not to provide multi-connectivity to the terminal. Further, the memory 22-40 provides the stored data in response to a request from the controller 22-50.

The controller 22-50 controls the overall operation of the base station. For example, the controller 22-50 transmits or receives a signal through the baseband processor 22-20 and the RF processor 22-10 or through the backhaul communication unit 22-30. In addition, the controller 22-50 records and reads data on or from the memory 22-40. To this end, the controller 22-50 may include at least one processor such as a multi-connection processor 22-52.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   receiving, from a base station, a message for releasing a radio resource control (RRC) connection, the message including an indication indicating to apply alternative cell reselection priority information for a cell reselection, the indication being stored in the terminal;
   receiving, from the base station, system information associated with the cell reselection;
   identifying whether the system information includes cell reselection priority information and the alternative cell reselection priority information;
   in case that the system information includes the cell reselection priority information and the alternative cell reselection priority information, performing a cell reselection evaluation for an evolved universal terrestrial radio access (E-UTRA) frequency and inter-radio access technology (RAT) frequency, by applying the alternative cell reselection priority information to the E-UTRA frequency among the cell reselection priority information and the alternative cell reselection priority information; based on the indication; and
   in case that inter-RAT cell is reselected based on the cell reselection evaluation, deleting the stored indication indicating to apply the alternative cell reselection priority information.

2. The method of claim 1, further comprising:
   transmitting, to the base station, capability information including information indicating that the terminal supports applying the alternative cell reselection priority information.

3. The method of claim 1, further comprising:
   in case that the system information includes the cell reselection priority information and does not include the alternative cell reselection priority information, performing the cell reselection by applying the cell reselection priority information to the E-UTRA frequency,
   wherein the cell reselection priority information includes cell reselection priority and cell reselection sub priority,
   wherein the alternative cell reselection priority information includes alternative cell reselection priority, and
   wherein the system information includes at least one of system information block (SIB) 3 or SIB 5.

4. The method of claim 1,
   wherein the message further includes information on a timer associated with the indication indicating to apply the alternative cell reselection priority information, and
   wherein in case that the timer expires, the indication indicating to apply the alternative cell reselection priority information is discarded.

5. The method of claim 1,
   wherein in case that the terminal is in camped on any cell state, the cell reselection is performed based on the cell reselection priority information and the indication indicating to apply the alternative cell reselection priority information is preserved,
   wherein in case that the terminal enters a different RRC state, the indication indicating to apply the alternative cell reselection priority information is deleted, and
   wherein in case that a public land mobile network (PLMN) selection is performed on request by non-access stratum (NAS), the indication indicating to apply the alternative cell reselection priority information is deleted.

6. A method performed by a base station in a communication system, the method comprising:
   transmitting, to a terminal, a message for releasing a radio resource control (RRC) connection, the message including an indication indicating to apply alternative cell reselection priority information for a cell reselection, the indication being stored in the terminal; and
   transmitting, to the terminal via a cell of the base station, system information associated with the cell reselection,
   wherein in case that the system information includes the cell reselection priority information and the alternative cell reselection priority information, a cell reselection evaluation for an evolved universal terrestrial radio access (E-UTRA) frequency and inter-radio access technology (RAT) frequency is performed, by applying the alternative cell reselection priority information to the E-UTRA frequency among the cell reselection priority information and the alternative cell reselection priority information based on the indication, and
   wherein in case that inter-RAT cell is reselected based on the cell reselection evaluation, the stored indication indicating to apply the alternative cell reselection priority information is deleted by the terminal.

7. The method of claim 6, further comprising:
   receiving, from the terminal, capability information including information indicating that the terminal supports applying the alternative cell reselection priority information.

8. The method of claim 6,
   wherein in case that the system information includes the cell reselection priority information and does not include the alternative cell reselection priority information, the cell reselection is performed by applying the cell reselection priority information to the E-UTRA frequency,
   wherein the cell reselection priority information includes cell reselection priority and cell reselection sub priority,
   wherein the alternative cell reselection priority information includes alternative cell reselection priority, and
   wherein the system information includes at least one of system information block (SIB) 3 or SIB 5.

9. The method of claim 6,
   wherein the message further includes information on a timer associated with the indication indicating to apply the alternative cell reselection priority information, and
   wherein in case that the timer expires, the indication indicating to apply the alternative cell reselection priority information is discarded by the terminal.

10. The method of claim 6,
    wherein in case that the terminal is in camped on any cell state, the cell reselection is performed based on the cell reselection priority information and the indication indicating to apply the alternative cell reselection priority information is preserved by the terminal, wherein in case that the terminal enters a different RRC state, the indication indicating to apply the alternative cell reselection priority information is deleted by the terminal, and wherein in case that a public land mobile network (PLMN) selection is performed by the terminal on request by non-access stratum (NAS), the indication indicating to apply the alternative cell reselection priority information is deleted by the terminal.

11. A terminal in a communication system, the terminal comprising:

a transceiver; and a controller coupled with the transceiver and configured to:

receive, from a base station, a message for releasing a radio resource control (RRC) connection, the message including an indication indicating to apply alternative cell reselection priority information for a cell reselection, the indication being stored in the terminal, receive, from the base station, system information associated with the cell reselection, identify whether the system information includes cell reselection priority information and the alternative cell reselection priority information, in case that the system information includes the cell reselection priority information and the alternative cell reselection priority information, perform a cell reselection evaluation for an evolved universal terrestrial radio access (E-UTRA) frequency and inter-radio access technology (RAT) frequency, by applying the alternative cell reselection priority information to the E-UTRA frequency among the cell reselection priority information and the alternative cell reselection priority information based on the indication, and in case that inter-RAT cell is reselected based on the cell reselection evaluation, delete the indication indicating to apply the alternative cell reselection priority information.

12. The terminal of claim 11, wherein the controller is further configured to:

transmit, to the base station, capability information including information indicating that the terminal supports applying the alternative cell reselection priority information.

13. The terminal of claim 11, wherein the controller is further configured to in case that the system information includes the cell reselection priority information and does not include the alternative cell reselection priority information, perform the cell reselection by applying the cell reselection priority information to the E-UTRA frequency, wherein the cell reselection priority information includes cell reselection priority and cell reselection sub priority, wherein the alternative cell reselection priority information includes alternative cell reselection priority, and wherein the system information includes at least one of system information block (SIB) 3 or SIB 5.

14. The terminal of claim 11, wherein the message further includes information on a timer associated with the indication indicating to apply the alternative cell reselection priority information, and wherein in case that the timer expires, the indication indicating to apply the alternative cell reselection priority information is discarded.

15. The terminal of claim 11, wherein in case that the terminal is in camped on any cell state, the cell reselection is performed based on the cell reselection priority information and the indication indicating to apply the alternative cell reselection priority information is preserved, wherein in case that the terminal enters a different RRC state, the indication indicating to apply the alternative cell reselection priority information is deleted, and wherein in case that a public land mobile network (PLMN) selection is performed on request by non-access stratum (NAS), the indication indicating to apply the alternative cell reselection priority information is deleted.

16. A base station in a communication system, the base station comprising:

a transceiver; and a controller coupled with the transceiver and configured to:

transmit, to a terminal, a message for releasing a radio resource control (RRC) connection, the message including an indication indicating to apply alternative cell reselection priority information for a cell reselection, the indication being stored in the terminal, and transmit, to the terminal via a cell of the base station, system information associated with the cell reselection, wherein in case that the system information includes the cell reselection priority information and the alternative cell reselection priority information, a cell reselection evaluation for an evolved universal terrestrial radio access (E-UTRA) frequency and inter-radio access technology (RAT) frequency is performed, by applying the alternative cell reselection priority information to the E-UTRA frequency among the cell reselection priority information and alternative cell reselection priority information based on the indication, and wherein in case that inter-RAT cell is reselected based on the cell reselection evaluation, the indication indicating to apply the alternative cell reselection priority information is deleted by the terminal.

17. The base station of claim 16, wherein the controller is further configured to:

receive, from the terminal, capability information including information indicating that the terminal supports applying the alternative cell reselection priority information.

18. The base station of claim 16, wherein in case that the system information includes the cell reselection priority information and does not include the alternative cell reselection priority information, the cell reselection is performed by applying the cell reselection priority information to the E-UTRA frequency, wherein the cell reselection priority information includes cell reselection priority and cell reselection sub priority, wherein the alternative cell reselection priority information includes alternative cell reselection priority, and wherein the system information includes at least one of system information block (SIB) 3 or SIB 5.

19. The base station of claim 16, wherein the message further includes information on a timer associated with the indication indicating to apply the alternative cell reselection priority information, and wherein in case that the timer expires, the indication indicating to apply the alternative cell reselection priority information is discarded by the terminal.

20. The base station of claim 16,
wherein in case that the terminal is in camped on any cell state, the cell reselection is performed based on the cell reselection priority information and the indication indicating to apply the alternative cell reselection priority information is preserved by the terminal,
wherein in case that the terminal enters a different RRC state, the indication indicating to apply the alternative cell reselection priority information is deleted by the terminal, and
wherein in case that a public land mobile network (PLMN) selection is performed by the terminal on request by non-access stratum (NAS), the indication indicating to apply the alternative cell reselection priority information is deleted by the terminal.

* * * * *